United States Patent
Akifusa et al.

(10) Patent No.: US 8,359,547 B2
(45) Date of Patent: Jan. 22, 2013

(54) MOVABLE USER INTERFACE INDICATOR OF AT LEAST ONE PARAMETER THAT IS ADJUSTABLE WITH DIFFERENT OPERATIONS FOR INCREASING AND DECREASING THE PARAMETER AND/OR METHODS OF PROVIDING THE SAME

(75) Inventors: Yusuke Akifusa, Kyoto (JP); Tomohisa Saito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 245 days.

(21) Appl. No.: 12/370,198

(22) Filed: Feb. 12, 2009

(65) Prior Publication Data
US 2010/0083116 A1 Apr. 1, 2010

(30) Foreign Application Priority Data

Oct. 1, 2008 (JP) ................. 2008-256811
Oct. 1, 2008 (JP) ................. 2008-256812

(51) Int. Cl.
*G06F 3/048* (2006.01)
(52) U.S. Cl. ............... 715/833; 715/727; 381/104
(58) Field of Classification Search .......... 381/104; 715/830–833; 345/179
See application file for complete search history.

(56) References Cited

U.S. PATENT DOCUMENTS

| | | | | |
|---|---|---|---|---|
| 5,506,951 A | * | 4/1996 | Ishikawa | 715/786 |
| 5,615,347 A | * | 3/1997 | Davis et al. | 715/833 |
| 5,805,167 A | * | 9/1998 | van Cruyningen | 715/808 |
| 6,069,648 A | | 5/2000 | Suso et al. | |
| 7,117,450 B1 | * | 10/2006 | Chaudhri | 715/787 |
| 7,315,984 B2 | * | 1/2008 | Crow et al. | 715/716 |
| 2004/0080518 A1 | | 4/2004 | Lee | |
| 2004/0137958 A1 | | 7/2004 | Sawai | |
| 2006/0072769 A1 | * | 4/2006 | Taniguchi | 381/104 |
| 2006/0146174 A1 | | 7/2006 | Hagino | |

(Continued)

FOREIGN PATENT DOCUMENTS

| | | |
|---|---|---|
| JP | 01-297986 | 12/1989 |
| JP | 4-156791 | 5/1992 |

(Continued)

OTHER PUBLICATIONS

"Chotto Shot Camera Instruction Manual", Sony Computer Entertainment Inc., Nov. 2, 2006, 22 pages, with a partial English translation.

(Continued)

*Primary Examiner* — Kieu Vu
*Assistant Examiner* — James T Durkin
(74) *Attorney, Agent, or Firm* — Nixon & Vanderhye P.C.

(57) ABSTRACT

A volume setting icon is provided with a slider for indicating a volume increasing from left toward right. A region in a direction of lower volume relative to a position corresponding to a current value, at which the slider is displayed, is identified as a volume low region, and a region in a direction of higher volume is identified as a volume high region. When the slider is selected, the slider can continuously be operated to move in any direction toward the volume low region and the volume high region. When the volume low region other than the slider is touched, the slider is instantaneously operated to move to a position corresponding to a touch position. When the volume high region other than the slider is touched, the slider is not instantaneously operated to move to a position corresponding to a touch position.

29 Claims, 37 Drawing Sheets

U.S. PATENT DOCUMENTS

| | | | |
|---|---|---|---|
| 2007/0178952 A1 | 8/2007 | Ehara et al. | |
| 2007/0234236 A1* | 10/2007 | Champion et al. | 715/833 |
| 2007/0254696 A1 | 11/2007 | Kajitani | |
| 2008/0013754 A1* | 1/2008 | Chuo et al. | 381/104 |
| 2008/0019440 A1 | 1/2008 | Lee et al. | |
| 2008/0165259 A1 | 7/2008 | Nobels | |
| 2008/0303795 A1* | 12/2008 | Lowles et al. | 345/173 |
| 2009/0033639 A1* | 2/2009 | Oka et al. | 345/184 |
| 2010/0005420 A1* | 1/2010 | Schneider | 715/833 |

FOREIGN PATENT DOCUMENTS

| | | |
|---|---|---|
| JP | 6-276478 | 9/1994 |
| JP | 10-240692 | 2/1997 |
| JP | 9-247634 | 9/1997 |
| JP | 10-240692 | 9/1998 |
| JP | 10-341388 | 12/1998 |
| JP | 2000-056756 | 2/2000 |
| JP | 2000-132561 | 5/2000 |
| JP | 2001-142564 | 5/2001 |
| JP | 2001-249664 | 9/2001 |
| JP | 2002-125176 | 4/2002 |
| JP | 2003-023479 | 1/2003 |
| JP | 2003-333149 | 11/2003 |
| JP | 2004-260760 | 9/2004 |
| JP | 2004-274304 | 9/2004 |
| JP | 2004-297251 | 10/2004 |
| JP | 2004-320091 | 11/2004 |
| JP | 2005-094782 | 4/2005 |
| JP | 2005-184060 | 7/2005 |
| JP | 2005-301544 | 10/2005 |
| JP | 2005-333591 | 12/2005 |
| JP | 2006-311224 | 11/2006 |
| JP | 2007-195830 | 8/2007 |
| JP | 2007-201727 | 8/2007 |
| JP | 2008-131597 | 6/2008 |

OTHER PUBLICATIONS

U.S. Appl. No. 12/531,586, filed Sep. 2009, Kuwahara et al.
Data for Playstation Portable from Wikipedia (en.Wikipedia.org/wiki/Psp) PSP Model PSP-1000, 15 pgs. (Released on 2004).
Go!Edit Quick Start Guide, Sony Computer Entertainment Inc., 15 pgs., (2007).
Go Edit Functions (Japanese translated to English document), 3 pgs. (2006).
International Search Report for PCT/JP2008/067864, mailed Jan. 13, 2009.
Sony Playstation Portable (PSP-1001 k), Instruction Manual, 127 pgs. (2005).
Face Training: Nintendo DS exercises your vision and face, telegraph.co.uk/technology/3354933/Face-Training-Nintendo-DS-exercises-your-vision-and-face.html, 2 pgs., (2007).
System still photography (Chotto Shot), 3 pgs., (2006).

* cited by examiner

FIG.17
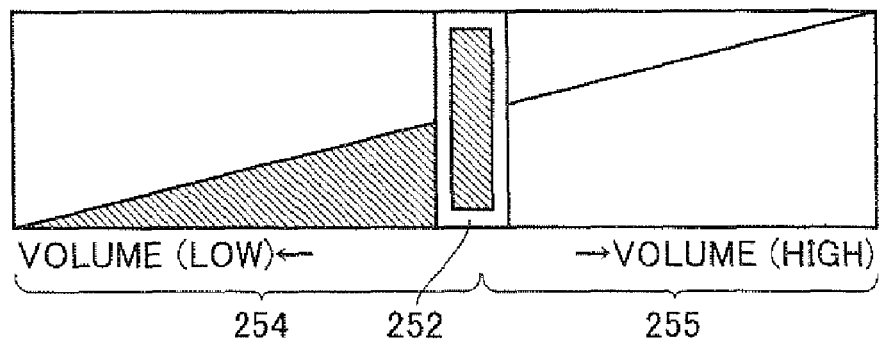
(a)
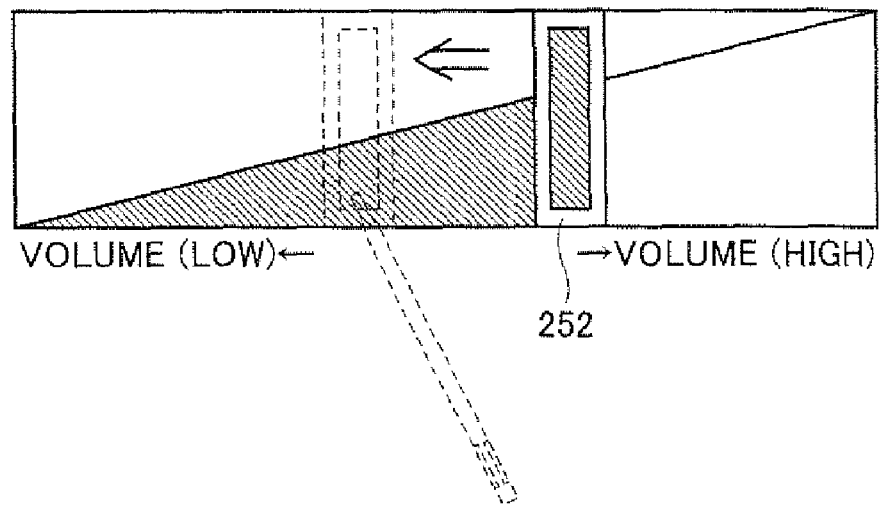
(b)

MOVABLE USER INTERFACE INDICATOR OF AT LEAST ONE PARAMETER THAT IS ADJUSTABLE WITH DIFFERENT OPERATIONS FOR INCREASING AND DECREASING THE PARAMETER AND/OR METHODS OF PROVIDING THE SAME

CROSS-REFERENCE TO RELATED APPLICATIONS

This non-provisional application is based on Japanese Patent Applications Nos. 2008-256811 and 2008-256812 filed with the Japan Patent Office on Oct. 1, 2008, the entire contents of which are hereby incorporated by reference.

FIELD

The technology herein relates to an information processing method and an information processing device setting a prescribed parameter in accordance with a coordinate value input through a user's operation.

BACKGROUND AND SUMMARY

A technique to change a reproduction volume to a desired volume by adjusting a volume adjustment portion displayed on a screen in controlling a volume of output from a speaker or the like has conventionally been known.

For example, according to Japanese Patent Laying-Open No. 2000-056756, in a device for supporting practice of a musical instrument, a volume of reproduction of a main part can be adjusted. Specifically, an operator can set any reproduction volume by horizontally sliding a control knob drawn on a volume adjustment portion with a mouse representing a pointing device.

In addition, in a general media player as well, in adjusting a reproduction volume, the reproduction volume can be set by horizontally sliding the control knob drawn on the volume adjustment portion as in the device for supporting practice of the musical instrument above. Moreover, by clicking a position around the volume set by the user with the mouse in the volume adjustment portion, the control knob moves to a position around the position to be clicked and the reproduction volume can immediately be changed to that set volume.

In a general media player as described above, however, the user cannot know only from appearance, the highest volume in the volume adjustment portion and association between the volume adjustment portion and the volume. Further, even when the volume is the same, how sound is heard varies depending on variation in an ambient environment, and it is difficult to immediately change the volume to a user's desired volume.

In this regard, if the volume cannot immediately be changed to the user's desired volume, in particular, if the volume is higher than the user's desired volume, the user and a person around the user may feel uncomfortable, that is, stress may be imposed.

Certain example embodiments address such problems. Certain example embodiments provide an information processing method and an information processing device implementing a user interface suitable for a user's operation in an operation to change setting of a parameter.

According to certain example embodiments, an information processing method performed in a computer (1) setting a value of at least one parameter based on an input from an input device (13; a reference numeral used in embodiments; to be understood similarly hereinafter) is provided. The information processing method causes the computer (1) to function as: first change operation accepting means (S110) for accepting an operation of change from a position in accordance with a current value of the parameter within a prescribed display area (250) in a prescribed screen (200, 201, 202, 203); first update means (S114, S115) for gradually updating the parameter from the current value based on the operation of change accepted by the first change operation accepting means; second change operation accepting means (S111) for accepting an operation of change to a position in accordance with a desired value of the parameter within the prescribed display area; and second update means (S112, S115) for updating the parameter from the current value to the desired value based on the operation of change accepted by the second change operation accepting means. In addition, the second update means updates the parameter from the current value to the desired value (S115) when the desired value is smaller than the current value of the parameter (S111, S112) and the second update means does not update the parameter from the current value to the desired value (S113) when the desired value is greater than the current value of the parameter (S111, S113).

According to certain example embodiments, when a slider operation which is an operation of change from the position in accordance with the current value is accepted through the input device (13), the parameter is gradually updated in accordance with a slider position. On the other hand, when the operation of change to the position in accordance with the desired value is accepted through the input device (13), the parameter is updated from the current value to the desired value if the desired value is smaller than the current value of the parameter, and the parameter is not updated from the current value to the desired value if the desired value is greater than the current value of the parameter.

Therefore, the user can change the parameter through a series of operations of the input device (13). Specifically, the parameter can gradually be changed from the current value to a greater value or a smaller value. On the other hand, a change operation input for abruptly increasing the parameter from the current value to a greater value is prohibited. Thus, by prohibiting the change operation for abruptly increasing the parameter value to a greater value in the operation to change setting of the parameter, stress imposed on a user or the like due to abrupt change in the parameter caused by an erroneous operation is suppressed and the user interface suitable for a user's operation can be implemented.

Preferably, the input device is a pointing device (27).

According to certain example embodiments, as the user provides input to an arbitrary position on a touch panel by using a touch pen (27), user's operability in selection is improved.

Preferably, the means for updating the parameter from the current value to the desired value based on the operation of change to a position corresponding to the desired value gradually updates the parameter from the current value.

According to certain example embodiments, when the parameter is updated from the current value to the desired value as well, the parameter is gradually updated, so that variation of the parameter can be smooth and hence natural.

Preferably, the computer sets values of a plurality of types of parameters based on the input from the input device (13). The values of the plurality of types of parameters are associated with arbitrary positions within the prescribed display area, respectively.

According to certain example embodiments, as the arbitrary positions within the prescribed display area are associated with the plurality of types of parameters respectively, setting of the parameter through the input device can be made in a simplified manner.

In particular, the prescribed display area is a multi-dimensional area in accordance with the number of types of parameters set by the computer.

According to certain example embodiments, as the parameter is displayed in a dimension in accordance with the number of types of parameters, the position of each parameter can readily be recognized.

Preferably, the parameter corresponds to a volume level of sound output from an output device of the computer.

According to certain example embodiments, abrupt increase in volume from the current volume, which leads to uncomfortable feeling, that is, stress imposed on the user and a person around the user, can be suppressed.

Preferably, the parameter corresponds to duration of a file reproduced in the computer.

According to certain example embodiments, start of reproduction from a position where reproduction has not yet been carried out is avoided and having the user feel uncomfortable can be suppressed.

In addition, according to certain example embodiments, an information processing method performed in a computer setting a value of at least one parameter based on an input from an input device (13) is provided. The information processing method causes the computer (1) to function as: slider display means (S32, S70, S91) for displaying a slider (252) indicating a current value of the parameter within a prescribed display area (250) in a prescribed screen (200, 201, 202, 203); first movement operation accepting means (S110, S114) for accepting a continuous operation of movement from a position of the slider (252) in accordance with the current value of the parameter; second movement operation accepting means (S110, S111) for accepting an operation of movement to a position of the slider (252) in accordance with a desired value of the parameter within the prescribed display area; and update means (S115) for updating the parameter to a value in accordance with a position of the slider (252) resulting from movement in accordance with the accepted operation of movement. The second movement operation accepting means accepts the operation of movement to a desired position of the slider (252) (S112) when the slider moves in a direction of decrease from the current value of the parameter and the second movement operation accepting means does not accept the operation of movement to the desired position of the slider (S113) when the slider moves in a direction of increase from the current value of the parameter.

According to certain example embodiments, when the continuous operation of movement from the position of the slider (252) in accordance with the current value or an operation of movement to the position of the slider in accordance with the desired value is accepted through the input device (13), the parameter is updated to the value in accordance with the position of the slider (252) resulting from movement. When the operation to move the slider (252) through the input device (13) is such that the slider moves in a direction of decrease from the current value, the operation of movement to the desired position is accepted, whereas when the operation to move the slider (252) through the input device (13) is such that the slider moves in a direction of increase from the current value, the operation of movement to the desired position is not accepted.

Therefore, the user can change the parameter through a series of operations of the input device (13). Specifically, by continuously moving the slider, the parameter can gradually be changed from the current value to a greater value or a smaller value. On the other hand, when the slider is operated to move to the position in accordance with the desired value, an operation of movement in a direction of increase from the current value of the parameter is prohibited. Thus, by prohibiting the operation of movement to abruptly increase the parameter value to a greater value in the operation to change setting of the parameter, stress imposed on the user or the like due to abrupt change in the parameter caused by an erroneous operation is suppressed and the user interface suitable for a user's operation can be implemented.

Preferably, the input device is a pointing device (27).

According to certain example embodiments, as the user provides input to an arbitrary position on a touch panel by using a touch pen (27), user's operability in selection is improved.

Preferably, the computer sets values of a plurality of types of parameters based on the input from the input device (13). The values of the plurality of types of parameters are associated with arbitrary positions within the prescribed display area, respectively.

According to certain example embodiments, as the arbitrary positions within the prescribed display area are associated with the plurality of types of parameters respectively, setting of the parameter through the input device can be made in a simplified manner.

In particular, the prescribed display area is a multi-dimensional area in accordance with the number of types of parameters set by the computer.

According to certain example embodiments, as the parameter is displayed in a dimension in accordance with the number of types of parameters, the position of each parameter can readily be recognized.

Preferably, the parameter corresponds to a volume level of sound output from an output device of the computer.

According to certain example embodiments, abrupt increase in volume from the current volume, which leads to uncomfortable feeling, that is, stress imposed on the user and a person around the user, can be suppressed.

Preferably, the parameter corresponds to duration of a file reproduced in the computer.

According to certain example embodiments, start of reproduction from a position where reproduction has not yet been carried out is avoided and having the user feel uncomfortable can be suppressed.

According to certain example embodiments, an information processing device (1) setting a value of at least one parameter based on an input from an input device (13) is provided. The information processing device (1) includes: first change operation accepting means (252, S110, S114) for accepting an operation of change from a position in accordance with a current value of the parameter, within a prescribed display area (250) in a prescribed screen (200, 201, 202, 203); first update means (S114, S115) for gradually updating the parameter from the current value based on the operation of change accepted by the first change operation accepting means; second change operation accepting means (254, 255) for accepting an operation of change to a position in accordance with a desired value of the parameter within the prescribed display area; and second update means (S111, S112, S115) for updating the parameter from the current value to the desired value based on the operation of change accepted by the second change operation accepting means. The second update means updates the parameter from the current value to the desired value when the desired value is smaller than the current value of the parameter (254) and the second update means does not update the parameter from the current value to the desired value when the desired value is greater than the current value of the parameter (255) (S113).

According to certain example embodiments, an information processing device setting a value of at least one parameter based on an input from an input device (13) is provided. The information processing device (1) includes: slider display means (S32, S70, S91) for displaying a slider (252) indicating a current value of the parameter within a prescribed display area (250) in a prescribed screen (200, 201, 202, 203); first movement operation accepting means (S110, S114) for accepting a continuous operation of movement from a position of the slider (252) in accordance with the current value of the parameter; second movement operation accepting means (S110, S111) for accepting an operation of movement to a position of the slider (252) in accordance with a desired value of the parameter within the prescribed display area; and update means (S115) for updating the parameter to a value in accordance with a position of the slider (252) resulting from movement in accordance with the accepted operation of movement. The second movement operation accepting means accepts the operation of movement to a desired position of the slider (252) when the slider moves in a direction of decrease from the current value of the parameter (254, S112) and the second movement operation accepting means does not accept the operation of movement to the desired position of the slider when the slider moves in a direction of increase from the current value of the parameter (255, S113).

According to certain example embodiments, a user interface suitable for a user's operation in an operation to change setting of a parameter is implemented.

The foregoing and other objects, features, aspects and advantages of certain example embodiments will become more apparent from the following detailed description when taken in conjunction with the accompanying drawings.

BRIEF DESCRIPTION OF THE DRAWINGS

FIG. 17 is an enlarged view of a volume setting icon 250.

DESCRIPTION OF THE PREFERRED EMBODIMENTS

Figure 1:
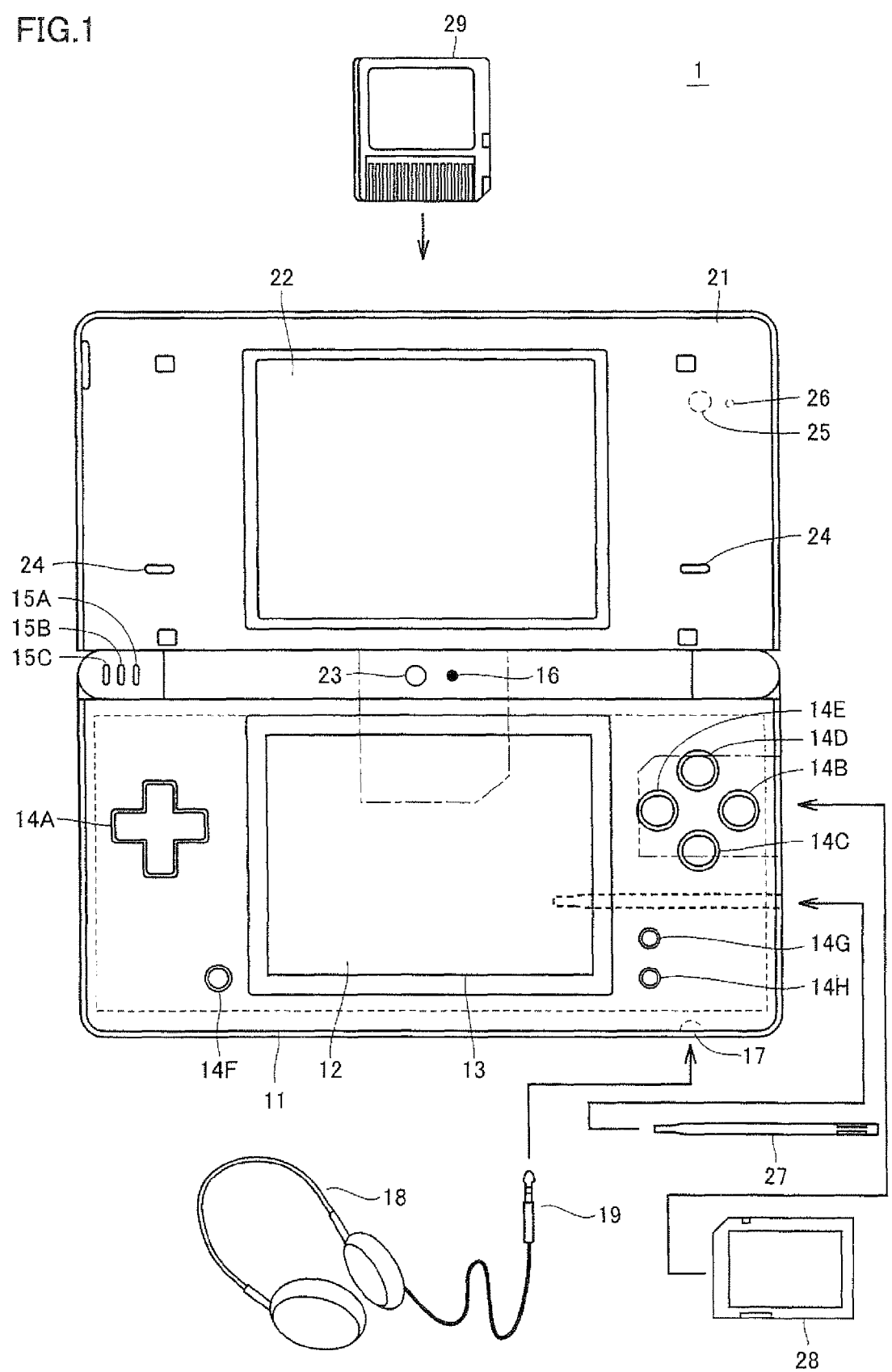
FIG. 1 shows appearance of a game device 1 according to an embodiment.

Certain example embodiments will be described in detail with reference to the drawings. The same or corresponding elements in the drawings have the same reference characters allotted, and detailed description thereof will not be repeated.

A game device 1 will be described hereinafter as a representative example of a computer or an information processing device according to certain example embodiments. In addition, a program executed by game device 1 will be described by way of example of an information processing program according to certain example embodiments. It is noted that the information processing device is not limited to a game device, and it may be implemented as a personal computer capable of executing various applications. In addition, the information processing program may be incorporated as a function of various applications executed on a personal computer.

<Appearance of Game Device>

Appearance of game device 1 according to certain example embodiments will be described with reference to FIG. 1.

Referring to FIG. 1, game device 1 according to an embodiment is an open-close (foldable) type portable game device. FIG. 1 shows game device 1 in an unfolded state (opened state). Game device 1 is configured to have such a size that a user can hold game device 1 with both hands or one hand even in the unfolded state.

Game device 1 has a lower housing 11 and an upper housing 21. Lower housing 11 and upper housing 21 are coupled to allow opening and closing (be foldable). In the example shown in FIG. 1, lower housing 11 and upper housing 21 are each formed like a horizontally long, rectangular plate, and they are coupled to each other to be pivotable around a long side portion thereof. In the present example, for example, in an operation to open and close lower housing 11 and upper housing 21, a configuration of unfolding from a folded state will be described, however, the configuration is not limited thereto. For example, a configuration of opening and closing may also be such that any one of lower housing 11 and upper housing 21 is slid with respect to the other or alternatively any one of lower housing 11 and upper housing 21 is rotated or the like, and the opening and closing operation is not particularly limited.

Normally, the user uses game device 1 in the opened state. In addition, the user stores game device 1 normally in a closed state when he/she does not use game device 1. In the example shown in FIG. 1, game device 1 can not only be in the closed state or the opened state but also be held at any angle between the closed state and the opened state that is formed by lower housing 11 and upper housing 21, by means of friction force generated in a coupling portion. Namely, upper housing 21 can remain at rest at any angle with respect to lower housing 11.

A lower LCD (Liquid Crystal Display) 12 is provided as a display portion (display means) in lower housing 11. Lower LCD 12 is in a horizontally long shape and it is arranged such that a direction in which its long side extends coincides with a direction in which a long side of lower housing 11 extends. In the present embodiment, though an LCD is employed as the display portion (display means) mounted on game device 1, for example, any other display device such as a display device utilizing EL (Electro Luminescence) may be employed. In addition, game device 1 can employ a display device of any resolution.

Operation buttons 14A to 14H are provided as an input portion (input means) in lower housing 11. As shown in FIG. 1, among operation buttons 14A to 14H, a direction input button 14A, an operation button 14B, an operation button 14C, an operation button 14D, an operation button 14E, a power button 14F, a start button 14G, and a select button 14H are provided on an inner main surface of lower housing 11, which is located on the inner side when upper housing 21 and lower housing 11 are folded.

Direction input button 14A is used, for example, for a selection operation. Operation buttons 14B to 14E are used, for example, for an enter operation or a cancel operation. Power button 14F is used for turning on/off the power of game device 1. In the example shown in FIG. 1, direction input button 14A and power button 14F are provided on the inner main surface on one of left and right sides (left side in FIG. 1) of lower LCD 12 provided around the center of the inner main surface of lower housing 11.

In addition, operation buttons 14B to 14E, start button 14G, and select button 14H are provided on the inner main surface of lower housing 11 on the other of left and right sides (right side in FIG. 1) of lower LCD 12. Direction input button 14A, operation buttons 14B to 14E, start button 14G, and select button 14H are used for performing various operations on game device 1.

Operation buttons 14I to 14K not shown in FIG. 1 may further be provided in game device 1. For example, an L button 14I is provided at a left end portion of an upper side surface of lower housing 11, and an R button 14J is provided at a right end portion on the upper side surface of lower housing 11. L button 14I and R button 14J are used, for example, for performing an image pick-up instruction operation (shutter operation) on game device 1. In addition, a volume button 14K is provided on a left side surface of lower housing 11. Volume button 14K is used for adjusting a volume of a speaker included in game device 1.

In addition, game device 1 further includes a touch panel 13 as the input portion (input means) different from operation buttons 14A to 14H. Touch panel 13 is attached to cover a screen of lower LCD 12.

In the present embodiment, touch panel 13 is arranged in association with a display surface of lower LCD 12, and for example, a resistive touch panel is employed. It is noted that touch panel 13 is not limited to the resistive type and any pressing-type touch panel may be adopted.

In the present embodiment, for example, a touch panel having resolution (detection accuracy) as high as that of lower LCD 12 is employed as touch panel 13. It is noted that the resolution of touch panel 13 does not necessarily have to be equal to the resolution of lower LCD 12.

In addition, an insertion opening (dashed line shown in FIG. 1) for a touch pen 27 is provided in a right side surface of lower housing 11. Touch pen 27, which is a pointing device used for performing an operation on touch panel 13, can be accommodated in the insertion opening. Normally, input to touch panel 13 is made by using touch pen 27, however, touch panel 13 can be operated with a finger of the user, without limited to touch pen 27.

Moreover, an insertion opening (shown with a chain-double-dotted line in FIG. 1) for accommodating a memory card 28 is provided in the right side surface of lower housing 11. A connector (not shown) for electrically connecting game device 1 and memory card 28 with each other is provided in the inside of this insertion opening. Memory card 28 is implemented, for example, by an SD (Secure Digital) memory card and removably attached to the connector. Memory card 28, for example, stores in advance a music file which is music data, and reproduction processing can be performed by reading the music file in game device 1.

Further, an insertion opening (shown with a chain-dotted line in FIG. 1) for accommodating a memory card 29 is provided in the upper side surface of lower housing 11. A connector (not shown) for electrically connecting game device 1 and memory card 29 with each other is provided also in the inside of this insertion opening. Memory card 29 is a storage medium storing an image communication program, a game program or the like, and it is removably attached to the insertion opening provided in lower housing 11.

In addition, an external audio output terminal 17 (shown with a dashed line in FIG. 1) in which a plug 19 provided in equipment for external audio output (such as a headphone, an earphone and a bone conduction headphone) is to be inserted is provided in a lower side surface of lower housing 11. In the inside of this external audio output terminal 17, a jack 62 for electrically connecting game device 1 and the equipment for external audio output with each other is provided. The equipment for external audio output may be equipment for both ears such as a headphone 18 or equipment for one ear such as an earphone. Plug 19 of the equipment for external audio output is removably attached to jack 62. Though headphone 18 is representatively described hereinafter as the equipment for external audio output, equipment such as an earphone may also be employed.

Three LEDs 15A to 15C are disposed in a portion on the left of the coupling portion of lower housing 11 and upper housing 21. Game device 1 according to the present embodiment can establish wireless communication with other equipment, and a first LED 15A illuminates when wireless communication is established. A second LED 15B illuminates while game device 1 is being charged. A third LED 15C illuminates when the power of game device 1 is turned on. Therefore, three LEDs 15A to 15C can notify the user of a state of communication establishment, a state of charge, and a state of power on/off of game device 1, respectively.

On the other hand, an upper LCD 22 is provided in upper housing 21. Upper LCD 22 has a horizontally long shape and it is arranged such that a direction in which its long side extends coincides with a direction in which a long side of upper housing 21 extends. As in lower LCD 12, a display device of any other type and of any other resolution may be employed instead of upper LCD 22. A touch panel may be provided to cover upper LCD 22.

In addition, two cameras (an inner camera 23 and an outer camera 25) each serving as an image pick-up device are provided in upper housing 21. As shown in FIG. 1, inner camera 23 is disposed in an inner main surface of upper housing 21 around the coupling portion. On the other hand, outer camera 25 is disposed in a surface opposite to the inner main surface where inner camera 23 is disposed, that is, in an outer main surface of upper housing 21 (a surface on the outside when game device 1 is in the closed state and a back surface of upper housing 21 shown in FIG. 1). In FIG. 1, outer camera 25 is shown with a dashed line.

Thus, inner camera 23 can pick up an image in a direction in which the inner main surface of upper housing 21 faces, and outer camera 25 can pick up an image in a direction opposite to the direction of image pick-up by inner camera 23, that is, in a direction in which the outer main surface of upper housing 21 faces.

In this manner, in the present embodiment, two cameras, that is, inner camera 23 and outer camera 25, are provided such that the directions of image pick-up are opposite to each other. For example, the user can pick up with inner camera 23, an image of a view in a direction from game device 1 toward the user, and can pick up with outer camera 25, an image of a view from game device 1 toward a side opposite to the user.

In some cases, lower LCD 12 and/or upper LCD 22 may be used for displaying an image picked up by inner camera 23 or outer camera 25 in real time.

In addition, a microphone (a microphone 43 shown in FIG. 2) is accommodated as an audio input device in the inner main surface around the coupling portion above. In the inner main surface around the coupling portion above, a microphone hole 16 is formed such that microphone 43 can sense sound outside game device 1. A position where microphone 43 is accommodated and a position of microphone hole 16 do not necessarily have to be in the coupling portion above, and for example, microphone 43 may be accommodated in lower housing 11 and microphone hole 16 may be provided in lower housing 11 in correspondence with the position of accommodation of microphone 43.

Moreover, a fourth LED 26 (shown with a dashed line in FIG. 1) is disposed in the outer main surface of upper housing 21. Fourth LED 26 illuminates while inner camera 23 or outer camera 25 is picking up an image. Alternatively, fourth LED 26 may blink while a motion picture is being picked up (picked-up images are stored as motion picture) by inner camera 23 or outer camera 25.

In order to prevent illumination of the LED from entering the screen, fourth LED 26 may be turned off from the moment of pressing of a shutter until completion of storage of the image picked up at the moment of pressing of the shutter. Fourth LED 26 can notify a subject or a person nearby that the image pick-up by game device 1 is being performed.

In addition, a sound emission hole 24 is formed in the inner main surface of upper housing 21, on each of left and right sides of upper LCD 22 provided around the center of the inner main surface. A speaker is accommodated in upper housing 21 in the rear of sound emission hole 24. Sound emission hole 24 is a hole for emitting sound from the speaker to the outside of game device 1. Here, a right speaker (a right speaker 45 shown in FIG. 2) is accommodated in upper housing 21, in the rear of right sound emission hole 24. In addition, a left speaker (a left speaker 47 shown in FIG. 2) is accommodated in upper housing 21, in the rear of left sound emission hole 24.

As described above, upper housing 21 is provided with inner camera 23 and outer camera 25 that are features for picking up an image as well as upper LCD 22 serving as the display means for displaying various images. On the other hand, lower housing 11 is provided with the input portion (touch panel 13 and buttons 14A to 14K) for providing operation inputs to game device 1 as well as lower LCD 12 serving as the display means for displaying various images.

<Internal Configuration of Game Device>

A block diagram showing an exemplary internal configuration of game device 1 according to certain example embodiments will be described with reference to FIG. 2.

Figure 2:
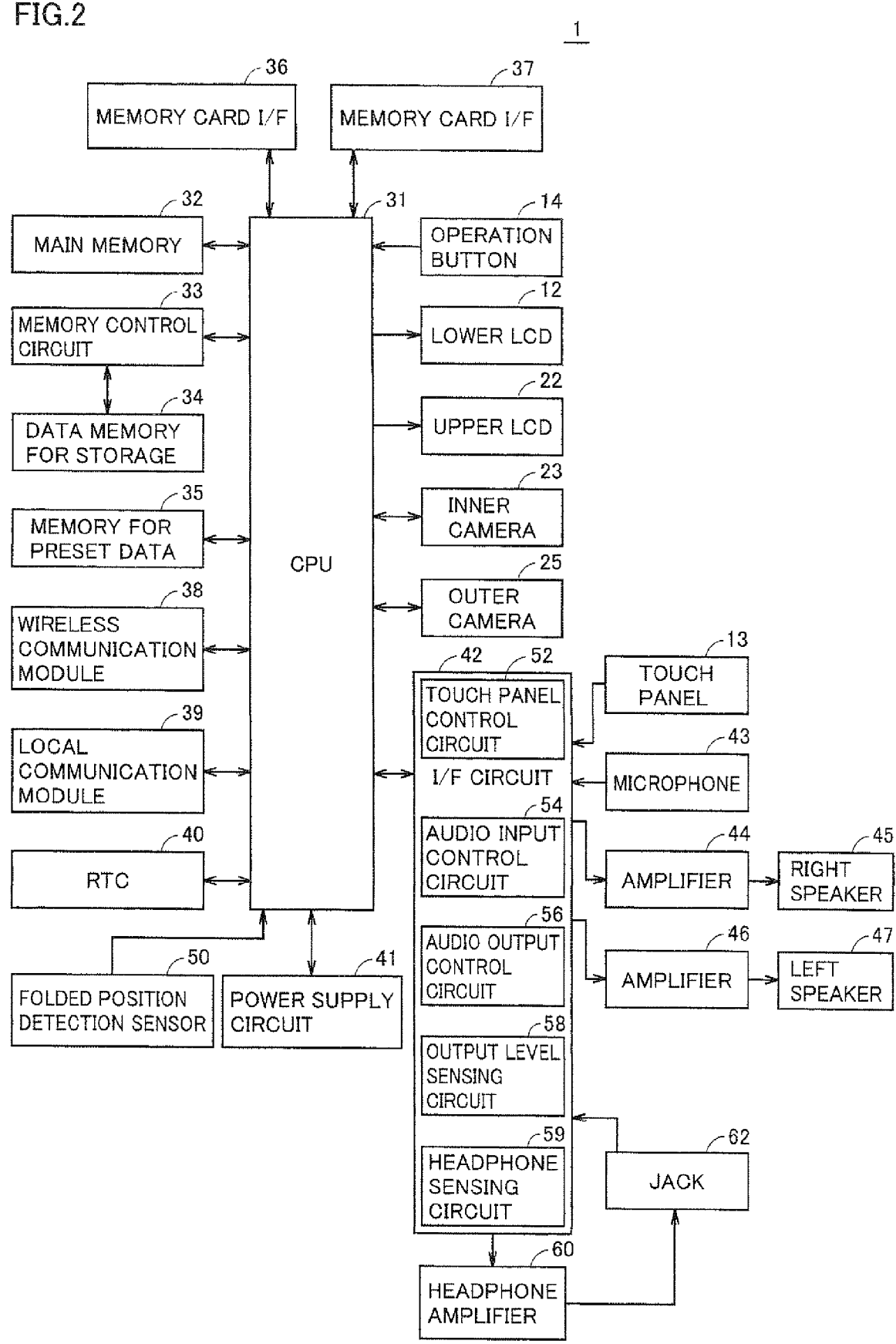
FIG. 2 is a block diagram showing an exemplary internal configuration of game device 1 according to the embodiment.

Referring to FIG. 2, game device 1 includes such electronic parts as a CPU 31, a main memory 32, a memory control circuit 33, a data memory 34 for storage, a memory 35 for preset data, memory card interfaces (memory card I/F) 36 and 37, a wireless communication module 38, a local communication module 39, a real time clock (RTC) 40, a power supply circuit 41, an interface circuit (I/F circuit) 42, and a folded position detection sensor 50. These electronic parts are mounted on an electronic circuit board and accommodated in lower housing 11 (or may be accommodated in upper housing 21).

CPU 31 is operation processing means for executing a prescribed program allowing execution of a plurality of functions. In the present embodiment, a prescribed program for execution of a plurality of functions is recorded in a memory (such as data memory 34 for storage) within game device 1 or memory card 28 and/or 29, and CPU 31 performs a sound function and the like which will be described later by executing the prescribed program. The program executed by CPU 31 may be recorded in advance in a memory within game device 1, obtained from memory card 28 and/or 29, or obtained from other equipment through communication with other equipment.

Main memory 32, memory control circuit 33 and memory 35 for preset data are connected to CPU 31. In addition, data memory 34 for storage is connected to memory control circuit 33.

Main memory 32 is storage means used as a work area or a buffer area of CPU 31. Namely, main memory 32 stores various types of data used for information processing above or stores a program obtained from the outside (memory cards 28 and 29, other equipment, and the like). In the present embodiment, for example, a PSRAM (Pseudo-SRAM) is employed as main memory 32.

Data memory 34 for storage is storage means for storing a program executed by CPU 31, data of images picked up by inner camera 23 and outer camera 25, and the like. Data memory 34 for storage is implemented by a non-volatile storage medium, and for example, it is implemented by a NAND-type flash memory in the present embodiment. Memory control circuit 33 is a circuit controlling reading and writing of data from/to data memory 34 for storage in accordance with an instruction from CPU 31.

Memory 35 for preset data is storage means for storing data such as various parameters set in advance in game device 1 (preset data). A flash memory connected to CPU 31 through an SPI (Serial Peripheral Interface) bus may be employed as memory 35 for preset data.

Memory card I/Fs 36 and 37 are each connected to CPU 31. Memory card I/F 36 performs reading and writing of data from/to memory card 28 attached to the connector in response to an instruction from CPU 31. In addition, memory card I/F 37 performs reading and writing of data from/to memory card 29 attached to the connector in response to an instruction from CPU 31.

In the present embodiment, a music file which is music data stored in memory card 28 is read from memory card 28 and stored in main memory 32 or data memory 34 for storage. In addition, various programs stored in memory card 29 are read and executed by CPU 31.

The information processing program according to certain example embodiments is supplied not only to a computer system through an external storage medium such as memory card 29 but also to a computer system through a wired or wireless communication line. Alternatively, the information processing program may be stored in advance in a non-volatile storage device within the computer system. The storage medium storing the information processing program is not limited to the non-volatile storage device above, and an optical, disc-like storage medium such as a CD-ROM, a DVD, or a similar medium may be employed.

Wireless communication module 38 has a function for connection to wireless LAN, for example, in compliance with IEEE 802.11.b/g specifications. In addition, local communication module 39 has a function to establish wireless communication with a game device of a similar type under a prescribed communication scheme. Wireless communication module 38 and local communication module 39 are connected to CPU 31. CPU 31 can transmit and receive data to/from other equipment through the Internet by using wireless communication module 38, or transmit and receive data to/from another game device of a similar type by using local communication module 39.

In addition, RTC 40 and power supply circuit 41 are connected to CPU 31. RTC 40 counts time and outputs the counted time to CPU 31. For example, CPU 31 is also able to calculate current time (date) or the like based on the time counted by RTC 40. Power supply circuit 41 controls electric power supplied from a power supply of game device 1 (typically, a battery housed in lower housing 11) and supplies electric power to each part of game device 1.

In addition, folded position detection sensor 50 is connected to CPU 31. Folded position detection sensor 50 detects an angle between lower housing 11 and upper housing 21, and outputs a determination signal indicating the closed state or the opened state to CPU 31 based on a result of detection. Specifically, when the angle between lower housing 11 and upper housing 21 is smaller than a prescribed threshold value, determination as the closed state is made and the determination signal indicating the closed state is output. On the other hand, when the angle between lower housing 11 and upper housing 21 is not smaller than the prescribed threshold value, determination as the opened state is made and the determination signal indicating the opened state is output. For example, when game device 1 is operating, that is, when music data reproduction processing is in progress, receiving input of the determination signal indicating the closed state output from folded position detection sensor 50, CPU 31 stops the operation of the reproduction processing depending on sensing of connection with prescribed external output equipment and sets what is called a sleep state in which data of that state of operation is stored. Regarding processing other than the reproduction processing such as display processing, such processing is stopped and the sleep state is set regardless of sensing of connection with prescribed external output equipment. On the other hand, receiving input of the determination signal indicating the opened state output from folded position detection sensor 50 after game device 1 enters the sleep state, CPU 31 performs processing for recovering from the sleep state to the original state based on the stored data of the state of operation. As a result of this processing, the function set to the sleep state can directly be set to an active state for operation.

In the present example, folded position detection sensor 50 of such a type as detecting an angle between lower housing 11 and upper housing 21 and outputting a determination signal has been described, however, the opened and closed state may be detected based on magnetic force. For example, magnetic force generated by the speaker provided in the upper housing can be measured with a sensor measuring magnetic force provided in the lower housing and the opened and closed state may be detected based on strength of the magnetic force. Alternatively, such a type as optically or electrically detecting the opened and closed state may be adopted as the folded position detection sensor.

Moreover, game device 1 includes microphone 43 and amplifiers 44 and 46. Microphone 43 and amplifiers 44 and 46 are each connected to I/F circuit 42. Microphone 43 senses voice and sound of the user issued toward game device 1 and outputs an audio signal indicating the voice and sound to I/F circuit 42. Amplifier 44 amplifies the audio signal from I/F circuit 42 and causes the audio signal to be output from right speaker 45. Amplifier 46 amplifies the audio signal from I/F circuit 42 and causes the audio signal to be output from left speaker 47. I/F circuit 42 is connected to CPU 31.

Further, touch panel 13 is connected to I/F circuit 42.

In addition, game device 1 includes a headphone amplifier 60 and jack 62. Headphone amplifier 60 and jack 62 are each connected to I/F circuit 42. Headphone amplifier 60 amplifies an audio signal from I/F circuit 42 for output from headphone 18 through plug 19 of headphone 18 connected to jack 62. I/F circuit 42 senses turn-on of a mechanical switch, for example, resulting from insertion of plug 19 of headphone 18 into jack 62, and senses insertion of plug 19 of headphone 18 into jack 62. Alternatively, I/F circuit 42 can sense an electrically conducting state resulting from insertion of plug 19 of headphone 18 into jack 62 and sense insertion of plug 19 of headphone 18 into jack 62.

I/F circuit 42 includes an audio input control circuit 54 receiving input of an audio signal from microphone 43, an audio output control circuit 56 controlling output of an audio signal to amplifiers 44 and 46 (right speaker 45 and left speaker 47) or headphone amplifier 60, a touch panel control circuit 52 controlling touch panel 13, an output level sensing circuit 58 sensing an output level of an audio signal output to amplifiers 44 and 46 (right speaker 45 and left speaker 47) or headphone amplifier 60 (headphone 18) by audio output control circuit 56, and a headphone sensing circuit 59 sensing attachment of headphone 18.

Audio input control circuit 54 senses an input level of an audio signal from microphone 43, and performs A/D conversion of the audio signal and converts the audio signal to audio data in a prescribed format.

Headphone sensing circuit 59 senses turn-on of the mechanical switch resulting from insertion of plug 19 of headphone 18 into jack 62 or an electrically conducting state resulting from insertion of plug 19 of headphone 18 into jack 62 and senses insertion of plug 19 of headphone 18 into jack 62. Then, the result of sensing is output to CPU 31, and CPU 31 receives a signal indicating the result of sensing from headphone sensing circuit 59 and determines that headphone 18 has been attached. Here, insertion of plug 19 of headphone 18 should only be sensed, and a method of sensing is not limited.

When plug 19 of headphone 18 is inserted into jack 62 and headphone sensing circuit 59 senses attachment of headphone 18, audio output control circuit 56 switches the output of the audio signal from amplifiers 44, 46 to headphone amplifier 60 in response to an instruction from CPU 31, and adjusts the audio signal to be output to headphone amplifier 60 in accordance with whether the output signal is stereophonic or monaural. In the present example, though only a single headphone amplifier 60 is shown in FIG. 2, stereophonic sound can be heard through a headphone for both ears and hence it is assumed that headphone amplifiers are provided for respective ears.

Touch panel control circuit 52 generates touch position data in a prescribed format based on a signal from touch panel 13 and outputs the data to CPU 31. For example, the touch position data is data indicating a coordinate of a position where input to an input surface of touch panel 13 was made. Here, the touch panel control circuit performs reading of a signal from touch panel 13 and generation of the touch position data once in a prescribed period of time.

CPU 31 can detect a coordinate input through the user's operation of touch panel 13 by obtaining the touch position data through I/F circuit 42.

Operation button 14 is constituted of operation buttons 14A to 14K above and connected to CPU 31. Operation data indicating a state of input to each of operation buttons 14A to 14K (whether the button was pressed or not) is output from operation button 14 to CPU 31. CPU 31 performs processing in accordance with the input to operation button 14 by obtaining the operation data from operation button 14.

Inner camera 23 and outer camera 25 are each connected to CPU 31. Inner camera 23 and outer camera 25 pick up an image in response to an instruction from CPU 31 and output data of the picked-up image to CPU 31. For example, CPU 31 issues an image pick-up instruction to any one of inner camera 23 and outer camera 25, and the camera that received the image pick-up instruction picks up an image and sends the image data to CPU 31.

In addition, lower LCD 12 and upper LCD 22 are each connected to CPU 31. Lower LCD 12 and upper LCD 22 display an operation screen or the like in response to an instruction from CPU 31.

<Exemplary Usage of Game Device>

An exemplary sound selection screen 100 in a sound function in game device 1 according to certain example embodiments will be described with reference to FIG. 3.

Figure 3:
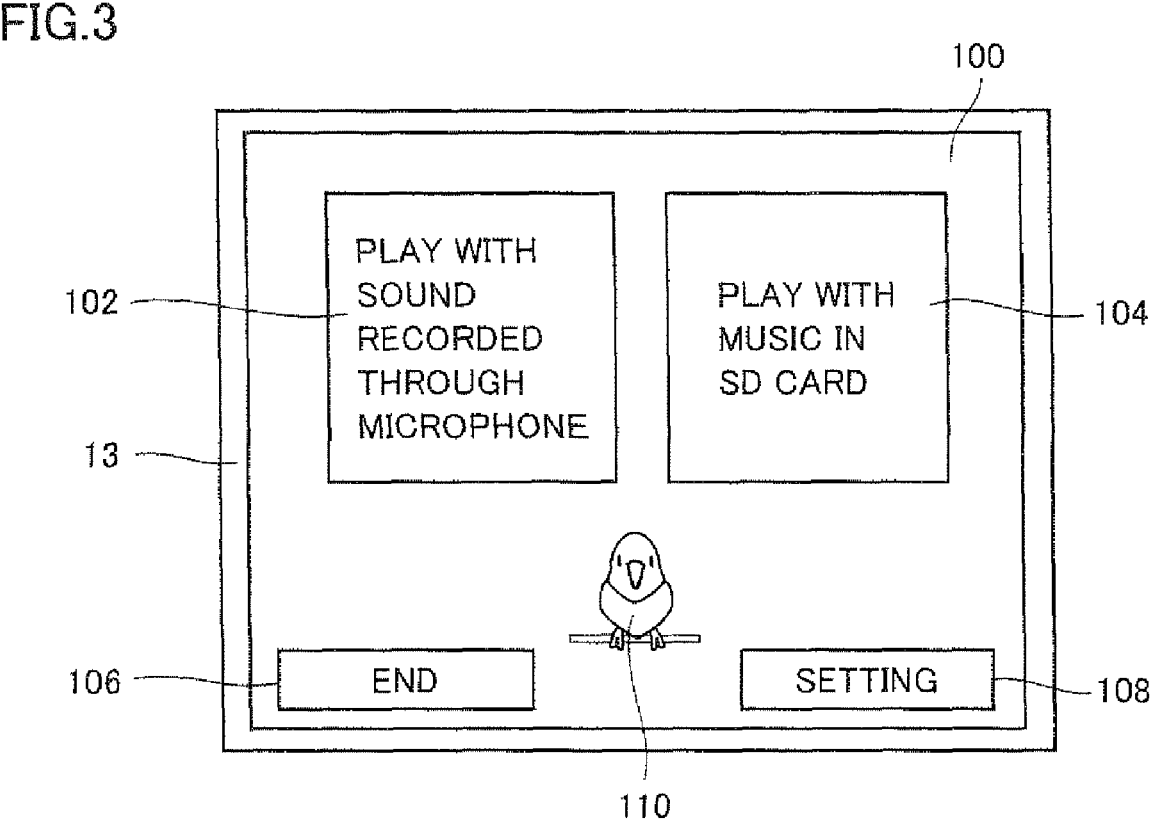
FIG. 3 is a diagram showing an exemplary sound selection screen 100 in a sound function in game device 1 according to the embodiment.

Referring to FIG. 3, game device 1 according to certain example embodiments includes a plurality of functions including a music reproduction function and the like for reproduction of a recording data file freely recorded by the user through the microphone in a main body or reproduction of a music file which is music data stored in an SD card, and the user can arbitrarily select a desired function on sound selection screen 100 shown in FIG. 3.

In the example shown in FIG. 3, a plurality of icons 102 and 104 corresponding to respective functions incorporated in game device 1 are displayed on the screen of lower LCD 12.

Here, when a "play with sound recorded through microphone" icon 102 is selected, transition to a microphone recording and reproduction mode of a function allowing the user to create a recording data file by freely recording sound through the microphone in the main body or to reproduce the created recording data file or to edit the created recording data file is made.

On the other hand, when a "play with music in SD card" icon 104 is selected, transition to a music reproduction mode of a function to reproduce a music file which is music data stored in the SD card is made. In the present embodiment, for example, the music file is stored in the SD card as appropriate through a personal computer or the like, however, wireless communication module 38 described above may be used to transmit and receive data to and from a server storing music files through the Internet, and a downloaded music file may be stored in the SD card.

Alternatively, when the user selects a "setting" icon 108 here, the user can freely select a function relating to setting processing.

Alternatively, when an "end" icon 106 is selected, a sound function ends and the screen returns to a not-shown menu screen.

In addition, in FIG. 3, an object 110 in a bird shape is displayed in a lower portion of the screen of lower LCD 12. While object 110 in a bird shape is being displayed, it is assumed that an automatic recording and reproduction function which will be described later is being performed.

The music reproduction mode, which is a function to perform processing or the like for reproducing a music file which is music data stored in the SD card, will initially be described hereinafter.

Specifically, when "play with music in SD card" icon 104 is selected, transition to the music reproduction mode is made and a music reproduction folder list selection screen 200 is displayed.

Music reproduction folder list selection screen 200 according certain example embodiments will be described with reference to FIG. 4.

FIG. 4(a) shows a case where music reproduction folder list selection screen 200 is displayed on the screen of lower LCD 12.

In addition, in FIG. 4(b), a list screen 200# of music files included in a currently selected folder is displayed on the screen of upper LCD 22.

Referring to FIG. 4(a), the user can select any folder in a folder list display range 230 in music reproduction folder list selection screen 200 by touching the screen of lower LCD 12 with touch pen 27 etc. For example, a case in which folders are diagonally displayed along the circumference of a disc in folder list display range 230 is shown.

For example, it is assumed that a cursor 220 selects a folder displayed at the top in folder list display range 230.

Processing for scroll display of the folder list in accordance with a trail of movement of the touch pen is performed by touching a position where another folder is displayed in folder list display range 230 on the screen of lower LCD 12 with touch pen 27 etc. or by touching the screen and moving touch pen 27 etc. while maintaining the touched state. In the present example, for example, it is assumed that the position of cursor 220 is not changed and a folder at the top in the folder list currently displayed in folder list display range 230 is set to a selected state. Therefore, processing for scroll display of the folder list is performed such that the disc turns in accordance with the trail of movement of the touch pen.

In the present example, though the description is given by way of example, assuming that the position of cursor 220 is not changed, the position of cursor 220 may be moved to a position in accordance with a touch position which is a position touched with touch pen 27. Specifically, when the screen is touched and thereafter an operation to reset the touched state without changing the touch position from the originally touched position is performed (off the screen), only cursor 220 moves in accordance with the touch position. Here, the processing for scroll display of the folder list is not performed. Specifically, when a "random" folder is touched in FIG. 4(a), only cursor 220 moves to the position of the "random" folder.

Meanwhile, when an operation to touch the screen and move touch pen 27 etc. while maintaining the touched state, that is, an operation to change the touch position from the originally touched position while maintaining the touched state (drag operation), is performed, the processing for scroll display of the folder list is performed in accordance with the trail of movement (travel distance) of the touch pen. Here, cursor 220 can be maintained at the position of cursor 220 before scroll display processing or the folder at the top of the folder list can be set in a selected state.

In addition, when the position of cursor 220 is varied and the selected folder is changed, FIG. 4(b) is updated to list screen 200# of music files included in the folder selected by cursor 220. Specifically, when a favorite folder which will be described later is touched, a list of music files registered in the favorite folder is displayed. Alternatively, when the random folder is touched, random reproduction as will be described later is carried out and a list of music files to be reproduced in random reproduction is displayed. In random reproduction, a file name of an already reproduced music file may be displayed, but a file name of a music file which has not yet been reproduced may be displayed with its name being replaced with a different symbol or the like. Through this processing, in random reproduction, the user cannot know a music file to be reproduced next until this music file is reproduced. Thus, the user can have expectation and enjoy reproduction of music data.

Even when the position of cursor 220 is not varied, the folder selected by cursor 220 is changed in accordance with the processing for scroll display of the folder list. Therefore, in list screen 200# displayed on the screen of upper LCD 22, update to the list of music files in the selected folder is made.

In addition, the user can move a slider 218 on a folder list scroll bar 210 displayed on the screen of lower LCD 12, by using touch pen 27 etc.

By moving slider 218 on folder list scroll bar 210, the folder list displayed in folder list display range 230 is updated and a folder list in accordance with the cursor position is displayed.

Moreover, the user can set a volume at which output from the speaker or the like is provided, by designating a volume setting icon 250 with touch pen 27 etc.

Further, the user can return to sound selection screen 100, which is a preceding screen, by selecting a "back" icon 212.

In addition, by selecting an "open" icon 214, a music file selection screen is displayed.

Moreover, by selecting a selection function icon 216 in FIG. 4(a), the user can perform the function corresponding to the selection function icon. It is assumed that display and function of the selection function icon are switched in correspondence with the folder currently selected by cursor 220. Here, for example, a case where a "best 10" folder which is one of the favorite folder is selected is shown, and selection function icon 216 of "all erase" is provided in correspondence with this folder. When selection function icon 216 of "all erase" is selected, processing for erasing all music files registered in the best 10 folder is performed. The favorite folder which will be described later may be displayed when a music file is registered in the folder but it may not be displayed when no music file is registered.

The "random" folder is displayed as a folder next to the "best 10" folder. It is assumed that, when this "random" folder is selected and executed, reproduction of all music files is started such that the order of reproduction from the first file to the last file is randomly designated. It is then assumed that, when reproduction of the last designated music file ends, reproduction is continued in such a manner that the order of reproduction is again randomly designated. When the "random" folder is selected, random reproduction is carried out but the order of reproduction is designated. Therefore, reproduction can be repeated from a music file that was once reproduced. In addition, in an example where reproduction of the last designated music file ends and then the order of next reproduction is randomly designated, in case that the last designated music file happens to be the same as the first music file in subsequent reproduction, processing for setting the order of reproduction again is performed. As a result of this processing, successive reproduction of the same music piece can be suppressed and stress imposed on the user can be suppressed. In addition, it is assumed that, when the "random" folder is selected, reproduction processing is automatically started and hence a reproduction operation selection screen 203 which will be described later is displayed.

Here, for example, subsequent to "best 10", the "random" folder, a "memories" folder and a "collection" folder that are other favorite folders are sequentially displayed, however, the order of display is not particularly limited as such and a manner of display can freely be set. For example, the "random" folder and "best 10" may be displayed with their positions being interchanged. For example, when an initial position of cursor 220 is on the "random" folder, the reproduction processing above is automatically started. Therefore, music data can be reproduced without any selection by the user.

Another music reproduction folder list selection screen 201 according to certain example embodiments will be described with reference to FIG. 5.

Figure 5:
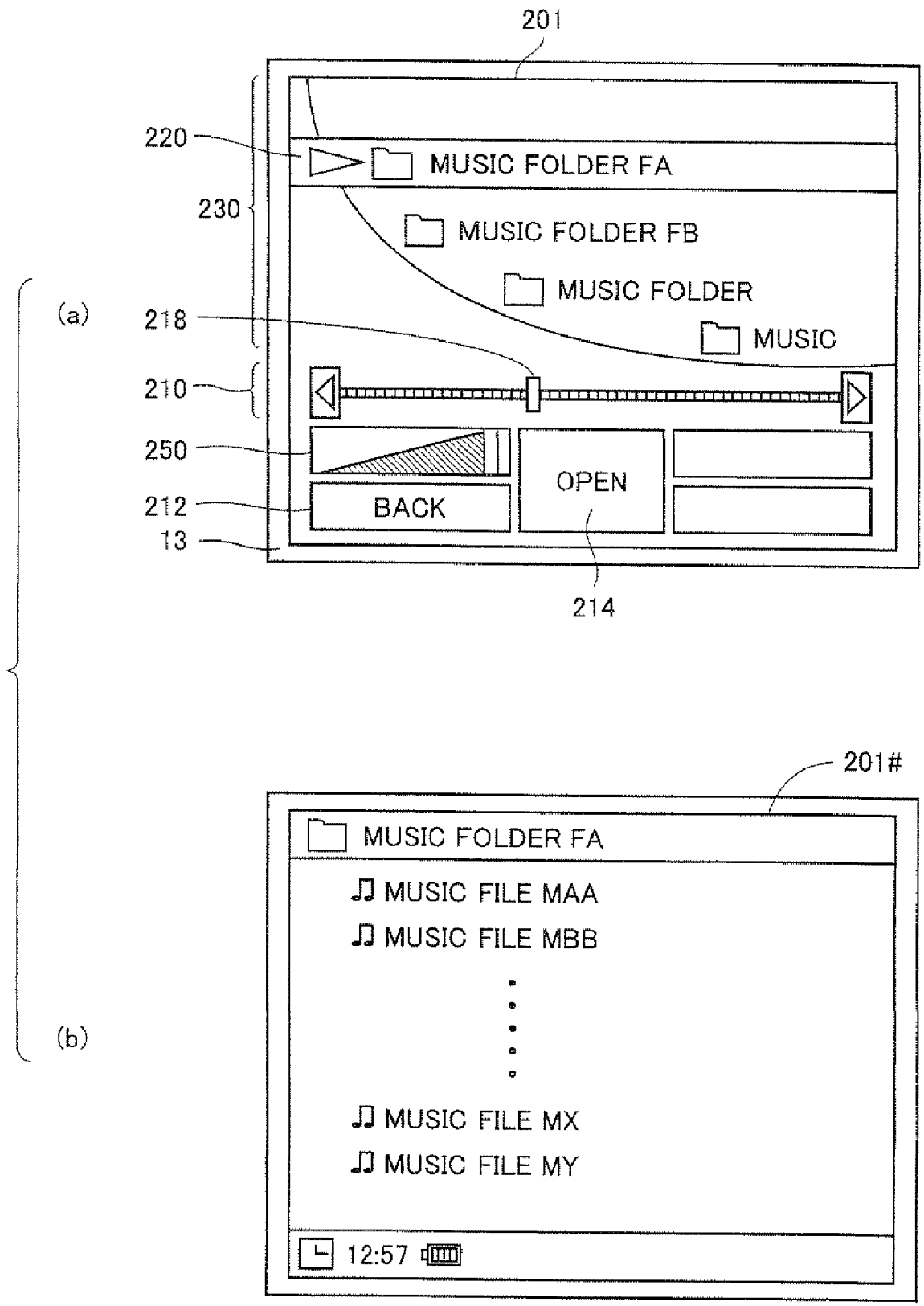
FIG. 5 is a diagram illustrating another music reproduction folder list selection screen 201 according to the embodiment.

FIG. 5(*a*) shows a case where music reproduction folder list selection screen 201 is displayed on lower LCD 12.

In addition, in FIG. 5(*b*), a list screen 201# of music files included in the currently selected folder is displayed on the screen of upper LCD 22.

Figure 4:
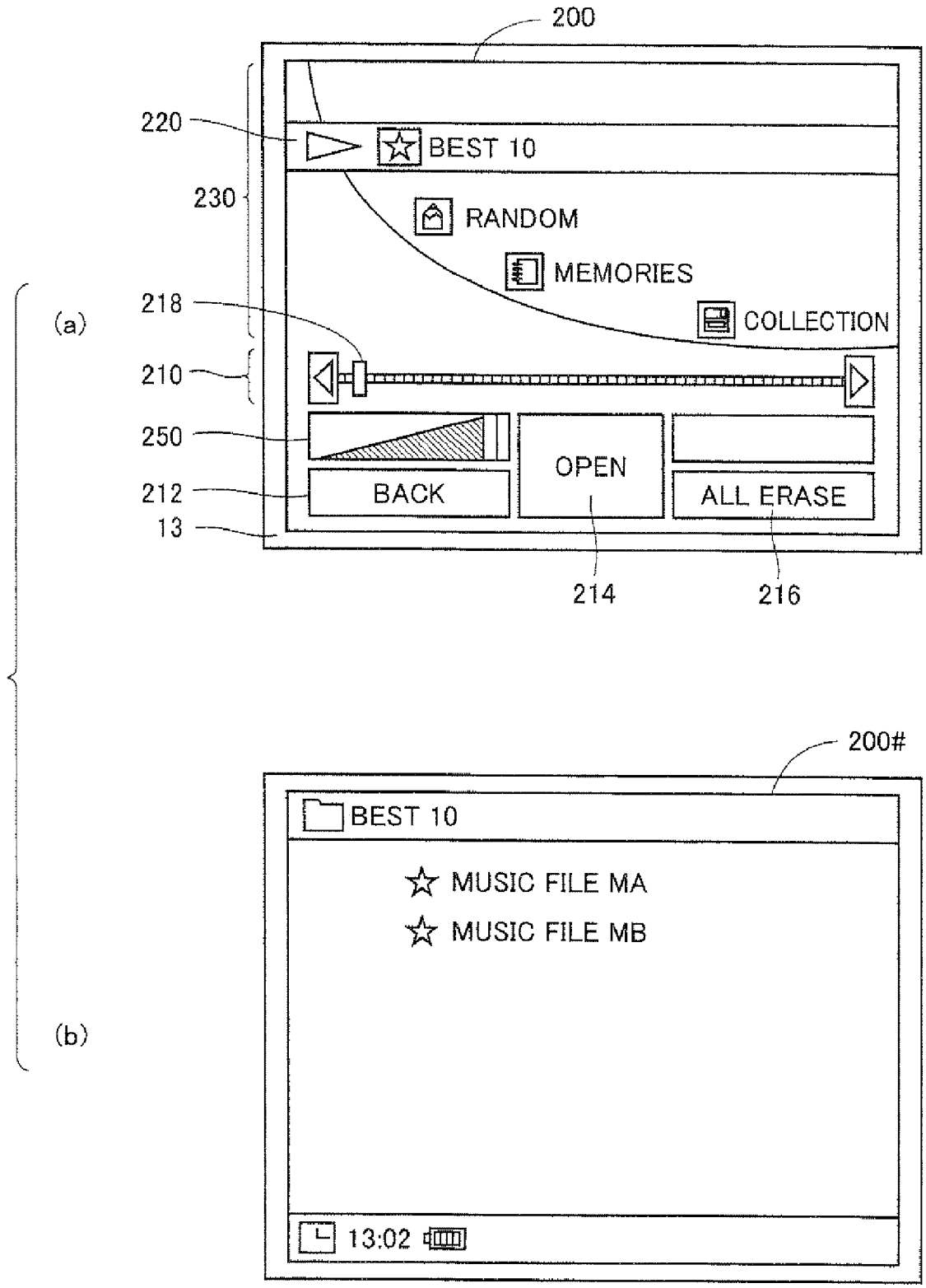
FIG. 4 is a diagram illustrating a music reproduction folder list selection screen 200 according to the embodiment.

For example, a case where the user uses touch pen 27 etc. to attain scroll display of the folder list in folder list display range 230 in FIG. 4(*a*) is shown.

Specifically, for example, the touch pen is moved while it keeps touching the screen in folder list display range 230 (slide operation), so that the folder list is updated in accordance with the trail of movement.

Therefore, FIG. 5(*a*) shows a case where the position of slider 218 on folder list scroll bar 210 has moved from the initial position.

In addition, list screen 201# in FIG. 5(*b*) shows that a music folder FA is selected with cursor 220 and a plurality of music files are stored in this music folder FA. As other features are as described in connection with FIG. 4, detailed description thereof will not be repeated.

As the favorite folder such as "best 10", the "random" folder and the like and the music folders are displayed in parallel in the same folder list display range 230, a folder to be designated can be grasped at a glance and user's operability in selection from the folder list is improved.

FIG. 4(*a*) shows by way of example a case that "best 10", "memories" and "collection" are provided as the favorite folders. In addition to the folders above, though not shown, a "practice" folder and a folder that can be displayed in a special manner in accordance with user's preference can also be provided. For example, such a "secret" folder that only first several characters of a music file included in the folder are displayed and remaining characters are not shown (hidden) may be provided. Registration of this folder will be described later.

A music file selection screen 202 according to certain example embodiments will be described with reference to FIG. 6.

Figure 6:
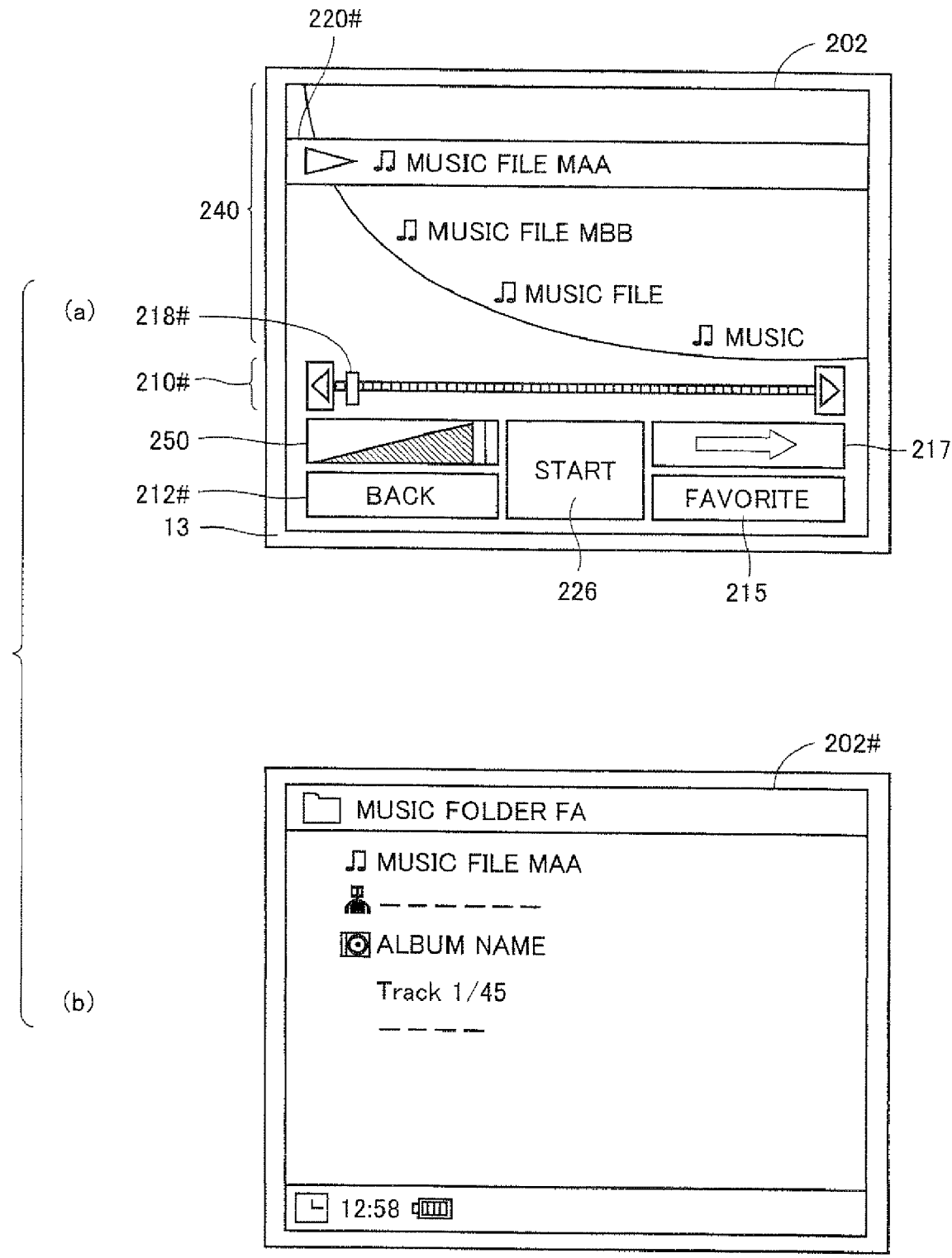
FIG. 6 is a diagram illustrating a music file selection screen 202 according to the embodiment.

Referring to FIG. 6(*a*), a music file list 240 is displayed on the screen of lower LCD 12.

When "open" icon 214 is selected in the preceding music reproduction folder list selection screen, the list of music files included in the selected music folder is displayed.

In addition, the user can move a slider 218# on a file list scroll bar 210# on the screen of lower LCD 12, by using touch pen 27 etc.

By moving the slider on file list scroll bar 210#, the file list displayed in the file list selection screen is scrolled and the list of music files in accordance with the cursor position is displayed.

Moreover, by selecting the selection function icon in FIG. 6(*a*), the user can perform the function corresponding to the selection function icon. It is assumed that display and setting of the selection function icon are switched in correspondence with the folder currently selected by cursor 220#. Here, a selection function icon 215 of "favorite" is provided. When selection function icon 215 of "favorite" is selected, a favorite folder selection screen is displayed.

A favorite folder selection screen 209 according to certain example embodiments will be described with reference to FIG. 44.

Figure 44:
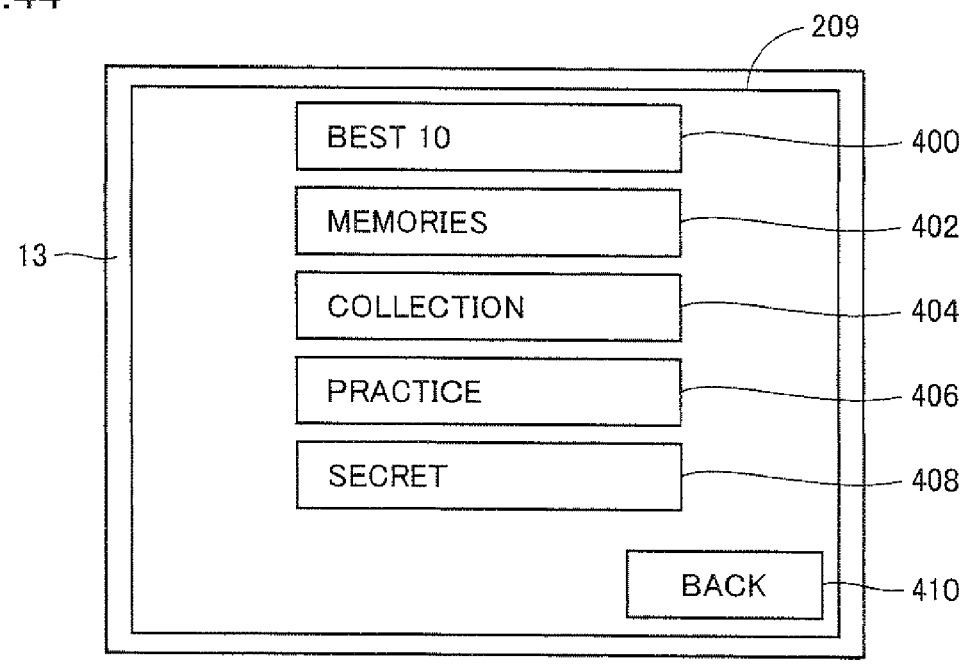
FIG. 44 is a diagram illustrating a favorite folder selection screen 209 according to the embodiment.

Referring to FIG. 44, a case where a "best 10" registration icon 400, a "memories" registration icon 402, a "collection" registration icon 404, a "practice" registration icon 406, and a "secret" registration icon 408 that are favorite folders are provided on the screen of lower LCD 12 is shown.

The user selects any of the registration icons above in favorite folder selection screen 209, so that a music file selected with cursor 220# in FIG. 6(*a*) above is registered in the selected folder and displayed.

When a "back" icon 410 is selected, music file selection screen 202 which is the preceding screen is displayed.

Referring again to FIG. 6(*a*), a reproduction mode switching icon 217 is provided in music file selection screen 202.

In addition, the user can make switching among reproduction modes in the folder based on selection of reproduction mode switching icon 217. Specifically, switching among a reproduction mode in which a music file being reproduced is repeatedly reproduced, a reproduction mode in which music files are sequentially reproduced and reproduction is repeated from the beginning when reproduction is completed, a reproduction mode in which music files are sequentially reproduced and reproduction is stopped when reproduction is completed, a reproduction mode in which random reproduction is performed, and a reproduction mode in which only a set section is repeatedly reproduced can sequentially be made for execution.

In addition, information on the selected music folder is displayed in screen 202# on upper LCD 22 in FIG. 6(*b*).

In FIG. 6(*a*), the user selects a "start" icon 226 to perform the operation of reproducing the music file selected with cursor 220#, and the reproduction operation selection screen is displayed.

Reproduction operation selection screen 203 according to certain example embodiments will be described with reference to FIG. 7.

Figure 7:
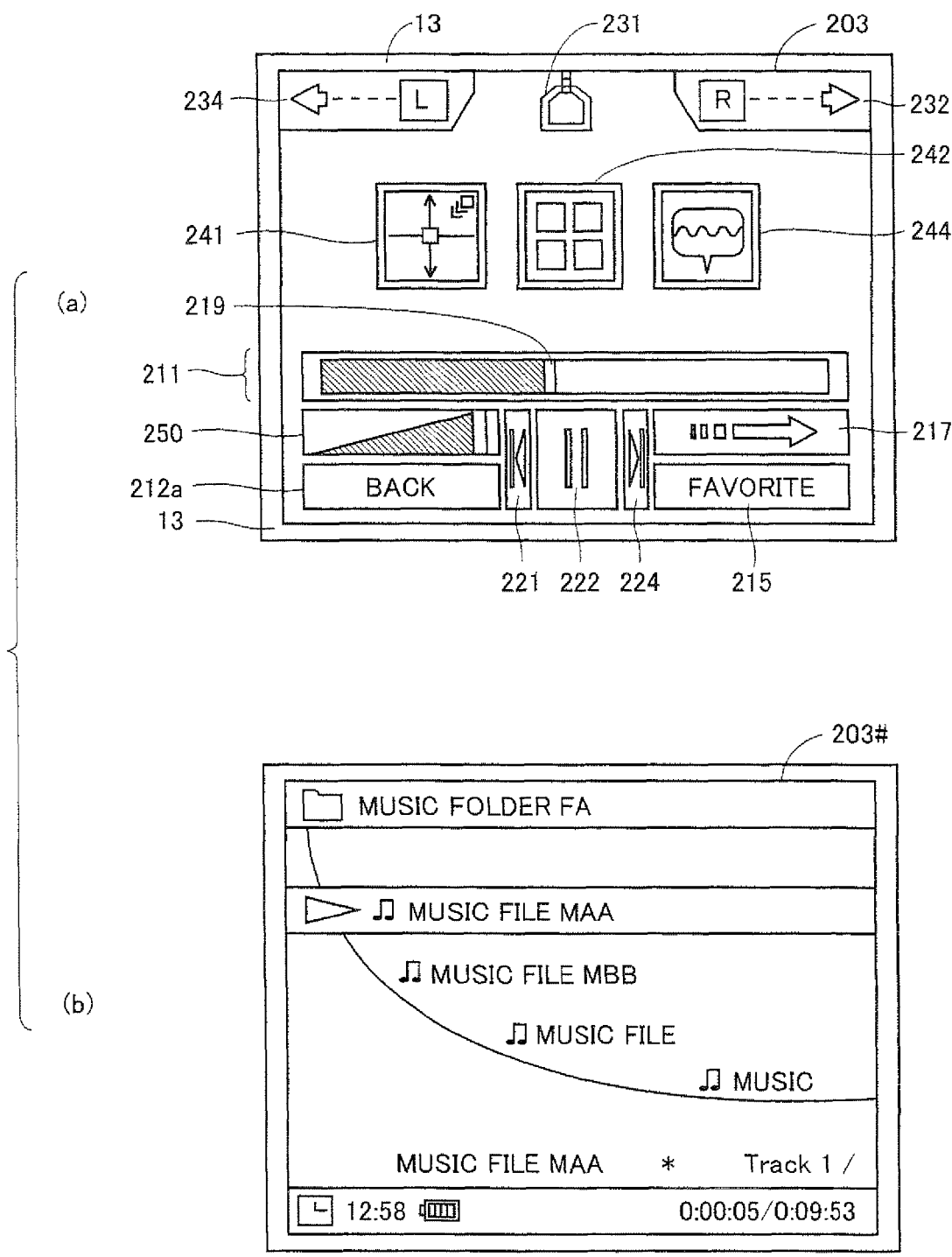
FIG. 7 is a diagram illustrating a reproduction operation selection screen 203 according to the embodiment.

FIG. 7(*a*) shows a case where reproduction operation selection screen 203 for allowing an operation with music being modified in the reproduction operation or the like is displayed on lower LCD 12.

Specifically, for example, the user can switch between sound effects output from a speaker or the like by operating R button 14J and L button 14I after selection of a sound effect selection icon 232, 234 with the touch pen etc.

In addition, the user can perform the function to vary a reproduction speed or a key of a reproduction signal by selecting a speed and key adjustment icon 241.

Moreover, the user can perform the function of change to another tone by modulating a frequency of the reproduction signal or performing filtering processing or the like, by selecting a tone adjustment icon 242.

Further, the user can perform the function to output as sound effect from the speaker, a recording data file created by recording voice and sound which will be described later, by selecting a recording data selection icon 244.

In addition, it is assumed that a slider 219 moves in accordance with a reproduction position in a total duration of the music file within the display range of a reproduction time bar. When the user touches a position within the display range of reproduction time bar 211 with touch pen 27 etc., processing for reproducing the music file can be started from the time corresponding to the touch position. Here, it is assumed that slider 219 moves to the position where the reproduction processing is started. By selecting slider 219 with touch pen 27 etc. and performing the slide operation, the reproduction processing may be started from the position resulting from the slide operation.

In addition, the user can cause the music file being reproduced to pause, by selecting a pause command icon 222. Moreover, the user can select a next music file included in the folder to perform the reproduction operation thereof, by selecting a next music selection command icon 224. Further, the user can select a previous music file included in the folder to perform the reproduction operation thereof, by selecting a previous music selection command icon 221.

In addition, the user can perform visualizer display processing which will be described later, by pressing a visualizer switching icon 231.

In addition, the user can make switching among reproduction modes in the folder by pressing reproduction mode switching icon 217. Specifically, switching among the reproduction mode in which a music file being reproduced is repeatedly reproduced, the reproduction mode in which music files are sequentially reproduced and reproduction is repeated from the beginning when reproduction is completed, the reproduction mode in which music files are sequentially reproduced and reproduction is stopped when reproduction is completed, the reproduction mode in which random reproduction is performed, and the reproduction mode in which only a set section is repeatedly reproduced can sequentially be made for execution.

In addition, by pressing "favorite" icon 215, the user can have favorite folder selection screen 209 as described in connection with FIG. 44 displayed. As described above, by selecting any of the registration icons in favorite folder selection screen 209, the currently reproduced music file can be registered in the selected folder and displayed.

FIG. 7(*b*) shows a case where music file list 240 displayed on the screen of lower LCD 12 in FIG. 6(*a*) is displayed on the screen of upper LCD 22 as a music file selection list screen 203#. A music file included in the same folder where the music file being reproduced is included can be selected by operating direction input button 14A. Specifically, after the music file is selected with the touch pen etc. on the screen of lower LCD 12 in FIG. 6(*a*) (start is pressed), on the screen of lower LCD 12 in FIG. 7(*a*), processing relating to the operation for reproducing the music file selected with the touch pen etc. is selected in the reproduction operation selection screen with the touch pen etc., and on the screen of upper LCD 22, a music file can be selected with direction input button 14A.

For example, by using direction input button 14A to select the music file and pressing any of operation buttons 14B to 14E, the music file being reproduced is switched to the selected music file and the reproduction operation thereof can be performed.

Therefore, the processing in reproduction operation selection screen 203 on lower LCD 12 and the processing in music file selection list screen 203# on upper LCD 22 can be performed in parallel, which contributes to convenience of the user.

Detailed processing of the sound function according to certain example embodiments will be described hereinafter.

A processing procedure relating to the "sound function" according to the present embodiment described above will be described with reference to the following flow. It is noted that each step is implemented representatively by reading of a program or the like stored in memory card 29 to main memory 32 and execution thereof by CPU 31.

<Function Selection Processing>

Processing relating to function selection in game device 1 according to certain example embodiments will be described with reference to FIG. 8. It is noted that the flow shown in FIG. 8 illustrates the processing in sound selection screen 100 in FIG. 3.

Figure 8:
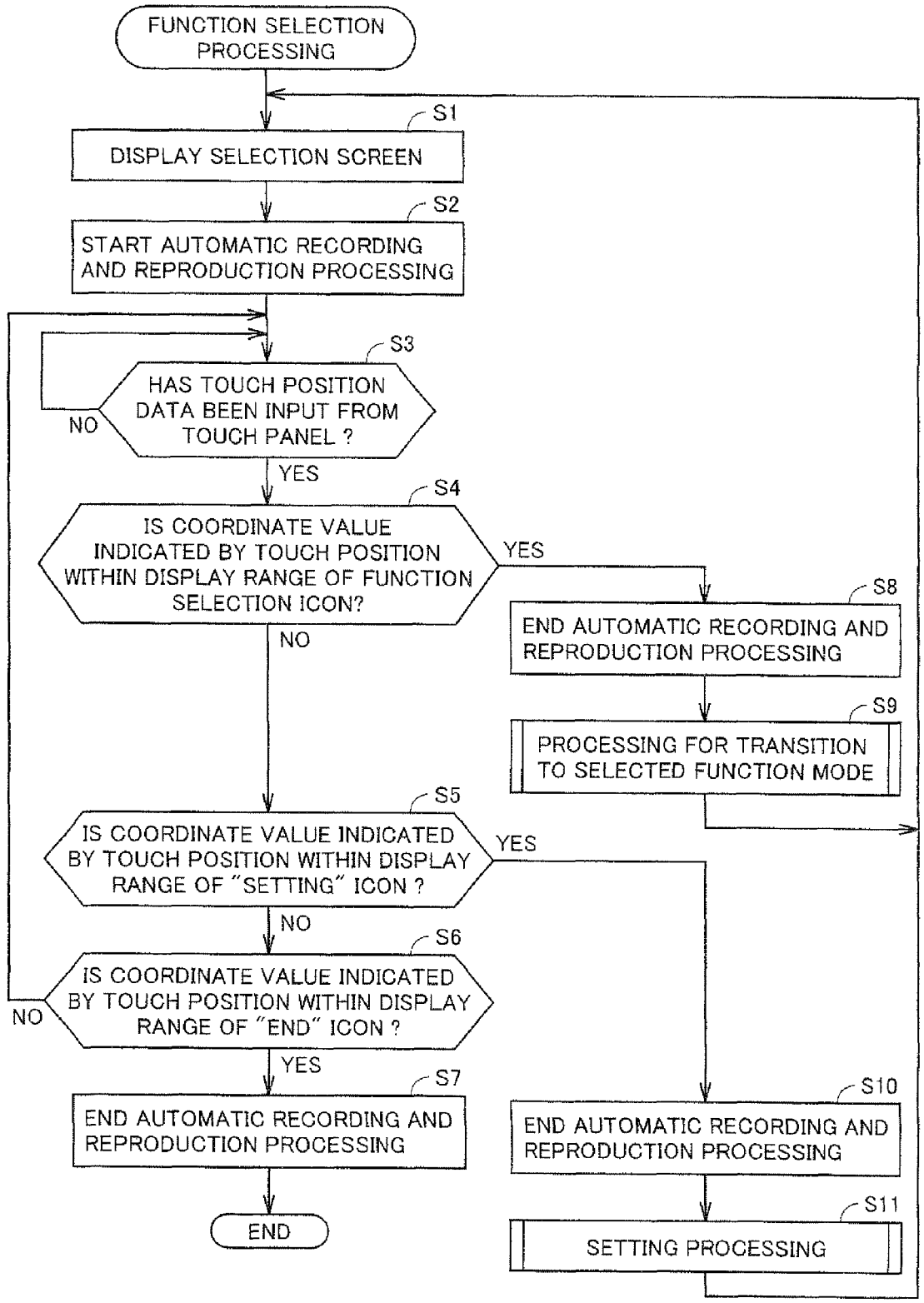
FIG. 8 is a flowchart illustrating processing relating to function selection in game device 1 according to the embodiment.

Referring to FIG. 8, when the power of game device 1 is turned on or the start button is pressed and thereafter the user selects a prescribed icon in a not-shown menu screen, the sound function is performed.

In step S1, CPU 31 causes lower LCD 12 to display sound selection screen 100 as shown in FIG. 3.

Thereafter, CPU 31 starts automatic recording and reproduction processing (step S2). The automatic recording and reproduction processing will be described later. It is noted that steps S1 and S2 may be interchanged.

Thereafter, CPU 31 determines whether data of the touch position has been input from touch panel 13 or not (step S3). CPU 31 determines whether or not the touch position data has been input from touch panel 13 through I/F circuit 42. Namely, CPU 31 determines whether a touch operation with touch pen 27 etc. by the user has been performed or not. When the touch position data has not been input (NO in step S3), the processing in step S3 is repeated.

On the other hand, when the touch position data has been input (YES in step S3), the process proceeds to step S4.

In step S4, CPU 31 determines whether the coordinate value indicated by the touch position data is within a display range of the function selection icon or not. Specifically, CPU 31 determines which of "play with sound recorded through microphone" icon 102 or "play with music in SD card" icon 104 has been selected.

Then, when the coordinate value indicated by the touch position data is within the display range of "play with sound recorded through microphone" icon 102 or "play with music in SD card" icon 104 (YES in step S4), the process proceeds to step S8.

On the other hand, when the coordinate value indicated by the touch position data is out of the display range of "play with sound recorded through microphone" icon 102 or "play with music in SD card" icon 104 (NO in step S4), the process proceeds to step S5.

When CPU 31 determines in step S4 that the coordinate value indicated by the touch position is within the display range of the function selection icon, the processing for automatic recording and reproduction processing ends (step S8).

Then, CPU 31 performs processing for transition to a next selected function mode (step S9). The processing for transition to the selected function mode will be described later.

On the other hand, when CPU 31 determines in step S4 that the coordinate value indicated by the touch position is not within the display range of the function selection icon, CPU 31 then determines whether the coordinate value indicated by the touch position is within the display range of "setting" icon 108 or not (step S5).

When CPU 31 determines in step S5 that the coordinate value indicated by the touch position is within the display range of "setting" icon 108, the automatic recording and reproduction processing ends (step S10).

Thereafter, CPU 31 performs the setting processing (step S11). The setting processing will be described later.

On the other hand, when CPU 31 determines in step S5 that the coordinate value indicated by the touch position is not within the display range of "setting" icon 108, CPU 31 then determines whether the coordinate value indicated by the touch position is within the display range of "end" icon 106 or not (step S6).

When CPU 31 determines in step S6 that the coordinate value indicated by the touch position is within the display range of "end" icon 106, the automatic recording and reproduction processing ends and the function selection processing ends (end). Namely, the screen thus returns to the not-shown menu screen.

On the other hand, when the coordinate value indicated by the touch position is not within the display range of "end" icon 106 in step S6, the process returns to step S3.

Sub routine processing of the processing for transition to a selection function mode in FIG. 8 will be described with reference to FIG. 9.

Figure 9:
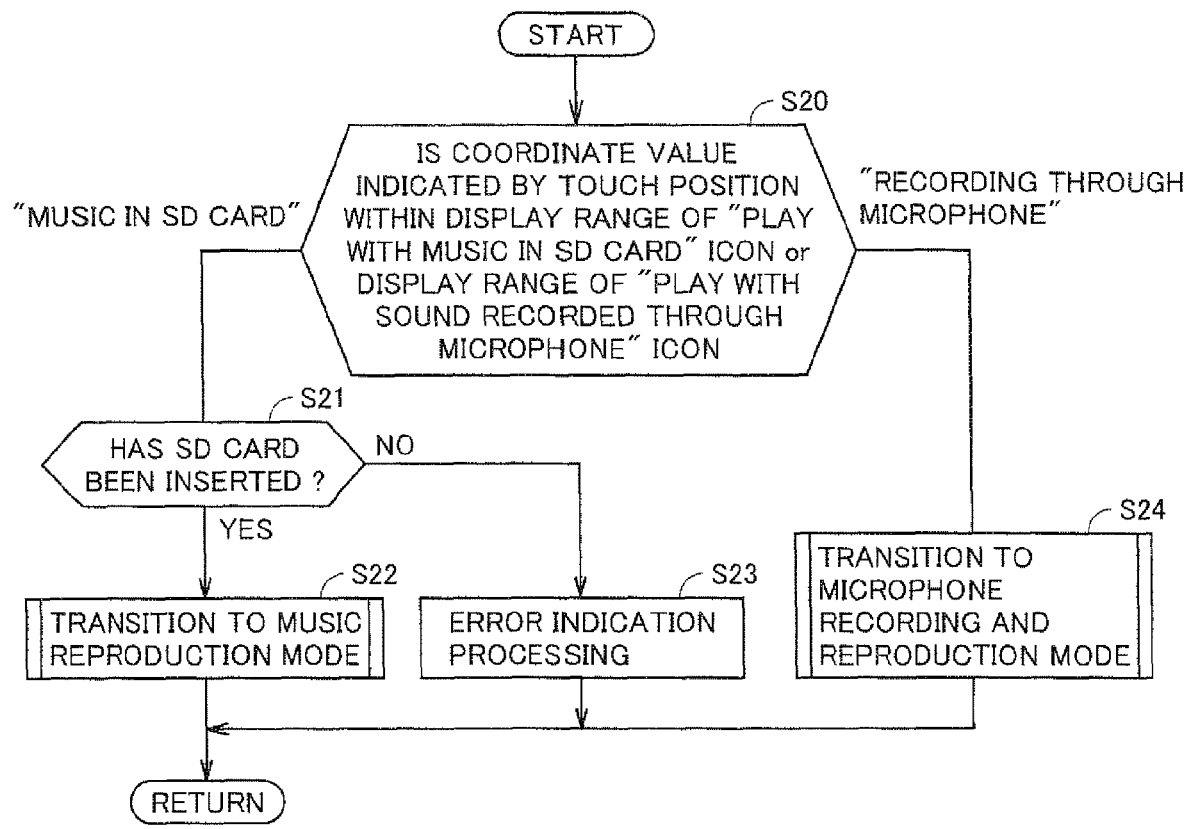
FIG. 9 is a flowchart illustrating sub routine processing of the processing for transition to a selection function mode in FIG. 8.

Referring to FIG. 9, CPU 31 determines whether the coordinate value indicated by the touch position is within the display range of "play with music in SD card" icon 104 or "play with sound recorded through microphone" icon 102 (step S20).

When the coordinate value indicated by the touch position is within the display range of "play with music in SD card" icon 104, the process proceeds to step S21.

Then, CPU 31 determines whether the SD card has been inserted or not (step S21). When CPU 31 determines that the SD card has been inserted, transition to the music reproduction mode is then made (step S22). The music reproduction mode will be described later. When the music reproduction mode ends, the screen again returns to the sound selection screen in step S1 in FIG. 8 (return).

On the other hand, when CPU 31 determines in step S21 that the SD card has not been inserted, CPU 31 performs error indication processing (step S23). The error indication processing is processing for performing processing for indicating, for example, that an "SD card is not inserted" or the like and urging the user to insert the SD card. Then, the process again returns to step S1 (return).

On the other hand, when CPU 31 determines in step S20 that the coordinate value indicated by the touch position is within the display range of "play with sound recorded through microphone" icon 102, transition to the microphone recording and reproduction mode is made (step S24). The microphone recording and reproduction mode will be described later. When the microphone recording and reproduction mode ends, the screen again returns to the sound selection screen in step S1 in FIG. 8 (return).

<Music Reproduction Mode>

The music reproduction mode will now be described.

Sub routine processing in the music reproduction mode will be described with reference to FIG. 10.

Figure 10:
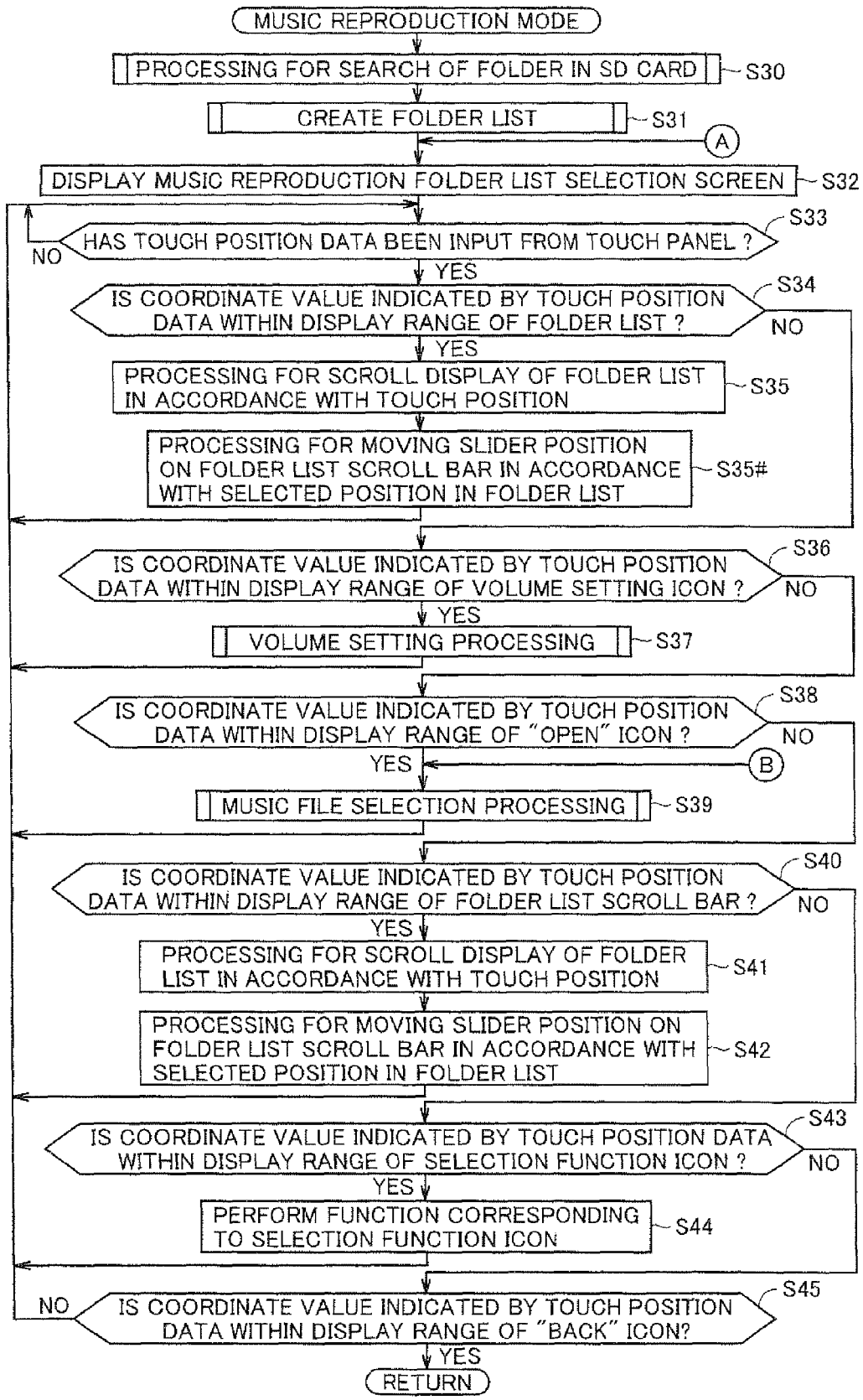
FIG. 10 is a flowchart illustrating sub routine processing in a music reproduction mode.

Referring to FIG. 10, initially, CPU 31 performs processing for search of a folder in an SD card (step S30).

Then, CPU 31 generates the folder list (step S31).

Then, CPU 31 has the music reproduction folder list selection screen displayed (step S32). FIGS. 4 and 5 above show examples of display of music reproduction folder list selection screen 200.

The processing for search of a folder in an SD card will be described here.

Sub routine processing of the processing for search of a folder in an SD card will be described with reference to FIG. 11.

Figure 11:
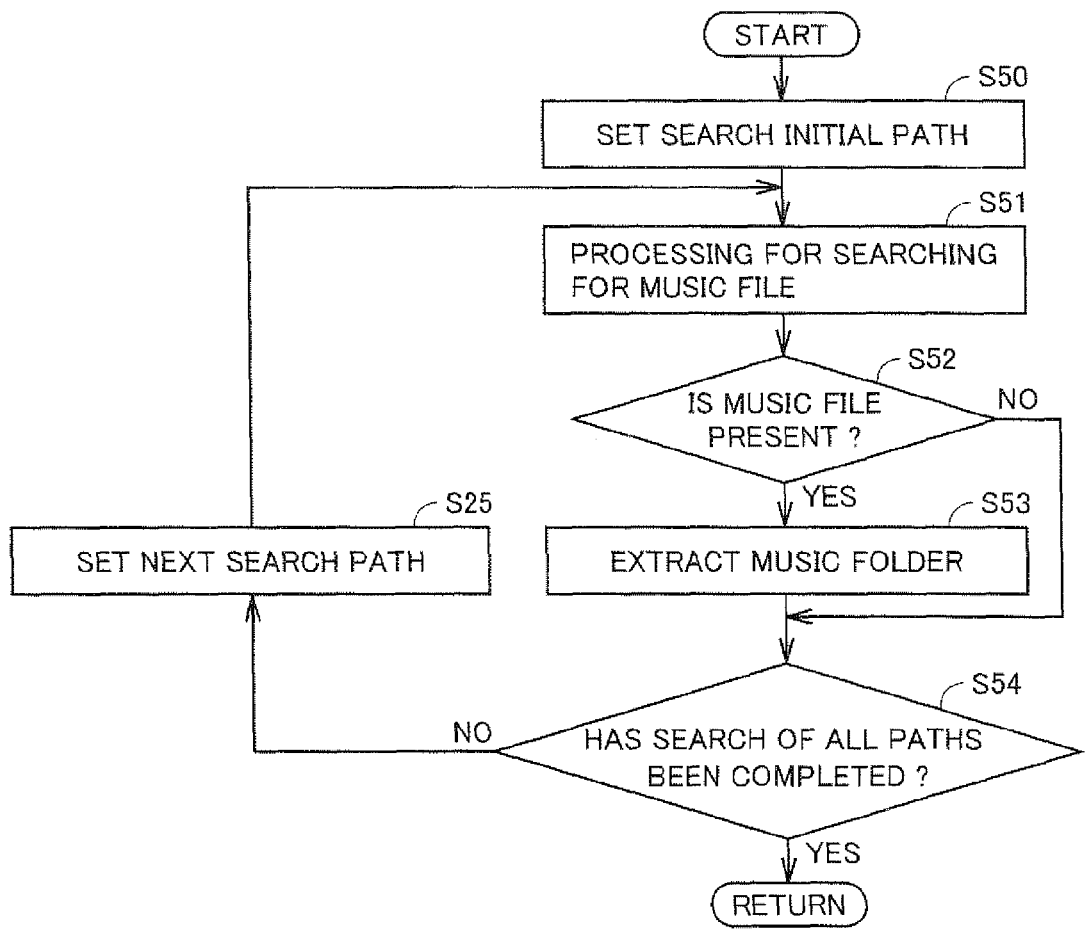
FIG. 11 is a flowchart illustrating sub routine processing of processing for searching a folder in an SD card.

Referring to FIG. 11, CPU 31 sets a search initial path to be first searched, among paths associated with the folders stored in the SD card (step S50). Thereafter, CPU 31 performs processing for searching for a music file in accordance with the search initial path (step S51).

Then, CPU 31 determines whether or not a music file is present in the folder through the processing for search for the music file in accordance with the search initial path (step S52).

When CPU 31 determines in step S52 that the music file is present, the music folder including the music file is extracted (step S53).

Whether the music file is present or not can be determined, for example, by referring to an extension for identifying a file.

Here, determination may also be made by referring to identification information stored in a header or the like of a file, without limited to determination based on the extension, and a determination method is not limited.

Thereafter, CPU 31 determines whether search of all paths has been completed or not (step S54).

When CPU 31 determines in step S54 that search of all paths has not been completed, CPU 31 sets a next search path to be searched next (step S25).

Then, the process returns to step S51 and the processing for searching for the music file which is the processing described above is performed.

The processing in steps S51 to S54 described above is repeated until search of all paths is completed. When CPU 31 determines in step S54 that search of all paths has been completed, the process ends (return).

Thus, all folders in which a music file is present can be extracted from the attached SD card.

Sub routine processing for generating a folder list will be described with reference to FIG. 12.

Figure 12:
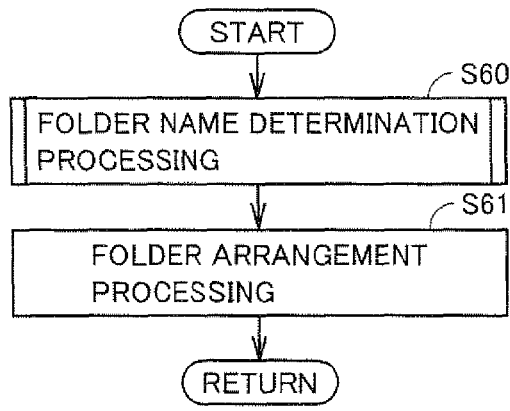
FIG. 12 is a flowchart illustrating sub routine processing for generating a folder list.

Referring to FIG. 12, initially, CPU 31 performs the processing for determining a folder name (step S60). Thereafter, CPU 31 performs the folder arrangement processing (step S61).

Sub routine processing of the processing for determining a folder name will be described with reference to FIG. 13.

Figure 13:
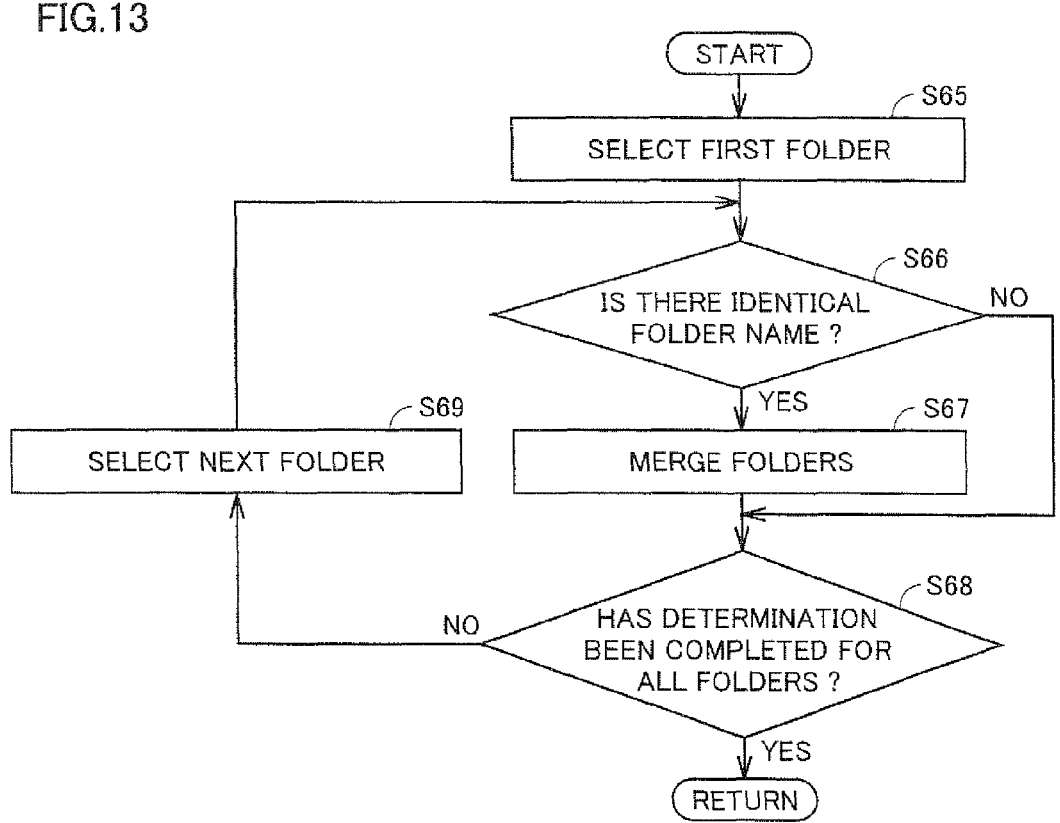
FIG. 13 is a flowchart illustrating sub routine processing of processing for determining a folder name.

Referring to FIG. 13, CPU 31 selects a first folder extracted in the processing for search of the folder in FIG. 11 (step S65). Then, CPU 31 determines whether there is an identical folder name or not (step S66).

When CPU 31 determines in step S66 that there is an identical folder name, CPU 31 merges the folders (step S67).

On the other hand, when CPU 31 determines in step S66 that there is no identical folder, the process proceeds to step S68. CPU 31 determines in step S68 whether or not determination has been completed for all folders extracted in the processing for search of the folder in FIG. 11.

When CPU 31 determines in step S68 that determination has not been completed for all folders, CPU 31 selects a next folder extracted in the processing for search of the folder in FIG. 11 (step S69). Then, the process returns to step S66 and the processing in steps S66 to S69 described above is repeated.

When CPU 31 determines in step S68 that determination has been completed for all folders, the process proceeds to the folder arrangement processing (step S61) in FIG. 12.

Referring again to FIG. 12, in the folder arrangement processing (step S61), the folders or the like merged in the folder name determination processing (step S60) are arranged in accordance with a prescribed order of arrangement based on a name, a symbol, or the like.

Then, the process again returns to FIG. 10 (return).

Referring to FIG. 10, in step S32, in accordance with the order of folders arranged in the folder arrangement processing (step S61), the folder list is displayed on the music reproduction folder list selection screen (step S32).

A specific example illustrating the folder search processing will be described with reference to FIG. 14.

Here, for example, a list structure of music files and folders stored in one SD card is shown.

Figure 14:
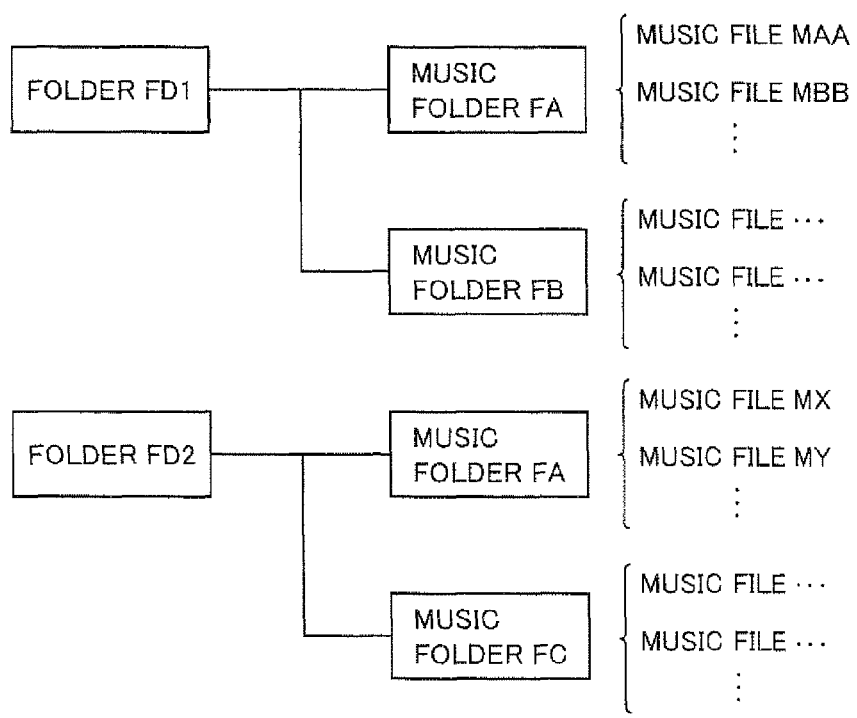
FIG. 14 is a diagram illustrating a specific example illustrating folder search processing.

Referring to FIG. 14, specifically, for example, a case where a folder FD1 and a folder FD2 are provided and music folder FA and music folder FB are provided in folder FD1 is shown.

Then, a case where a music file MAA, a music file MBB, . . . are included in music folder FA is shown.

In addition, a case where a music file . . . are included in music folder FB is shown.

A case where music folder FA and a music folder FC are provided in folder FD2 is shown.

Then, a case where music files MX, MY are included in music folder FA is shown.

In addition, a case where a music file . . . are included in music folder FC is shown.

In a case where folders having such a tree structure are stored in the SD card, four music folders of music folders FA, FB, FA, FC storing music files are extracted in the processing in accordance with the flow described in connection with FIG. 11.

In the processing in accordance with the flow described in connection with FIG. 13, as music folder FA stored in folder FD1 and music folder FA stored in folder FD2 have the same folder name, music files stored in respective music folders FA are merged. As a result of such merging, in the example described above, music file MAA, music file MBB, . . . , music file MX, music file MY, . . . are displayed in a list as music files belonging to music folder FA, in music file list screen 201# as illustrated in FIG. 5(b) or music file selection list screen 203# as illustrated in FIG. 7(b).

In this processing, merging is carried out based on the same folder name, whereby the folder list is displayed on the folder list selection screen. Thus, if folders having the same name are present in the attached memory card (SD card), display in a list as belonging to the same group is provided. Therefore, no disadvantageous condition in folder extraction processing due to a folder configuration in the SD card, such as presence of a plurality of identical folder names, is caused and convenience can be improved.

In the present embodiment, in order to group music files within the attached memory card (SD card), folder information in the memory card is utilized as it is, without utilizing attribute information of music files (music files present in the same folder are handled as belonging to the same group). In addition, regardless of levels where folders are present, all folders are displayed in parallel (in one level) in music reproduction folder list selection screen 200 or the like. Specifically, in the example of FIG. 14 where music files are present in both of folder FD1 and folder FD2, folder FD1, folder FD2, music folder FA, music folder FB, and music folder FC are displayed in a list in parallel on music reproduction folder list selection screen 200. Thus, in spite of a complicated level configuration in the memory card, for example, even a child or the like representative of the user can readily find a desired music file.

In addition, since the folder name registered in the memory card is directly utilized on music reproduction folder list selection screen 200 or the like as the name of the folder handled as belonging to the same group, the user can readily locate a desired music file and convenience is improved.

In addition, as described previously, in music reproduction folder list selection screen 200, since the name of each folder extracted from the memory card (which also serves as a touch button for display in a list of music files belonging to each folder) and the favorite folder (which also serves as a touch button for display in a list of music files registered as favorite) are displayed in parallel (in one level), an operation to select a folder is facilitated and convenience is further improved. In addition, as the "random" folder is displayed in parallel in such a list, convenience is further improved.

Referring again to FIG. 10, after the music reproduction folder list selection screen is displayed in step S32, CPU 31 then determines whether the touch position data has been input from touch panel 13 or not (step S33). CPU 31 determines whether or not the touch position data has been input from touch panel 13 through I/F circuit 42. Namely, CPU 31 determines whether a touch operation with touch pen 27 by the user has been performed or not. In other words, CPU 31 determines whether the coordinate value input through the user's operation of touch panel 13 is detected or not. When the touch position data has not been input (NO in step S33), the processing in step S33 is repeated.

On the other hand, when the touch position data has been input (YES in step S33), the process proceeds to step S34.

Then, CPU 31 determines whether the coordinate value indicating the touch position data is within the display range of the folder list or not (step S34).

When CPU 31 determines in step S34 that the coordinate value indicated by the touch position data is within the display range of the folder list, CPU 31 performs the processing for scroll display of the folder list in accordance with the trail of movement from the touch position or the touch position with the touch pen (step S35).

Thereafter, CPU 31 performs the processing for moving the slider position on folder list scroll bar 210 in accordance with the position of the selected folder in the folder list (step S35#). Then, the process again returns to step S33. It is noted that the processing in steps S35 and S35# may be interchanged, which is also applicable hereinafter.

In the present example, as the description is given by way of example assuming that the position of cursor 220 is not changed, only the processing for scroll display of the folder list is described. As described above, however, display processing can also be performed such that the position of cursor 220 is moved to a position in accordance with a touch position which is a position touched with touch pen 27.

In this case, when the screen is touched and thereafter an operation to reset the touched state without changing the touch position from the originally touched position is performed (off the screen), only cursor 220 moves in accordance with the touch position. Here, the processing for scroll display of the folder list and the processing for moving the slider position on the folder list scroll bar are not performed.

Meanwhile, when an operation to touch the screen and move touch pen 27 etc. while maintaining the touched state, that is, an operation to change the touch position from the originally touched position while maintaining the touched state (drag operation), is performed, the processing for scroll display of the folder list is performed in accordance with the trail of movement (travel distance) of the touch pen. Here, the processing for moving also the slider position on the folder list scroll bar is performed.

On the other hand, when CPU 31 determines in step S34 that the coordinate value indicated by the touch position data is not within the display range of the folder list, CPU 31 determines whether the coordinate value indicated by the touch position data is within the display range of volume setting icon 250 or not (step S36).

When CPU 31 determines in step S36 that the coordinate value indicated by the touch position data is within the display range of volume setting icon 250, CPU 31 then performs the volume setting processing (step S37). Then, the process again returns to step S33. The volume setting processing will be described later.

When CPU 31 determines in step S36 that the coordinate value indicated by the touch position data is not within the display range of volume setting icon 250, CPU 31 determines whether the coordinate value indicated by the touch position data is within the display range of "open" icon 214 or not (step S38).

When CPU 31 determines in step S36 that the coordinate value indicated by the touch position data is within the display range of "open" icon 214, CPU 31 then performs music file selection processing (step S39). The music file selection processing will be described later.

On the other hand, when CPU 31 determines in step S38 that the coordinate value indicated by the touch position data is not within the display range of "open" icon 214, CPU 31 then determines whether the coordinate value indicated by the touch position data is within the display range of folder list scroll bar 210 or not (step S40).

When CPU 31 determines in step S40 that the coordinate value indicated by the touch position data is within the display range of folder list scroll bar 210, CPU 31 performs the processing for scroll display of the folder list in accordance with the touch position (step S41).

Thereafter, the processing for moving the slider position on folder list scroll bar 210 in accordance with the position of the selected folder in the folder list is performed (step S42). Then, the process again returns to step S33.

On the other hand, when CPU 31 determines in step S40 that the coordinate value indicated by the touch position data is not within the display range of folder list scroll bar 210, CPU 31 then determines whether the coordinate value indicated by the touch position data is within the display range of the selection function icon or not (step S43).

When CPU 31 determines in step S43 that the coordinate value indicated by the touch position data is within the display range of the selection function icon, CPU 31 performs the function corresponding to the selection function icon (step S44).

On the other hand, when CPU 31 determines in step S43 that the coordinate value indicated by the touch position data is not within the display range of the selection function icon, CPU 31 then determines whether the coordinate value indicated by the touch position data is within the display range of "back" icon 212 or not (step S45).

When CPU 31 determines in step S45 that the coordinate value indicated by the touch position data is within the display range of "back" icon 212, the processing in the music reproduction mode ends and the sound selection screen in step S1 in FIG. 8 is displayed.

On the other hand, when CPU 31 determines in step S45 that the coordinate value indicated by the touch position data is not within the display range of "back" icon 212, the process returns to step S33.

Sub routine processing of the processing for selecting a music file will be described with reference to FIG. 15.

Figure 15:
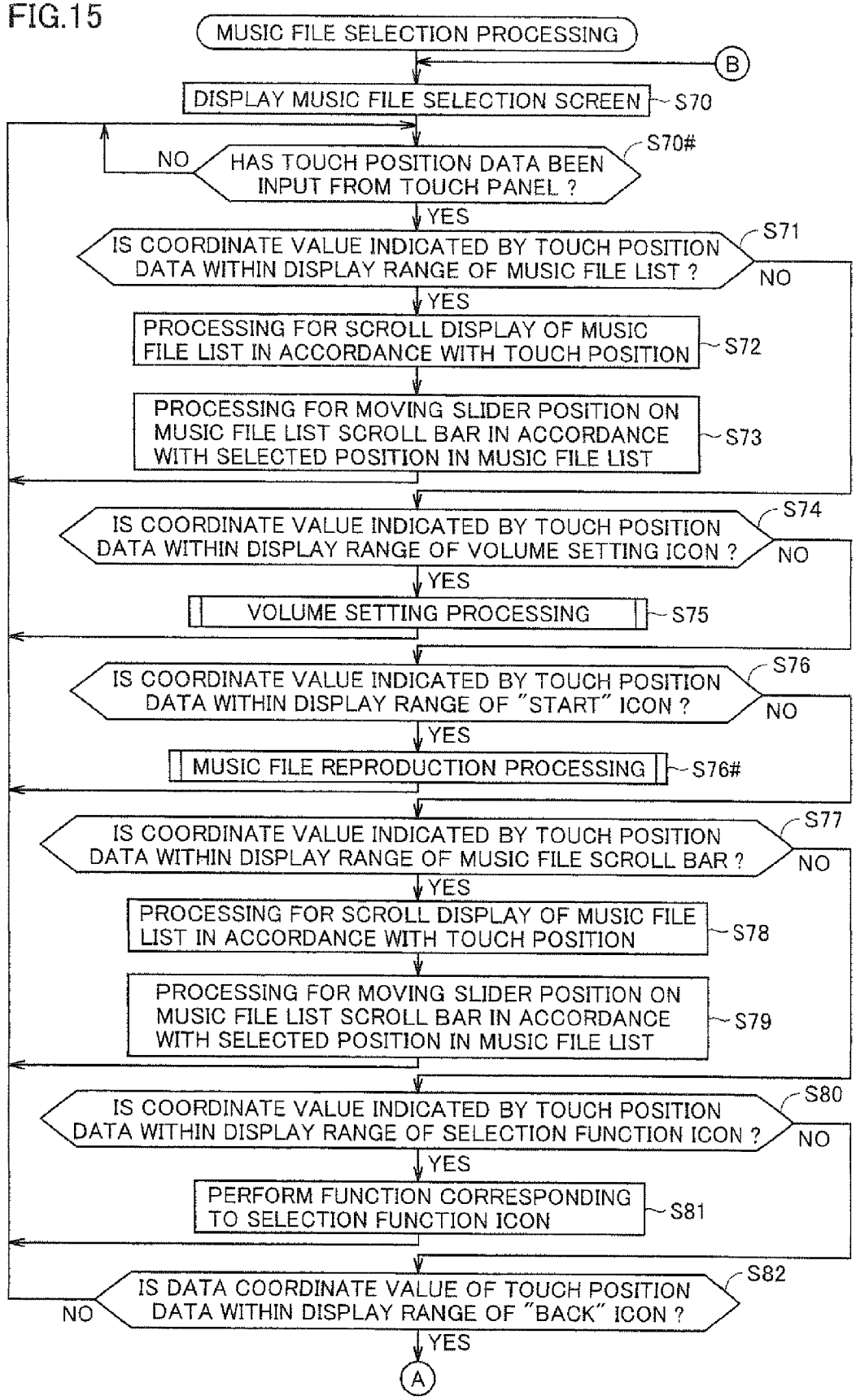
FIG. 15 is a flowchart illustrating sub routine processing of processing for selecting a music file.

Referring to FIG. 15, CPU 31 initially has music file selection screen 202 as described in connection with FIG. 6 displayed (step S70).

CPU 31 then determines whether the touch position data has been input from touch panel 13 or not (step S70#). CPU 31 determines whether or not the touch position data has been input from touch panel 13 through I/F circuit 42. Namely, CPU 31 determines whether a touch operation with touch pen 27 by the user has been performed or not. In other words, CPU 31 determines whether the coordinate value input through the user's operation of touch panel 13 is detected or not. When the touch position data has not been input (NO in step S70#), the processing in step S70# is repeated.

On the other hand, when the touch position data has been input (YES in step S70#), the process proceeds to step S71.

Then, CPU 31 determines whether the coordinate value indicated by the touch position data is within the display range of music file list 240 or not (step S71).

When CPU 31 determines in step S71 that the coordinate value indicated by the touch position data is within the display range of music file list 240, CPU 31 performs the processing for scroll display of music file list 240 in accordance with the touch position (step S72).

Thereafter, CPU 31 performs the processing for moving the slider position on music file list scroll bar 210# in accordance with the position of the selected music file in the music file list (step S73). Then, the process again returns to step S70#.

On the other hand, when CPU 31 determines in step S71 that the coordinate value indicated by the touch position data is not within the display range of music file list 240, CPU 31 then determines whether the coordinate value indicated by the touch position data is within the display range of volume setting icon 250 or not (step S74). When CPU 31 determines in step S74 that the coordinate value indicated by the touch position data is within the display range of volume setting icon 250, CPU 31 performs the volume setting processing (step S75). Then, the process again returns to step S70#. The volume setting processing will be described later.

When CPU 31 determines in step S74 that the coordinate value indicated by the touch position data is not within the display range of volume setting icon 250, CPU 31 determines whether the coordinate value indicated by the touch position data is within the display range of "start" icon 226 (step S76).

When CPU 31 determines in step S76 that the coordinate value indicated by the touch position data is within the display range of "start" icon 226, CPU 31 performs the music file reproduction processing (step S76#). The music file reproduction processing will be described later.

On the other hand, when CPU 31 determines in step S76 that the coordinate value indicated by the touch position data is not within the display range of "start" icon 226, CPU 31 then determines whether the coordinate value indicated by the touch position data is within the display range of music file list scroll bar 210# or not (step S77).

When CPU 31 determines in step S77 that the coordinate value indicated by the touch position data is within the display range of music file list scroll bar 210#, CPU 31 performs the processing for scroll display of music file list 240 in accordance with the touch position data (step S78).

Thereafter, CPU 31 performs the processing for moving the slider position on music file list scroll bar 210# in accordance with the position of the selected music file in the music file list (step S79). Then, the process again returns to step S70#.

On the other hand, when CPU 31 determines in step S77 that the coordinate value indicated by the touch position data is not within the display range of music file list scroll bar 210#, CPU 31 then determines whether the coordinate value indicated by the touch position data is within the display range of the selection function icon or not (step S80).

When CPU 31 determines in step S80 that the coordinate value indicated by the touch position data is within the display range of the selection function icon, CPU 31 performs the function corresponding to the selection function icon (step S81). Then, the process again returns to step S70#. For example, when determination that the coordinate value is within the display range of selection function icon 215 of "favorite" is made, favorite folder selection screen 209 described in connection with FIG. 44 above is displayed. By selecting any of the registration icons, processing for registering the music file in the selected folder is performed.

On the other hand, when CPU 31 determines in step S80 that the coordinate value indicated by the touch position data is not within the display range of the selection function icon, CPU 31 then determines whether the coordinate value indicated by the touch position data is within the display range of a "back" icon 212# or not.

When it is determined in step S82 that the coordinate value indicated by the touch position data is within the display range of "back" icon 212#, the process proceeds to "A" and the music reproduction folder list selection screen in step S32 in FIG. 10 is displayed.

Sub routine processing of the processing for reproducing a music file will be described with reference to FIG. 16.

Figure 16:
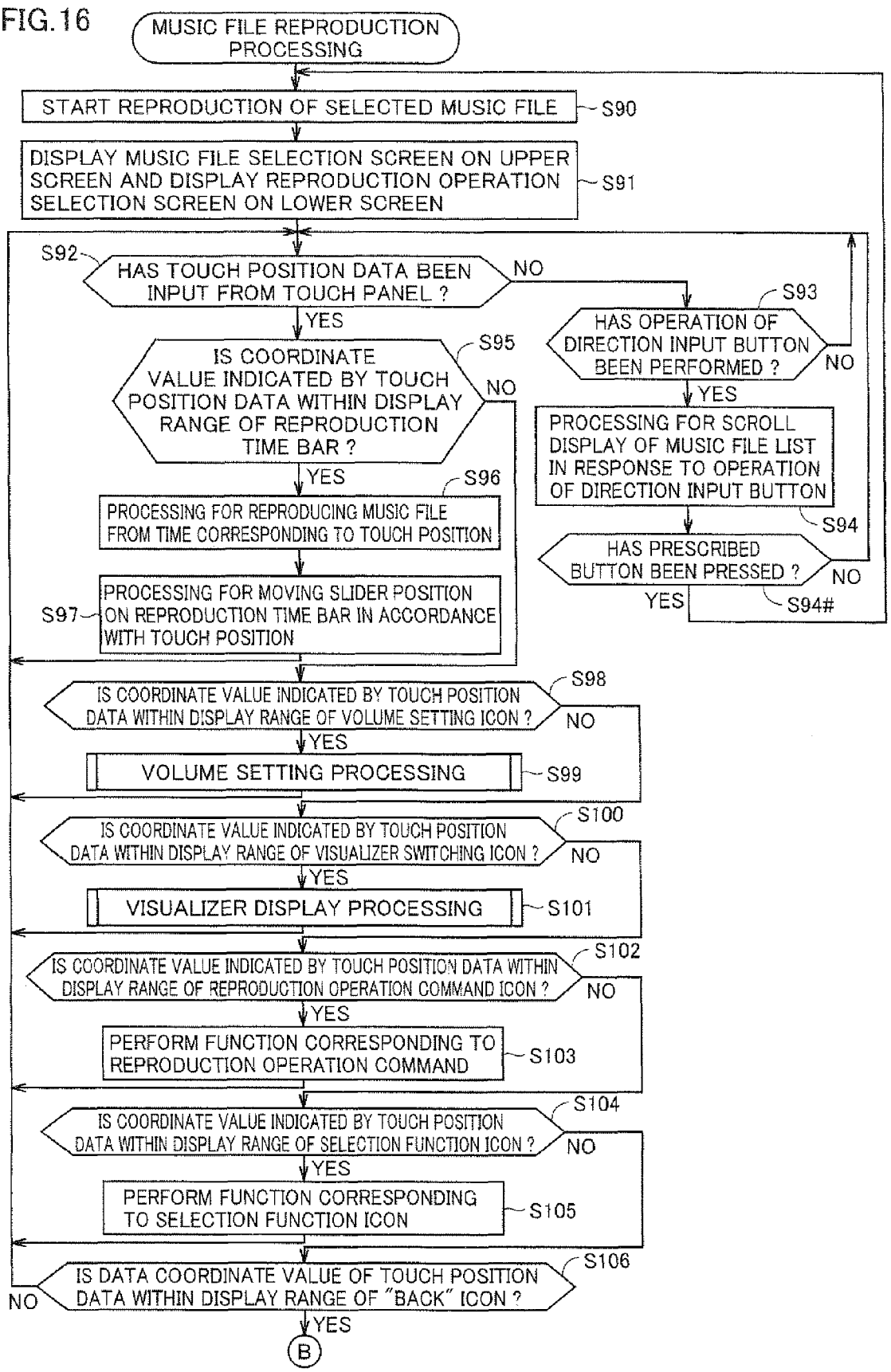
FIG. 16 is a diagram illustrating sub routine processing of processing for reproducing a music file.

Referring to FIG. 16, CPU 31 starts reproduction of the selected music file (step S90).

Thereafter, the music file selection screen is displayed on upper LCD 22 and the reproduction operation selection screen is displayed on lower LCD 12 (step S91).

Thereafter, CPU 31 determines whether the touch position data has been input from touch panel 13 or not (step S92).

When CPU 31 determines in step S92 that the touch position data has not been input from touch panel 13, CPU 31 then determines that the operation of direction input button 14A has been performed or not (step S93).

When CPU 31 determines in step S93 that the operation of direction input button 14A has been performed, CPU 31 performs the processing for scroll display of the music file list selected by the cursor position on the music file selection screen in accordance with the operation of direction input button 14A (step S94).

On the other hand, when CPU 31 determines in step S93 that the operation of direction input button 14A has not been performed, the process again returns to step S92.

Then, CPU 31 determines whether a prescribed button has been pressed or not (step S94#).

When the prescribed button has been pressed in step S94#, CPU 31 starts reproduction of the music file selected by the cursor position (step S90).

As described above, in response to an instruction from CPU 31, audio output control circuit 56 provides output to headphone 18 through headphone amplifier 60 when headphone 18 is connected, and it provides output to speaker 45, 47 through amplifier 44, 46 when headphone 18 is not connected.

When the prescribed button has not pressed in step S94#, the process again returns to step S92. Here, it is assumed that any of operation buttons 14B to 14E is set as the prescribed button.

When the touch position data has been input from touch panel 13 in step S92, CPU 31 then determines whether the coordinate value indicated by the touch position data is within the display range of reproduction time bar 211 or not (step S95).

When CPU 31 determines in step S95 that indication by the touch position data is within the display range of reproduction time bar 211, CPU 31 performs the processing for reproducing the music file from the time corresponding to the touch position (step S96).

Then, CPU 31 performs the processing for moving the slider position indicating the reproduction position in the total duration of the music file on reproduction time bar 211 in accordance with the touch position (step S97). Then, the process again returns to step S92.

When CPU 31 determines in step S95 that the coordinate value indicated by the touch position data is not within the display range of reproduction time bar 211, CPU 31 then determines whether the coordinate value indicated by the touch position data is within the display range of volume setting icon 250 or not (step S98).

When CPU 31 determines in step S98 that the coordinate value indicated by the touch position data is within the display range of volume setting icon 250, CPU 31 performs the volume setting processing (step S99). Then, the process again returns to step S92. The volume setting processing will be described later.

On the other hand, when CPU 31 determines in step S98 that the coordinate value indicated by the touch position data is not within the display range of volume setting icon 250, CPU 31 then determines whether the coordinate value indicated by the touch position data is within the range of visualizer switching icon 231 or not (step S100).

When CPU 31 determines in step S100 that the coordinate value indicated by the touch position data is within the display range of visualizer switching icon 231, CPU 31 then performs the visualizer display processing (step S101). Then, the process again returns to step S92. The visualizer display processing will be described later.

When CPU 31 determines in step S100 that the coordinate value indicated by the touch position data is not within the display range of visualizer switching icon 231, CPU 31 then determines whether the coordinate value indicated by the touch position data is within the display range of a reproduction operation command icon or not (step S102). Here, pause command icon 222, next music selection command icon 224 and previous music selection command icon 221 are provided by way of example of the reproduction operation command icon.

When CPU 31 determines in step S102 that the coordinate value indicated by the touch position data is within the display range of the reproduction operation command icon, CPU 31 performs the function corresponding to the reproduction operation command (step S103). Then, the process again returns to step S92.

Specifically, when it is determined that the coordinate value indicated by the touch position data is within the display range of pause command icon 222, CPU 31 causes the reproduction operation to pause. Alternatively, when it is determined that the coordinate value indicated by the touch position data is within the display range of next music selection command icon 224, CPU 31 starts reproduction of the next selected music file. On the other hand, when it is determined that the coordinate value indicated by the touch position data is within the display range of previous music selection command icon 221, CPU 31 starts reproduction of the previously selected music file.

When CPU 31 determines in step S102 that the coordinate value indicated by the touch position data is not within the display range of the reproduction operation command icon, CPU 31 then determines that the coordinate value indicated by the touch position data is within the display range of the selection function icon or not.

When CPU 31 determines in step S104 that the coordinate value indicated by the touch position data is within the display range of the selection function icon, CPU 31 then performs the function corresponding to the selection function icon (step S105). Then, the process again returns to step S92. For example, in the present example, "favorite" icon 215, reproduction mode switching icon 217, speed and key adjustment icon 241, tone adjustment icon 242, and recording data selection icon 244 are displayed as the selection function icon.

Specifically, as described above, when CPU 31 determines that the coordinate value indicated by the touch position data is within the display range of "favorite" icon 215, CPU 31 performs the processing for registering the currently selected music file in the favorite folder.

Alternatively, when CPU 31 determines that the coordinate value indicated by the touch position data is within the display range of reproduction mode switching icon 217, CPU 31 switches the setting of the reproduction mode for display.

Alternatively, when CPU 31 determines that the coordinate value indicated by the touch position data is within the display range of speed and key adjustment icon 241, CPU 31 performs the function to change a reproduction speed or a key which will be described later.

Alternatively, when CPU 31 determines that the coordinate value indicated by the touch position data is within the display range of tone adjustment icon 242, CPU 31 performs the function for change to another tone by performing filtering processing for modulating a frequency which will be described later.

Alternatively, when CPU 31 determines that the coordinate value indicated by the touch position data is within the display range of recording data selection icon 244, CPU 31 performs the function to output an audio data file in which sound is recorded from the speaker as sound effect, as will be described later.

When CPU 31 determines in step S104 that the coordinate value indicated by the touch position data is not within the display range of the selection function icon, CPU 31 then determines whether the coordinate value indicated by the touch position data is within the display range of a "back" icon 212a or not (step S106).

When CPU 31 determines in step S106 that the coordinate value indicated by the touch position data is not within the display range of "back" icon 212a, the process returns to step S92.

On the other hand, when CPU 31 determines in step S106 that the coordinate value indicated by the touch position data is within the display range of "back" icon 212a, the process proceeds to "B" and the music file selection screen is displayed in step S70 in FIG. 15.

(Volume Setting Processing)

The volume setting processing will now be described.

An enlarged view of volume setting icon 250 will be described with reference to FIG. 17.

Referring to FIG. 17(a), volume setting icon 250 is provided with a slider 252, for example, of which position on the horizontal axis from left toward right indicates a greater volume.

Slider 252 is displayed at a position in accordance with a current value within a volume level parameter setting range.

Here, a region in a direction of lower volume relative to a position corresponding to the current value, at which slider 252 is displayed, is identified as a volume low region 254, and a region in a direction of higher volume relative to the position corresponding to the current value, at which slider 252 is displayed, is identified as a volume high region 255.

In certain example embodiments, in a case where slider 252 is selected with the touch pen etc., the slider can continuously be operated to move (what is called a drag operation) in any direction toward volume low region 254 and volume high region 255 from the position corresponding to the current value, in accordance with a subsequent touch-and-slide operation (an operation to change the touch position with a touch-on state being maintained).

The case where slider 252 is selected with the touch pen etc. includes (i) a case where slider 252 is touched and (ii) a case where the touch position enters slider 252 during the touch operation. Here, the drag operation of slider 252 may be performed only in the case (i), the drag operation may be performed only in the case (ii), or the drag operation may be performed in either of the case (i) or (ii).

Referring to FIG. 17(b), in a case where volume low region 254 other than slider 252 is touched with the touch pen etc., slider 252 can instantaneously be operated to move to the touch-on position. Thus, change to a volume lower than a current volume value can instantaneously be made. On the other hand, when volume high region 255 other than slider 252 is touched with the touch pen etc., slider 252 is not instantaneously operated to move to the touch-on position. Thus, change to a volume higher than the current volume value cannot instantaneously be made.

The case where volume low region 254 is touched includes (i) a case where somewhere within volume low region 254 is touched and (ii) a case where the touch position enters volume low region 254 during the touch operation. Here, slider 252 may instantaneously be moved to the touch-on position only in the case (i), slider 252 may instantaneously be moved to the touch position only in the case (ii), or slider 252 may instantaneously be moved in either of the case (i) or (ii).

In addition, when volume low region 254 is touched, slider 252 is instantaneously moved to the touch position, and when the slide operation follows, the drag operation as described above can be performed.

Sub routine processing of the volume setting processing according to certain example embodiments will be described with reference to FIG. 18.

Figure 18:
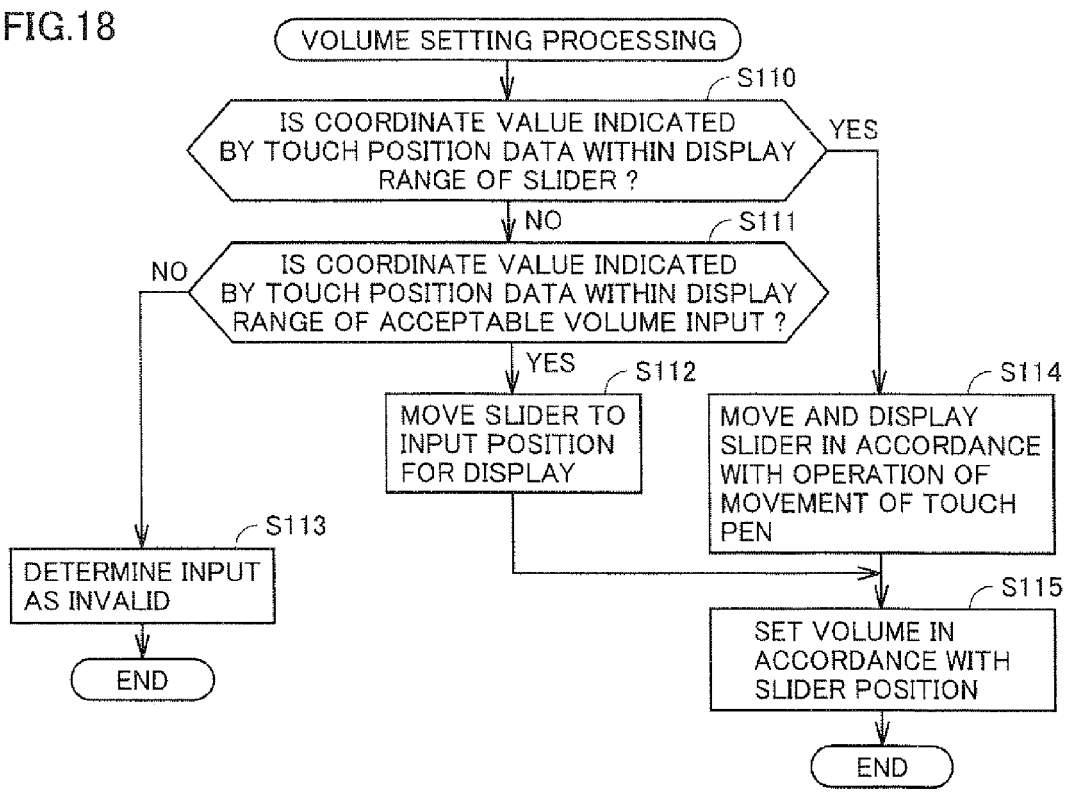
FIG. 18 is a flowchart illustrating sub routine processing of volume setting processing according to the embodiment.

Referring to FIG. 18, when CPU 31 determines that the coordinate value indicated by the touch position data is within the display range of volume setting icon 250, CPU 31 determines whether the coordinate value indicated by the touch position data is within the display range of slider 252 or not (step S110).

When CPU 31 determines in step S110 that the coordinate value indicated by the touch position data is within the display range of the slider, slider 252 is moved to and displayed at the most recent touch position in accordance with the trail of movement of the touch pen that keeps touching the screen (slide operation) (step S114). Namely, a continuous operation of movement of slider 252 from the current position to a desired position within the volume level parameter setting range is accepted.

Then, CPU 31 sets the volume in accordance with the position of slider 252 (step S115). Namely, the volume level parameter is updated to a value in accordance with the position of slider 252 resulting from movement in accordance with a moving operation. In this regard, as slider 252 continuously moves from the current position to the desired position, the volume level parameter is gradually adjusted along with movement.

On the other hand, when CPU 31 determines in step S110 that the coordinate value indicated by the touch position data is not within the display range of slider 252, CPU 31 then determines whether the coordinate value indicated by the touch position data is within the display range of acceptable volume input or not (step S111).

When CPU 31 determines in step S111 that the coordinate value indicated by the touch position data is within the display range of acceptable volume input, slider 252 is moved to and displayed at the position input with the touch pen (step S112). Then, the volume in accordance with the position of slider 252 within the parameter setting range is set (step S115).

On the other hand, when CPU 31 determines in step S111 that the coordinate value indicated by the touch position data is not within the display range of acceptable volume input, CPU 31 performs invalid input determination processing (step S113). Namely, processing for determining the input as invalid is performed. Then, the process ends.

In the present embodiment, it is assumed that the volume low region is set as inside of the display range of acceptable volume input. Volume high region 255 is not set as inside of the display range of acceptable volume input. Specifically, in a case where the slider is moved in a direction of decrease from the current value of the parameter, in the present example, the input indicating the operation of moving the slider to the desired position in the volume low region is accepted. In a case where the slider is moved in a direction of increase from the current value of the parameter, in the present example, the input indicating the operation of moving the slider to the desired position in the volume high region is not accepted.

Therefore, slider 252 is immediately moved to the touch position in the volume low region and the volume in accordance with the slider position is set. On the other hand, touching the volume high region results in the invalid input determination processing, so that the slider is not moved and the volume in accordance with the slider position is not set.

As a result of such processing, abrupt increase in the volume caused by a user's erroneous operation while the volume setting processing is performed with the touch pen is avoided. Specifically, the position of the slider is varied with the touch pen in a direction of decrease in the volume and the volume setting processing in accordance with the slider position can be performed. In the direction of increase in the volume, however, the position of the slider is not varied with the touch pen and the volume is not increased.

In particular, in performing the setting processing using the touch pen, the user can freely designate any position on the touch panel but a display range of volume setting icon 250 cannot be great owing to layout restrictions. Accordingly, in performing the volume setting processing, though attention should be paid in designating a position in accordance with a desired volume level within the display range of volume setting icon 250, it is very likely that the user erroneously designates the direction of increase in the volume with the touch pen. Therefore, as a result of this processing, such stress imposed on the user that he/she operates game device 1 while being anxious about the possibility of abrupt increase in the volume caused by his/her erroneous operation can be suppressed.

In the above, regarding the operation of moving the slider to the desired position, a case where the slider is immediately moved to the position in the volume low region so that the volume in accordance with the slider position is set has been described, however, as in the continuous operation of moving the slider, such setting that the volume level parameter is gradually adjusted can also be made.

Figure 19:
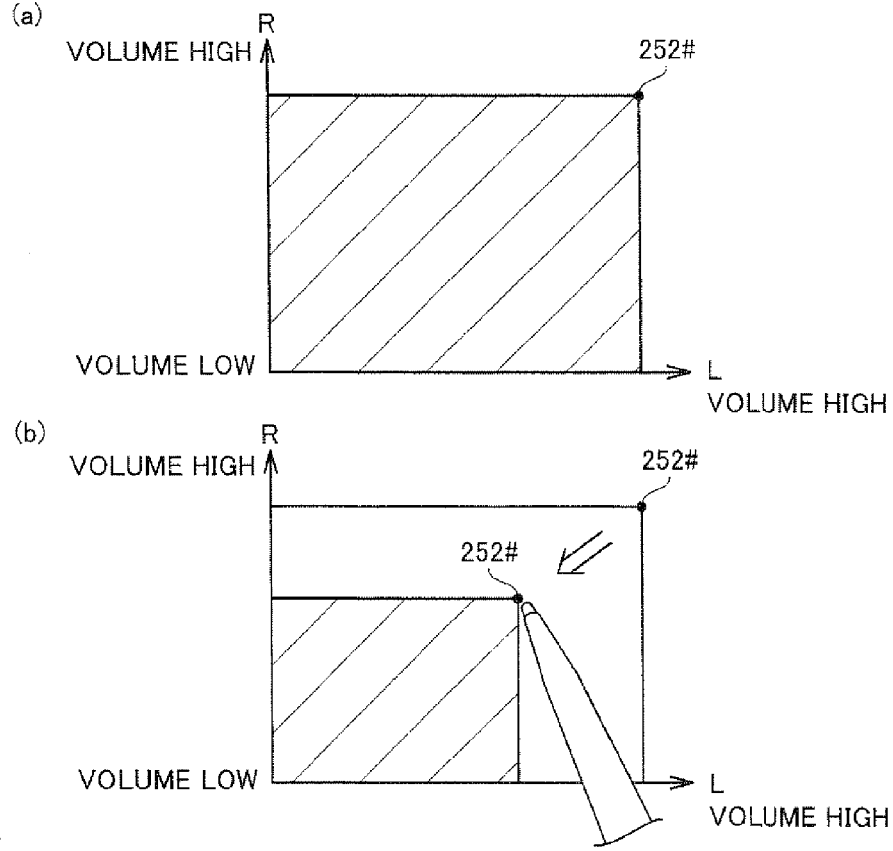
FIG. 19 is a diagram illustrating another example of the volume setting icon.

Another example of the volume setting icon will be described with reference to FIG. 19.

Referring to FIG. 19(a), a volume setting region for setting a volume at which output is provided from the right speaker and the left speaker is shown here.

Specifically, the ordinate (R) represents a volume level of the right speaker and the abscissa (L) represents a volume level of the left speaker. Namely, a coordinate value (position) at any point is associated with the volume level of the right speaker and the left speaker. Here, a pointer 252# indicating a position corresponding to the current volume level of the right speaker and the left speaker is displayed.

By touching pointer 252# with the touch pen, pointer 252# is selected. By moving the touch pen while the screen is being touched (performing the slide operation), the pointer is moved and displayed in accordance with the trail of movement. On the other hand, when a position other than pointer 252# is touched with the touch pen and this touched position is within the display range of acceptable volume input, pointer 252# is moved and displayed at the position of input with the touch pen.

Though a case where setting of two types of parameters, that is, the volume level of the right speaker and the left speaker, is associated with the coordinate value (position) on the abscissa and the ordinate has been described here, the setting may be associated with more types of parameters, without limited to two types of parameters. Regarding display of a parameter setting range, when a single parameter is set, for example, a position of the parameter may be displayed one-dimensionally, that is, on the abscissa. On the other hand, for example, when two parameters are set, a position of the parameters may be displayed two-dimensionally, that is, on the ordinate and the abscissa. Further, when a plurality of types of parameters are set, a position of the parameters may be displayed multi-dimensionally, in accordance with the number of types thereof.

Referring to FIG. 19(b), the case where a position within the display range of acceptable volume input is touched with the touch pen and the volume level in accordance with this position is immediately set is shown here. Namely, for example, a direction of decrease in the volume of at least any one of the right speaker and the left speaker with the use of the touch pen is set as inside of the display range of acceptable volume input, however, other regions are not set as inside of the display range of acceptable volume input.

Therefore, when a position other than pointer 252# is touched, pointer 252# is not moved in a direction of increase in the volume, which is outside of the display range of acceptable volume input, in spite of touch with the touch pen. Thus, the volume is prevented from becoming excessively high and having the user feel uncomfortable can be suppressed.

In the present example, a case where the display range of volume setting icon 250 is divided into the display range of acceptable volume input and otherwise has been described. Such division, however, is not limited to division relating to volume setting, and for example, the reproduction time bar described in connection with FIG. 7 can also be divided into a display range of acceptable input and otherwise. For example, an already-reproduced position is defined as inside of the display range of acceptable input, and a position where reproduction has not yet been carried out is defined as outside of the display range of acceptable input so that only a continuous operation of moving slider 219 is allowed. As a result of such processing, start of reproduction in response to touching with the touch pen from a position where reproduction has not yet been carried out is prevented and having the user feel uncomfortable can be suppressed.

(Speed and Key Adjustment Processing)

A function to change a reproduction speed or a key by selecting speed and key adjustment icon 241 will be described with reference to FIG. 20.

Figure 20:
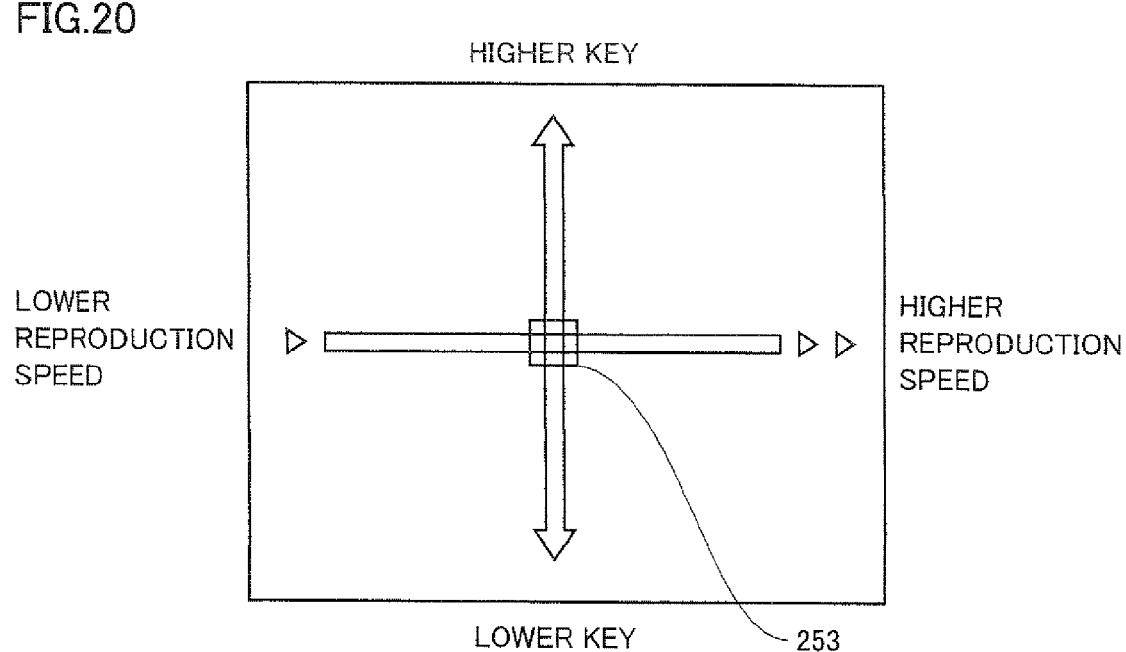
FIG. 20 is a diagram illustrating a function to change a reproduction speed or a key by selecting a speed and key adjustment icon 241.

Referring to FIG. 20, a speed and key adjustment screen displayed on the screen of lower LCD 12 by pressing speed and key adjustment icon 241 is shown here.

Here, the user uses the touch pen etc. to select and move a slider 253, so that adjustment to a reproduction speed and a key corresponding to a moved position can be made. Specifically, by moving the slider toward the right from a current position of slider 253, the reproduction speed can be made faster. In contrast, by moving the slider toward the left, the reproduction speed can be made slower. In addition, by moving slider 253 upward from the current position of slider 253, the key can be made higher. In contrast, by moving slider 253 downward, the key can be lowered.

By performing this function, the reproduced and output audio signal can be varied as the user desires.

(Tone Adjustment Processing)

A function for change to another tone by modulating a frequency of a reproduction signal or performing filtering processing or the like based on selection of tone adjustment icon 242 will be described with reference to FIG. 21.

Figure 21:
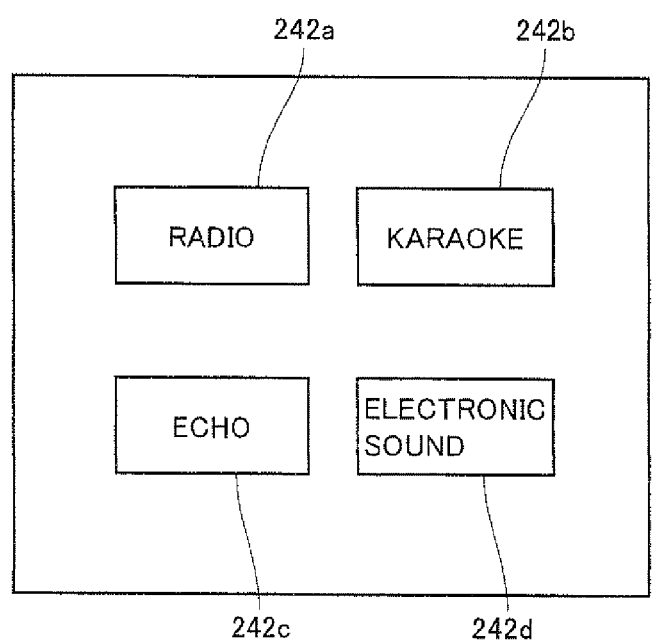
FIG. 21 is a diagram illustrating a function for change to another tone by modulating a frequency of a reproduction signal, performing filtering processing or the like, based on selection of a tone adjustment icon 242.

Referring to FIG. 21, a tone adjustment icon selection screen displayed on the screen of lower LCD 12 by pressing tone adjustment icon 242 is shown here.

Four tone adjustment selection icons are provided here. Specifically, a "radio" icon 242a for adjusting sound to such a tone as heard on a radio by modulating a frequency, a "karaoke" icon 242b suppressing vocals based on subtraction of left and right sound from a stereophonic sound source, an "echo" icon 242c for making sound echo through filtering processing, and an "electronic sound" icon 242d for varying sound to an electronic tone by modulating a frequency are provided. When the user selects any of these four tone adjustment selection icons by using the touch pen etc., the function of the selected icon is performed.

Though a case where four tone adjustment selection icons are provided and sound can be adjusted to four types of tones has been described here, any number of icons may be provided, without particularly limited to four. By providing a plurality of tone adjustment selection patterns, adjustment to a tone as desired by the user can be made.

Here, regarding the function of "karaoke" icon 242b, a case of suppression of vocals based on subtraction of left and right sound from the stereophonic sound source is described. This processing is performed generally because vocal sound or the like is localized in the center of a sound field of the stereophonic sound source and ambient sound or the like is localized on the left and right except for the center. Vocals can also be suppressed with other methods without particularly limited to this method.

(Sound Effect Selection Processing)

A case where sound effect output from a speaker or the like is changed in response to a user's operation of R button 14J and L button 14I for selecting sound effect selection icon 232, 234 will be described with reference to FIG. 22. In the present embodiment, by operating R button 14J and L button 14I, sound effect can additionally be produced for fun during reproduction of music based on a music file.

Figure 22:
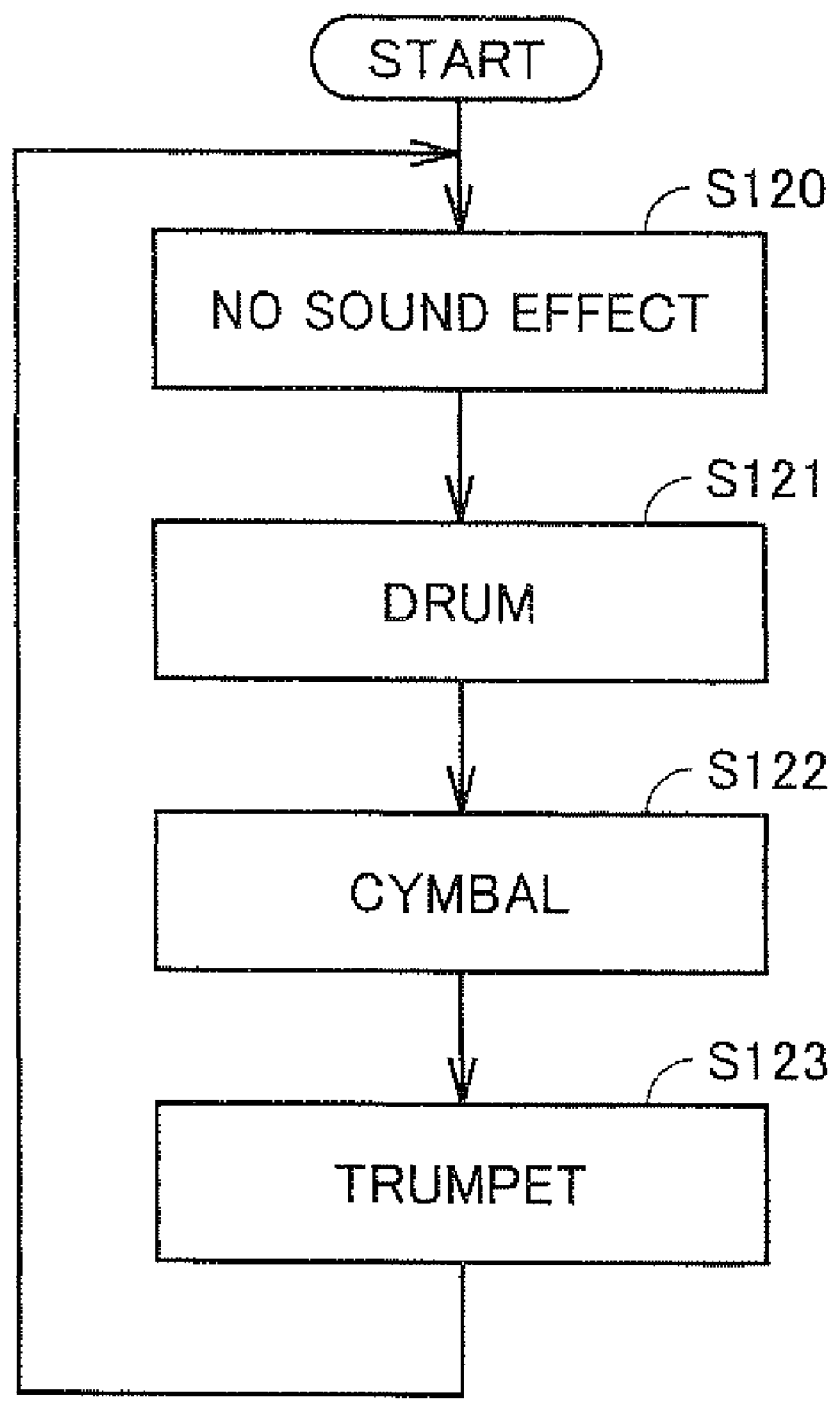
FIG. 22 is a diagram illustrating a case where sound effect output from a speaker or the like is changed in response to a user's operation of an R button 14J and an L button 14I for selecting a sound effect selection icon 232, 234.

Referring to FIG. 22, the sound effect can be changed by selecting sound effect selection icon 232, 234 shown in FIG. 7. Specifically, in an initial state, a "no sound effect" state is set (step S120). Thereafter, sound effect selection icon 232 is selected once, to set the sound effect of "drum" (step S121). Thereafter, by selecting sound effect selection icon 232, the sound effect of "cymbal" is set (step S122). Thereafter, by selecting sound effect selection icon 232, the sound effect of "trumpet" is set (step S123). By selecting sound effect icon 232 again, the "no sound effect" state is set (step S120). Namely, switching between the sound effects output from the speaker or the like can be made in accordance with the number of times of selection of the sound effect selection icon. In the present example, by selecting sound effect selection icons 232, 234 with R button 14J and L button 14I respectively, sound effect in accordance with the button operation can be set.

Here, a case where switching in the order of "no sound effect", "drum", "cymbal", and "trumpet" is made is described, however, the order is not particularly limited as such and any order can be set. In addition, such setting as switching to a plurality of sound effects can also naturally be made. Moreover, such setting that types of sound effects are different between R button 14J and L button 14I respectively can also be made.

(Visualizer Display Processing)

Visualizer display processing according to certain example embodiments will be described with reference to FIG. 23.

When CPU 31 determines in step S100 in FIG. 16 that the coordinate value indicated by the touch position data is within a range of visualizer switching icon 231, CPU 31 performs the visualizer display processing.

FIG. 23(a) shows the reproduction operation selection screen 204 on lower LCD 12. As the screen is the same as described in connection with FIG. 7, detailed description thereof will not be repeated.

FIG. 23(b) shows the visualizer display screen 204# on upper LCD 22.

Sub routine processing of the visualizer display processing will be described with reference to FIG. 24.

Figure 24:
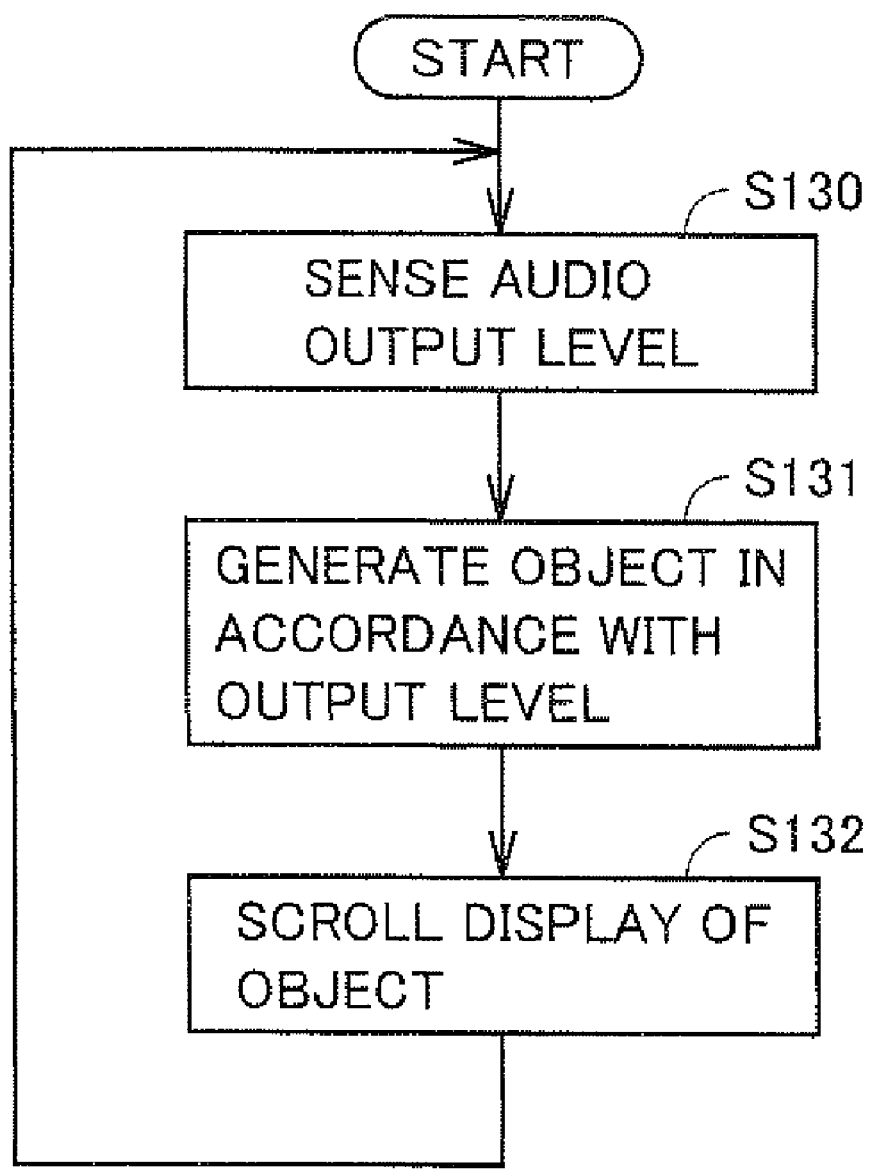
FIG. 24 is a flowchart illustrating sub routine processing of the visualizer display processing.

Referring to FIG. 24, initially, an audio output level is sensed (step S130). Specifically, output level sensing circuit 58 senses the output level of the audio signal output from audio output control circuit 56 to amplifiers 44, 46 and outputs the result to CPU 31.

Thereafter, CPU 31 generates an object in accordance with the output level sensed by output level sensing circuit 58 (step S131).

Thereafter, scroll display of the object is provided (step S132). The process again returns to step S130 and the processing above is repeated.

Specifically, in FIG. 23(b), as the output level of the audio signal being reproduced is successively sensed, new objects are successively generated at positions in accordance with the output level, and scroll display of these objects is provided. In the present embodiment, an object 501 (specifically, a ground object) is sequentially generated at a height in accordance with the output level at the right end of a visualizer display area and scroll display of the entire picture toward the left is provided. In addition, on the ground object thus generated, the operation of another object (in the present example, objects 502 and 503, for example) is controlled (that is, the object moves horizontally along the ground on the screen or jumps).

In the present example, the height of the ground object is determined by the total output level of the audio signal being reproduced from right and left speakers 45 and 47, or alternatively the controlled operation of a first object (in the present embodiment, object 502 in a motorcycle form) (speed, acceleration, height of jump, etc.) is determined by the output level of right speaker 45 and the controlled operation of a second object (in the present embodiment, object 503 in a motorcycle form) is determined by the output level of left speaker 47.

Without limited to the above, in yet another example, the height of the ground object for the first object (in the present embodiment, object 502) or the controlled operation (speed, acceleration, height of jump, etc.) of the first object may be determined by the output level of a signal for right speaker 45 of the audio signal, and the height of the ground object for the second object (in the present embodiment, object 503) or the controlled operation of the second object may be determined by the output level of a signal for left speaker 47 of the audio signal.

The user can visually recognize variation of the output level based on the height of a geographic feature in accordance with the output level of the audio signal. In addition, as two objects 502 and 503 in a motorcycle form jump in accordance with the height of the geographic feature, the user can visually recognize variation of the output level of the audio signal also based on variation of objects 502 and 503.

In addition, relative positional relation between two objects 502 and 503 in a motorcycle form may be varied, depending on a difference in the volume level between the audio signal output from right speaker 45 and the audio signal output from left speaker 47.

If the processing for reproducing the selected music file pauses, there is no variation of the geographic feature in accordance with the output level above and hence scroll display of a flat geographic feature object is provided. Here, for example, when the user operates L button 14I and R button 14J described above, the sound effect is output from the speaker or the like. Therefore, the output level of the audio signal of the sound effect is sensed, the geographic object in accordance with the output level of the audio signal is generated, and scroll display thereof is provided. The visualizer display screen hereinafter is also processed in accordance with a similar scheme.

Another visualizer display screen will be described with reference to FIG. 25.

Figure 25:
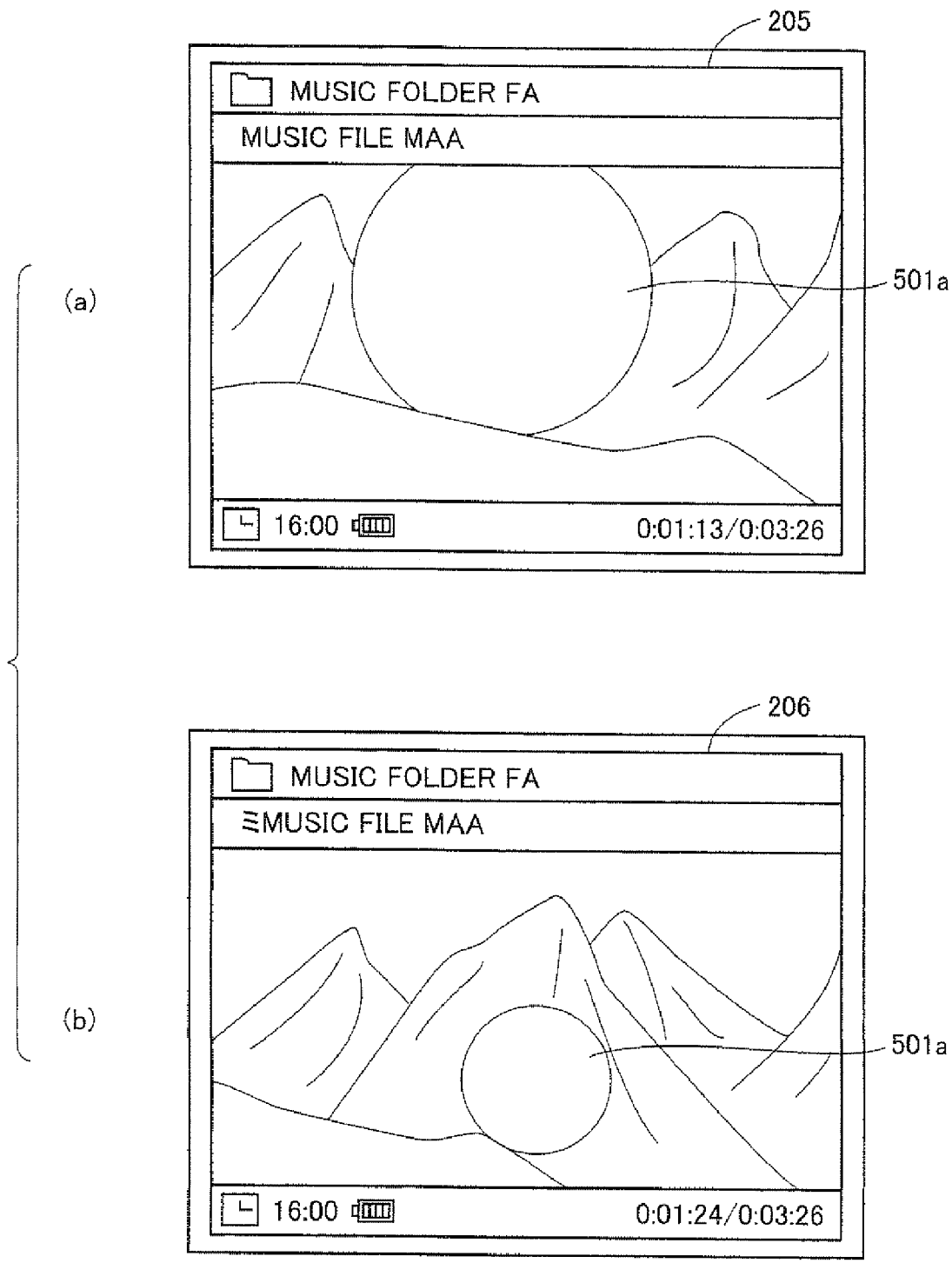
FIG. 25 is a diagram illustrating another visualizer display screen.

Referring to FIGS. 25 (*a*) and (*b*), a visualizer for generation and scroll display on upper LCD 22 of an object 501*a* in a snowball shape having a size in accordance with the sensed output level of the audio signal is shown in the example screens 205 and 206, respectively. Scroll display of a geographic feature showing a slope is provided behind object 501*a* in a snowball shape and such scroll display as object 501*a* in a snowball shape rolling down the slope is provided.

Comparing FIG. 25(*a*) with FIG. 25(*b*), a case that object 501*a* in a snowball shape in FIG. 25(*a*) is greater than object 501*a* in a snowball shape in FIG. 25(*b*) in accordance with the sensed output level of the audio signal is shown here.

As a size of object 501*a* in a snowball shape varies, the user can visually recognize variation of the output level of the audio signal in accordance with the size of object 501*a* in a snowball shape.

In addition, as object 501*a* in a snowball shape bounds at prescribed timing during scroll display of the geographic feature showing the slope, the size of object 501*a* in a snowball shape can further visually be recognized.

Yet another visualizer display screen will be described with reference to FIG. 26.

Figure 26:
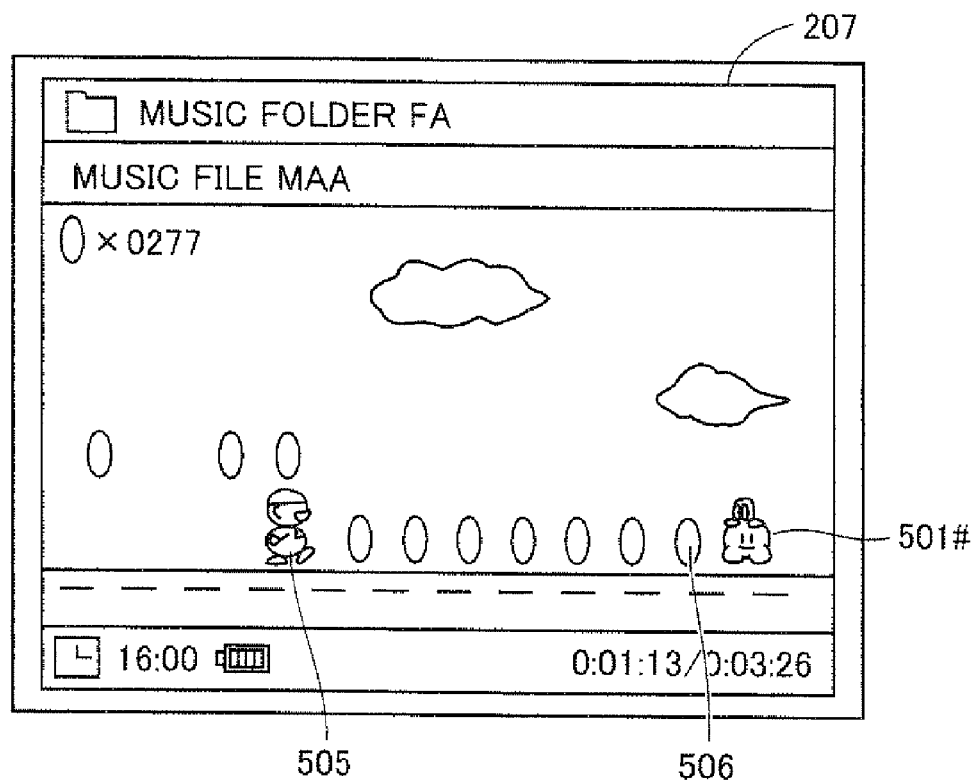
FIG. 26 is a diagram illustrating yet another visualizer display screen.

Referring to FIG. 26, a visualizer for generation and scroll display on upper LCD 22 of an object 501# in a prescribed character shape at a height in accordance with the sensed output level of the audio signal is shown in an example screen 207. In addition, setting is made such that scroll display of a background region of the screen from a right end of the screen to a left end of the screen is provided, and objects 506 in a coin shape are continuously arranged at prescribed intervals from the position of object 501# in a prescribed character shape and scroll display thereof from the right end of the screen to the left end of the screen is provided.

In addition, setting is made such that an object 505 in another prescribed character shape is displayed, and for example, the object can jump in the screen in response to a user's operation. Moreover, setting is made such that, when object 505 in a prescribed character shape is superimposed on object 506 in a coin shape, object 506 in a coin shape disappears and the number of times of superposition on object 506 in a coin shape is displayed in the upper left field of the screen.

Therefore, the user can visually recognize variation of the output level of the audio signal based on variation of the height of object 501#. In addition, as objects 506 in a coin shape are also continuously arranged in accordance with the height of object 501#, the user can visually recognize variation of the output level of the audio signal also based on the height of object 506 in a coin shape.

Further, as the user can operate object 505 in a prescribed character shape by providing an operation input. As object 506 in a coin shape disappears when object 505 is superimposed on object 506 in a coin shape, the user can recognize variation of the output level of the audio signal also based on his/her own operation input (pressing of a button).

Namely, a display position of a third object (in the present embodiment, object 506 in a coin shape) is determined by the output level of the audio signal. Specifically, the third object is displayed at the height in accordance with the output level, at an end portion of a display area of a virtual space and thereafter scroll display of the third object in a direction toward an opposite end portion is provided. Then, in response to the user's operation, movement of a fourth object (in the present embodiment, object 505 in a prescribed character shape) is controlled. Prescribed game processing is then performed in accordance with positional relation between the third object and the fourth object. Thus, the output level can be checked during reproduction of music and the user can have fun based on his/her operation.

In the present example, visualizer display processing in three patterns has been described, however, the pattern is not limited to three. A single pattern may be provided, or a function of visualizer display processing in a further greater number of patterns may also be provided.

Figure 23:
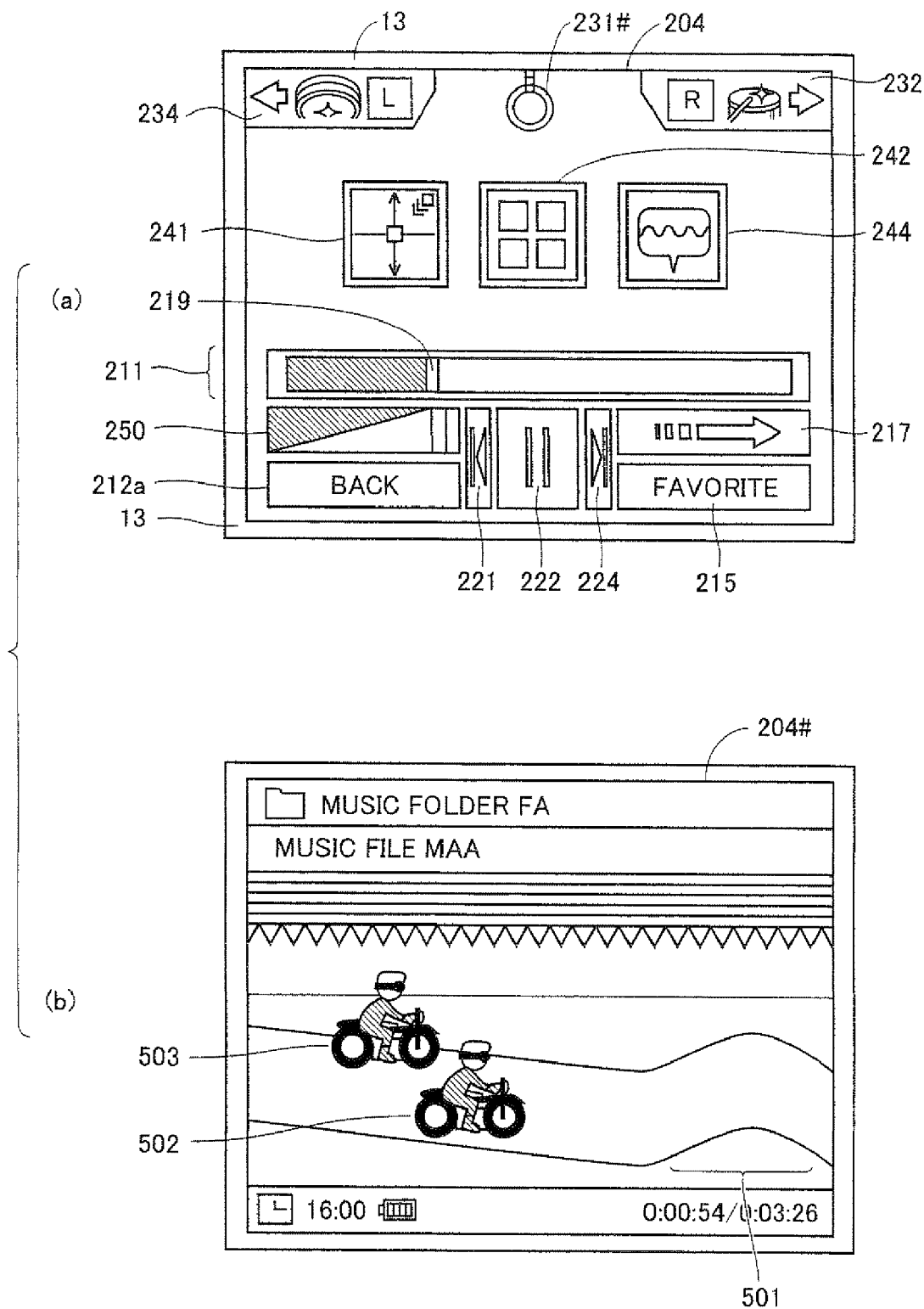
FIG. 23 is a diagram illustrating visualizer display processing according to the embodiment.

For example, such setting that switching among three patterns of visualizer display processing is successively made in accordance with the number of times of touch with the touch pen of a position within a display range of a visualizer switching icon 231# on the reproduction operation selection screen 204 on lower LCD 12 shown in FIG. 23(*a*) can be made. For example, setting can be such that, by touching the position within the display range of visualizer switching icon 231 with the touch pen four times, the visualizer display processing ends and the screen in FIG. 7(*b*) is shown.

As described previously, in the present embodiment, the user can have fun by additionally producing the sound effect by performing the prescribed operation during reproduction of music based on the music files. In detection of the output level of the audio signal described above, not only the output of reproduction of music based on the music files but also the output of sound effect based on the user's operation are considered. Namely, the total output level of both of the audio signal based on the music files and the audio signal of the sound effect based on the user's operation is sensed as the output level of the audio signal described above. Thus, display contents on the visualizer are indirectly varied in response to the user's operation, and more specifically, a display position or an operation content of the object is varied.

(Headphone Output Processing)

A case where headphone 18 is sensed according to certain example embodiments will be described with reference to FIG. 27. It is noted that headphone output processing is performed independently of other processing while the sound function is being performed.

Figure 27:
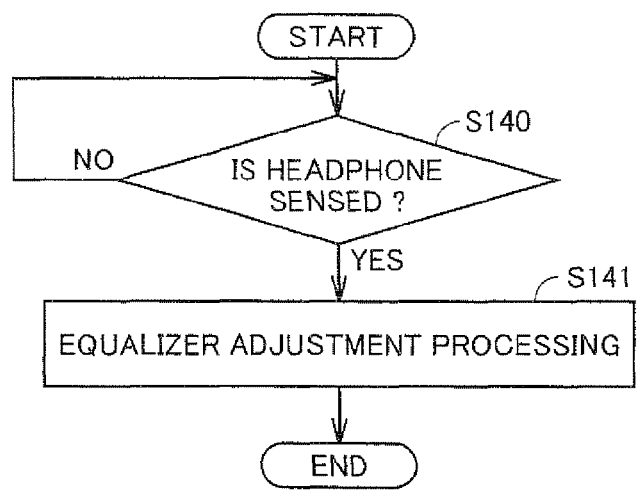
FIG. 27 is a diagram illustrating a flow when a headphone is sensed according to the embodiment.

Referring to FIG. 27, initially, whether headphone 18 is sensed or not is determined (step S140). Specifically, headphone sensing circuit 59 of I/F circuit 42 senses turn-on of a mechanical switch, for example, resulting from insertion of plug 19 of headphone 18 into jack 62 described in connection with FIG. 2 or an electrically conducting state resulting from insertion of plug 19 of headphone 18 into jack 62, and senses insertion of plug 19 of headphone 18 into jack 62. Thereafter, headphone sensing circuit 59 of I/F circuit 42 outputs the result of sensing to CPU 31, and CPU 31 determines attachment of headphone 18 upon receiving a signal indicating the result of sensing from headphone sensing circuit 59 of I/F circuit 42.

When headphone 18 is sensed, CPU 31 then performs equalizer adjustment processing (step S141).

The process then ends (end).

Comparing a case where the user wears headphone 18 to listen to the reproduced audio signal with a case where the user listens to the reproduced audio signal output from the speaker, wearing headphone 18 means covering of earholes. Accordingly, acoustic characteristics are significantly different from a case not wearing the headphone and hence the user may feel discomfort.

Therefore, in certain example embodiments, when headphone 18 is sensed, equalization adjustment processing for adjusting a prescribed frequency band of audio data is performed so as not to produce an audio signal disagreeable to the user due to variation of acoustic characteristics.

Thus, even when the user listens to music data through headphone 18, the audio signal agreeable to the user can be output. In addition, the volume of sound effect output in response to the user's operation of L button 14I and R button 14J can also be adjusted, or a type of sound effect described in connection with FIG. 22 can also be varied in accordance with sensing of headphone 18.

Here, though a case where the equalization adjustment processing for adjusting a prescribed frequency band when headphone 18 is sensed is performed has been described, the processing is not particularly limited as such. When headphone 18 is sensed, the audio signal itself to be reproduced may be made different from the audio signal for reproduction from the speaker. For example, sound of high key that gives no uncomfortable feeling in reproduction from the speaker but sounds too high in listening through the headphone may be replaced with different sound of lower key, or sound accompanying noise in listening through the headphone may be replaced with different sound.

Alternatively, when the headphone is sensed, instead of changing the audio signal itself to be reproduced, the volume of the audio signal to be reproduced may be made different from the volume thereof in reproduction from the speaker. For example, an audio signal reproduced in balance without giving uncomfortable feeling in reproduction from the speaker but reproduced in poor volume balance in listening through the headphone may be adjusted by increasing or decreasing the volume thereof to attain balance.

(Sleep Processing)

Sleep processing in a case where game device 1 is folded to a folded position will be described with reference to FIG. 28.

Figure 28:
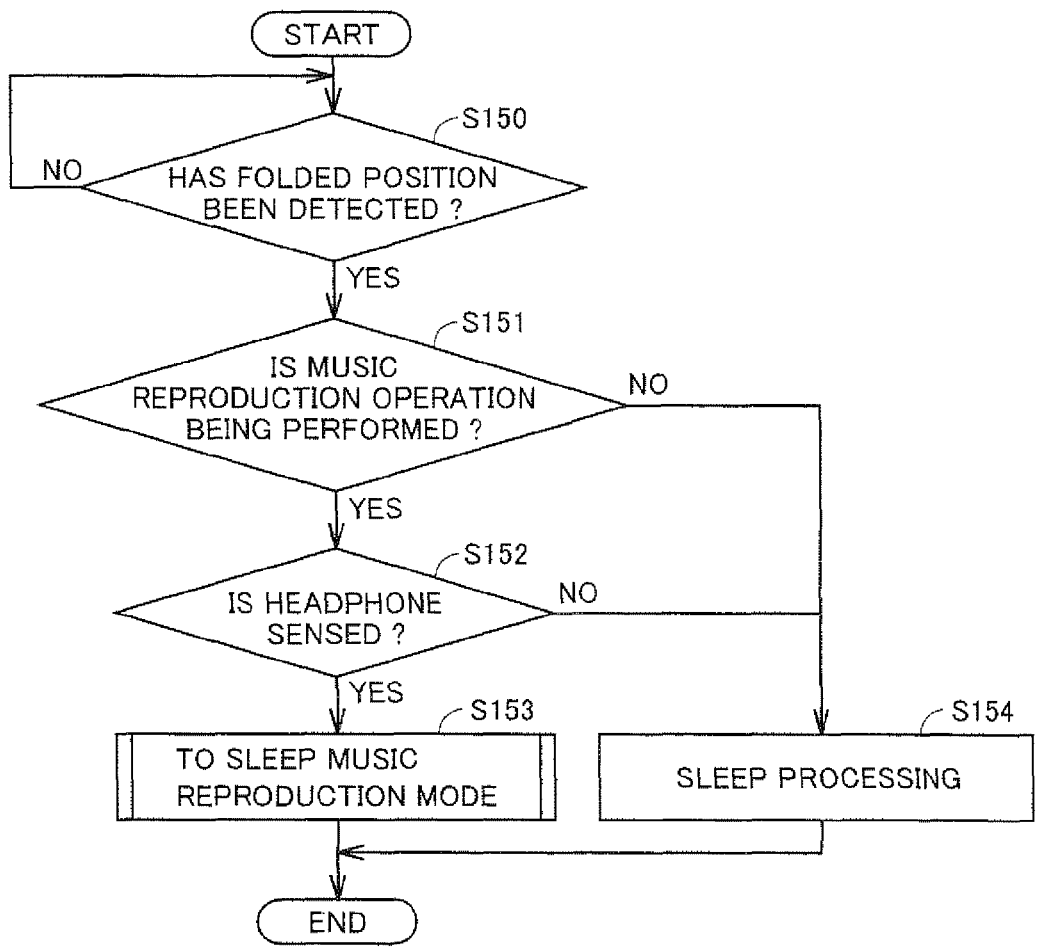
FIG. 28 is a flowchart illustrating sleep processing in a case where game device 1 is folded to a folded position.

Referring to FIG. 28, CPU 31 determines whether a folded position has been detected or not (step S150). Specifically, whether a determination signal indicating the closed state has been input from folded position detection sensor 50 or not is determined. When it is determined that the determination signal indicating the closed state has been input from folded position detection sensor 50, that is, when the folded position is detected, CPU 31 then determines whether the music reproduction operation is being performed or not (step S151). Specifically, CPU 31 determines whether or not the "start" icon is selected and the processing for reproducing the selected music file is being performed as described above.

When CPU 31 determines in step S151 that the music reproduction operation is not being performed, CPU 31 performs sleep processing (step S154). Namely, when other function is operated, the operation is stopped and the data of that state of operation is stored. Receiving the input of the determination signal indicating the closed state output from folded position detection sensor 50, for example, if game device 1 is operating, CPU 31 stops the operation and sets what is called a sleep state in which data of that state of operation is stored. On the other hand, receiving input of the determination signal indicating the opened state output from folded position detection sensor 50 after game device 1 enters the sleep state, CPU 31 performs processing for recovering from the sleep state to the original state based on the stored data of the state of operation.

Therefore, when the user folds game device 1 and does not operate game device 1, each active function is set to the sleep state, so that electric power consumed by each active function can be saved.

On the other hand, when CPU 31 determines in step S151 that the music reproduction operation is being performed, CPU 31 then determines whether headphone 18 is sensed or not (step S152). Specifically, CPU 31 determines whether a signal indicating a result of sensing involved with attachment of headphone 18 from headphone sensing circuit 59 of I/F circuit 42 has been received or not as described above.

When CPU 31 determines in step S152 that headphone 18 is not sensed, CPU 31 performs sleep processing (step S154). Namely, when the music reproduction operation is being performed but headphone 18 is not sensed, CPU 31 stops the operation as in the case of other active functions and has the data of the state of operation stored. Thus, when music is being reproduced through the speaker, music reproduction is stopped by folding game device 1 from the unfolded state to the folded state.

On the other hand, when CPU 31 determines in step S152 that headphone 18 is sensed, transition to a sleep music reproduction mode is made (step S153).

When headphone 18 is not sensed, sleep processing is performed. Accordingly, the audio signal is not output from the speaker or the like of the device, and hence having the user and a person around the user feel uncomfortable can be suppressed. In addition, when headphone 18 is not sensed, the sleep processing is performed, which is convenient for the user who has been expecting execution of the sleep processing also with regard to the music reproduction operation in response to folding of the device. On the other hand, as will be described later, when music is being reproduced through headphone 18, reproduction of music is continued also after game device 1 is folded from the unfolded state to the folded state.

Sub routine processing in the sleep music reproduction mode will be described with reference to FIG. 29.

Figure 29:
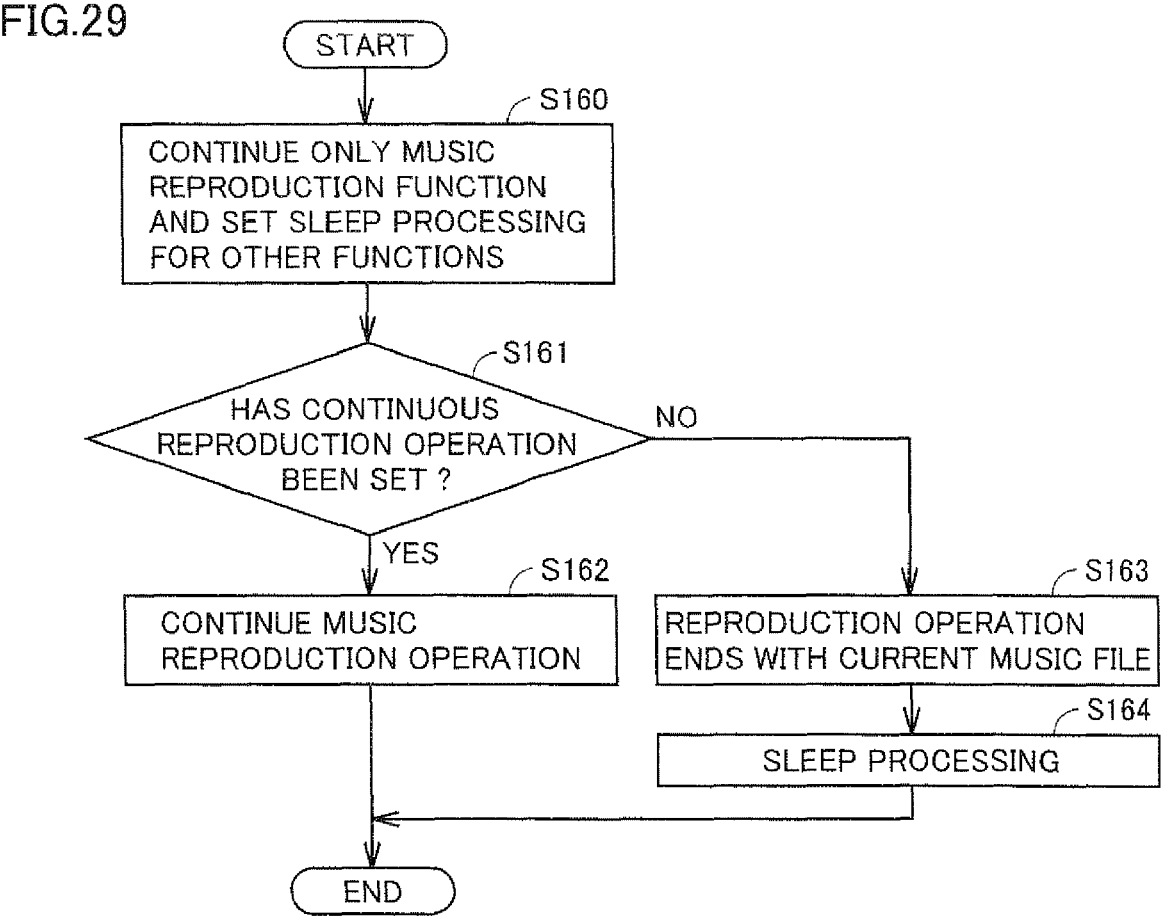
FIG. 29 is a flowchart illustrating sub routine processing in a sleep music reproduction mode.

Referring to FIG. 29, CPU 31 continues only the music reproduction function and performs the sleep processing for other functions (step S160). For example, display processing or the like is set to the sleep state.

Thereafter, CPU 31 determines whether a continuous reproduction operation has been set or not (step S161). Specifically, it is determined whether the reproduction mode is set to the reproduction mode in which data being reproduced is repeatedly reproduced, to the reproduction mode in which data is sequentially reproduced and reproduction is repeated from the beginning when reproduction is completed, or to the reproduction mode in which only a set section is repeatedly reproduced, or whether or not the "random" folder is selected and executed.

When CPU 31 determines in step S161 that the continuous reproduction operation has been set, CPU 31 continues the music reproduction operation (step S162).

On the other hand, when CPU 31 determines in step S161 that the continuous reproduction operation has not been set, the reproduction operation ends with the current music file (step S163). Then, the sleep processing described above is performed (step S164).

According to this method, when the user folds game device 1 and does not operate game device 1, the sleep processing is performed except for a case where the music reproduction operation is being performed. Therefore, this processing allows extension of a service life of a power supply of game device 1. In addition, when the user folds game device 1 during execution of the music reproduction function and when headphone 18 is sensed and the continuous reproduction operation is set, the music reproduction operation is continued.

In general, it is highly likely that the user carries game device 1 in the folded state in a bag or in a pocket or the like of clothing. Therefore, as it is less likely that the user operates game device 1 in such a folded state, the sleep processing is normally performed.

On the other hand, it would be convenient for the user if the function of the music reproduction operation can be performed while carrying game device 1 in the folded state although not operating game device 1.

Therefore, in spite of game device 1 being in the folded state, if the music reproduction operation is being performed, the headphone is sensed and the continuous reproduction operation is set, the music reproduction operation is continued, to thereby contribute to convenience of the user. In addition, when the continuous reproduction operation is not set, it can be determined that the user does not desire to continue the music reproduction operation. Therefore, after the reproduction operation of the current music file ends, normal sleep processing is performed, to thereby contribute to convenience of the user. In particular, as the normal sleep processing is performed after the reproduction operation of the current music file ends, the reproduction operation can end without giving uncomfortable feeling to the user who enjoys the music reproduction operation.

(Automatic Recording and Reproduction Processing)

In the automatic recording and reproduction processing, processing of two functions of an automatic recording mode and an automatic reproduction mode is performed independently of each other. As described in step S2 in FIG. 8, the automatic recording and reproduction processing is started after sound selection screen 100 is displayed.

The automatic recording mode according to certain example embodiments will be described with reference to FIG. 30.

Figure 30:
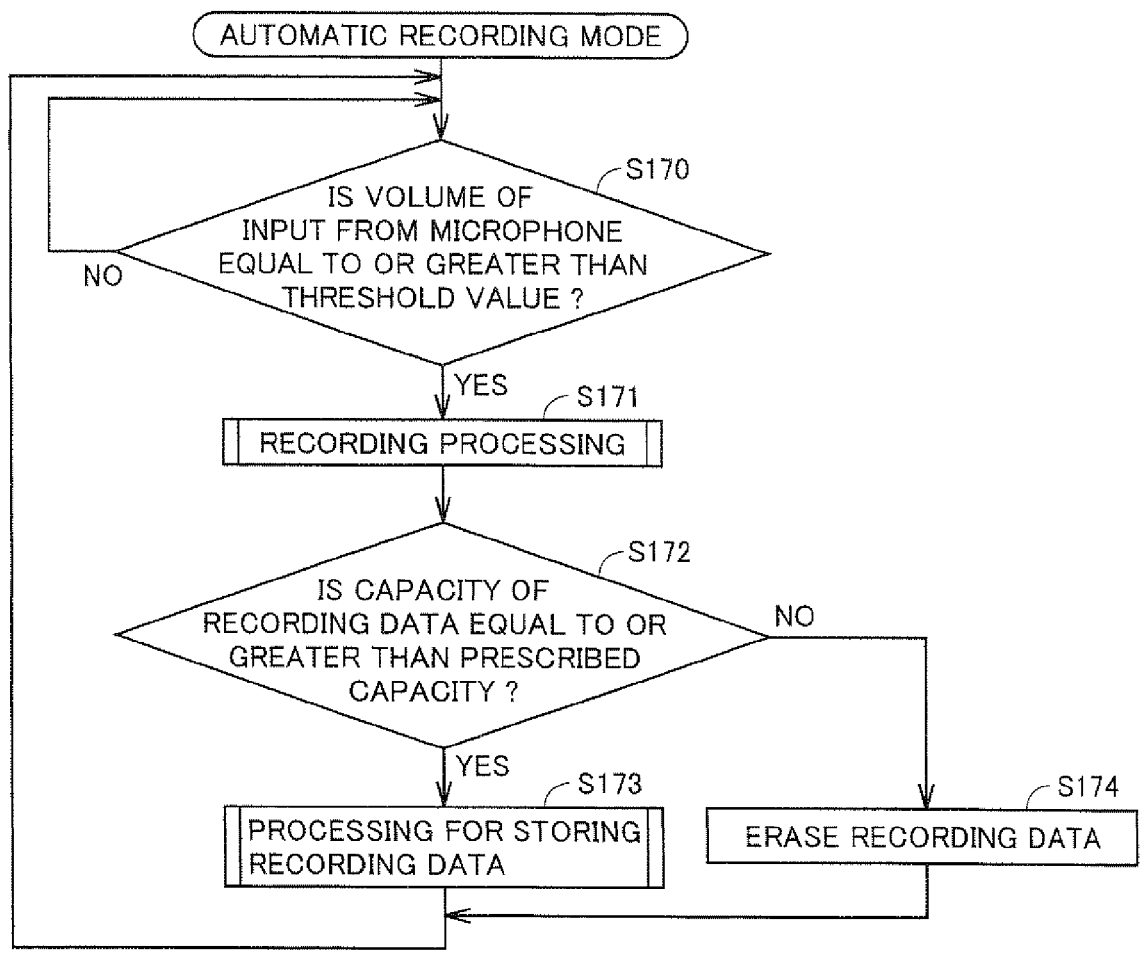
FIG. 30 is a flowchart illustrating an automatic recording mode according to the embodiment.

Referring to FIG. 30, whether the volume of input from microphone 43 is equal to or greater than a threshold value is determined (step S170). Specifically, audio input control circuit 54 senses whether the volume of input from microphone 43 is equal to or greater than the threshold value. When the sensed volume of input from microphone 43 is equal to or greater than the threshold value, audio input control circuit 54 outputs the result of sensing to CPU 31.

When CPU 31 determines in step S170 that the volume of input from microphone 43 is equal to or greater than the threshold value, CPU 31 performs the recording processing (step S171). Specifically, CPU 31 performs the recording processing, upon receiving the input of the result of sensing from audio output control circuit 54 that the volume of input from microphone 43 is equal to or greater than the threshold value.

Sub routine processing of the recording processing according to certain example embodiments will be described with reference to FIG. 31.

Figure 31:
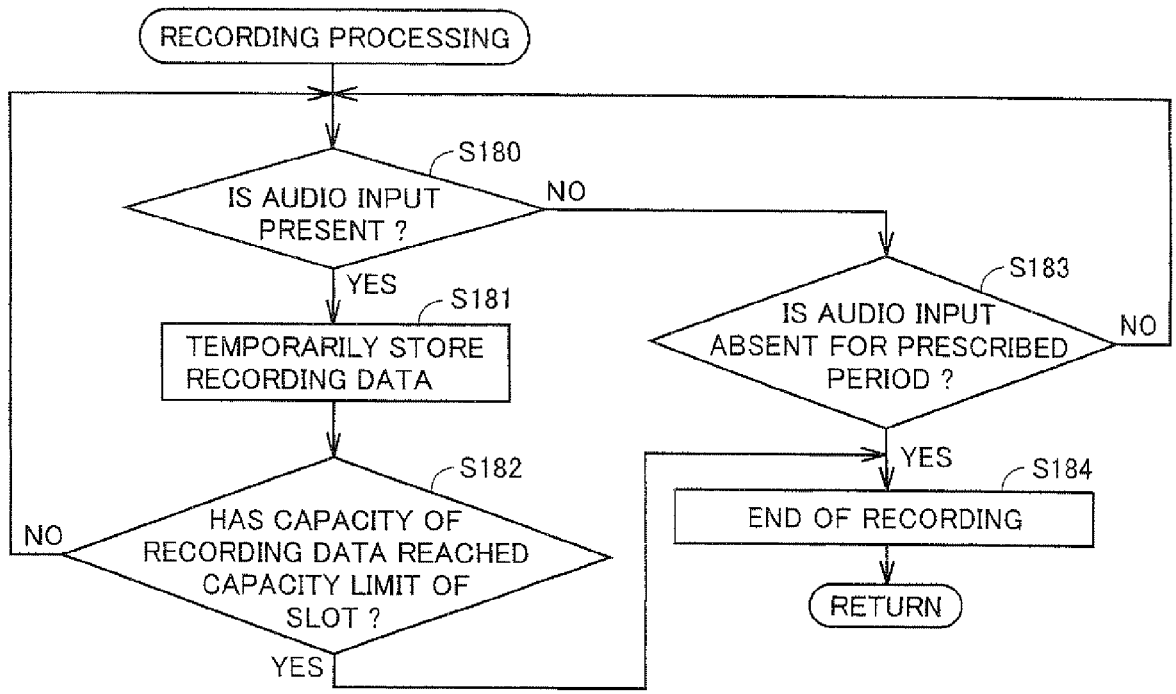
FIG. 31 is a flowchart illustrating sub routine processing of recording processing according to the embodiment.

Referring to FIG. 31, initially, CPU 31 determines whether audio input is present or not (step S180). When CPU 31 determines that audio input is present, CPU 31 temporarily stores the recording data input from audio output control circuit 54 (step S181). Specifically, CPU 31 temporarily stores the recording data in the main memory.

Thereafter, CPU 31 determines whether a capacity of the recording data has reached a capacity limit of a slot or not (step S182). Here, the slot refers to a recording data storage area in memory 34 for storage, in which the recording data is stored as a recording data file. In the present example, it is assumed that a plurality of slots used for recording processing are provided in advance in memory 34 for storage. In the present example, for example, it is assumed that recording data of 10 seconds can be stored in one slot.

When CPU 31 determines in step S182 that the capacity of the recording data has not reached the capacity limit of the slot, the processing in step S180 and step S181 is repeated and the recording data is temporarily stored.

When CPU 31 determines in step S182 that the capacity of the recording data has reached the capacity limit of the slot, the process proceeds to step S184 and the recording ends. Then, referring back to FIG. 30, the process proceeds to step S172.

On the other hand, when CPU 31 determines in step S180 that audio input is not present, the process then proceeds to step S183.

In step S183, CPU 31 determines whether or not audio input is absent for a prescribed period. For example, the prescribed period for determining absence of sound can be set to three seconds. This period is merely by way of example, and an appropriate period may be set.

When CPU 31 determines in step S183 that audio input is absent for the prescribed period, recording ends (step S184). Then, referring back to FIG. 30, the process proceeds to step S172.

On the other hand, when it is not determined in step S183 that audio input is absent for the prescribed period, that is, when the audio input is made again, the process again returns to step S180 and proceeds to step S181.

According to this recording processing, when audio input is present, the recording data is automatically stored until the capacity limit of the slot is reached, and when there is no longer audio input, the recording processing automatically ends.

Through a series of processing as above (S180 to S183), voice and sound is automatically recorded while sound selection screen 100 is displayed. Speech of the user while sound selection screen 100 is displayed (including unconscious utterance) is automatically recorded.

Referring again to FIG. 30, thereafter, CPU 31 determines whether the capacity of the recording data is equal to or greater than a prescribed capacity or not (step S172). Specifically, CPU 31 determines whether the capacity of the recording data temporarily stored in the main memory is equal to or greater than the prescribed capacity or not. For example, the prescribed capacity can be set to a capacity not less than a minimum period of time that can be recognized by the user as the audio signal in reproduction. In other words, a capacity less than the prescribed capacity means a capacity to such an extent that the recording data cannot be recognized as the audio signal when the user reproduces the recording data.

When CPU 31 determines in step S172 that the recording data of the prescribed capacity or greater is stored in the main memory, CPU 31 performs the processing for storing the recording data (step S173). On the other hand, when CPU 31 determines in step S172 that the recording data of the prescribed capacity or greater is not stored, the temporarily stored recording data is erased (step S174), because an amount of stored data is too small as the recording data and such data is not recognizable. Here, the prescribed capacity is assumed as being smaller than the capacity limit of the slot. Therefore, the recording data of such a length that the user cannot recognize as the audio signal is automatically erased.

Sub routine processing of the processing for storing the recording data will be described with reference to FIG. 32.

Figure 32:
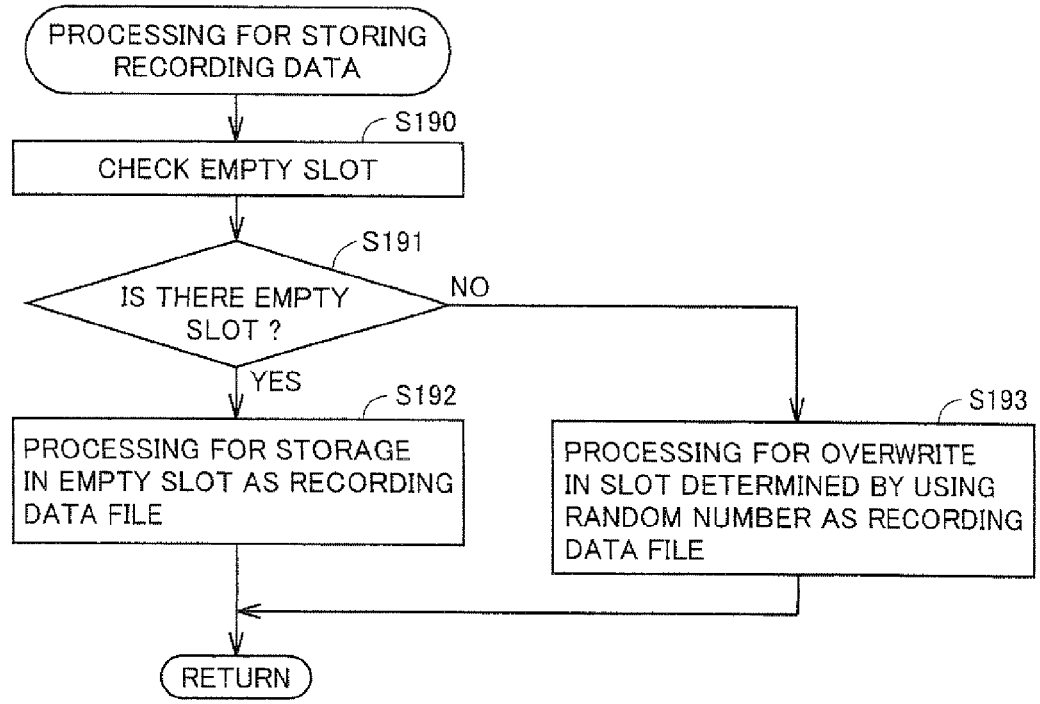
FIG. 32 is a flowchart illustrating sub routine processing of processing for storing recording data.

Referring to FIG. 32, initially, CPU 31 checks an empty slot (step S190). Specifically, CPU 31 checks whether there is a slot not including the recording data, among a plurality of slots provided in advance in memory 34 for storage and serving as a plurality of recording data storage areas.

Then, CPU 31 determines whether there is an empty slot or not (step S191).

When CPU 31 determines in step S191 that there is an empty slot, the processing for storing the recording data in the empty slot as the recording data file is performed (step S192). Specifically, CPU 31 causes memory 34 for storage to store the temporarily stored recording data as the recording data file through memory control circuit 33. Then, the process returns to the flow in FIG. 30 (return).

On the other hand, when CPU 31 determines in step S191 that there is no empty slot, one slot is determined from among the plurality of slots through processing using a random number, and processing for overwriting the slot determined by using a random number with the recording data as the recording data file (step S193). Then, the process returns to the flow in FIG. 30 (return).

As a result of this processing, one recording data file is stored in the slot.

The automatic reproduction mode will now be described.

The automatic reproduction mode according to certain example embodiments will be described with reference to FIG. 33.

Figure 33:
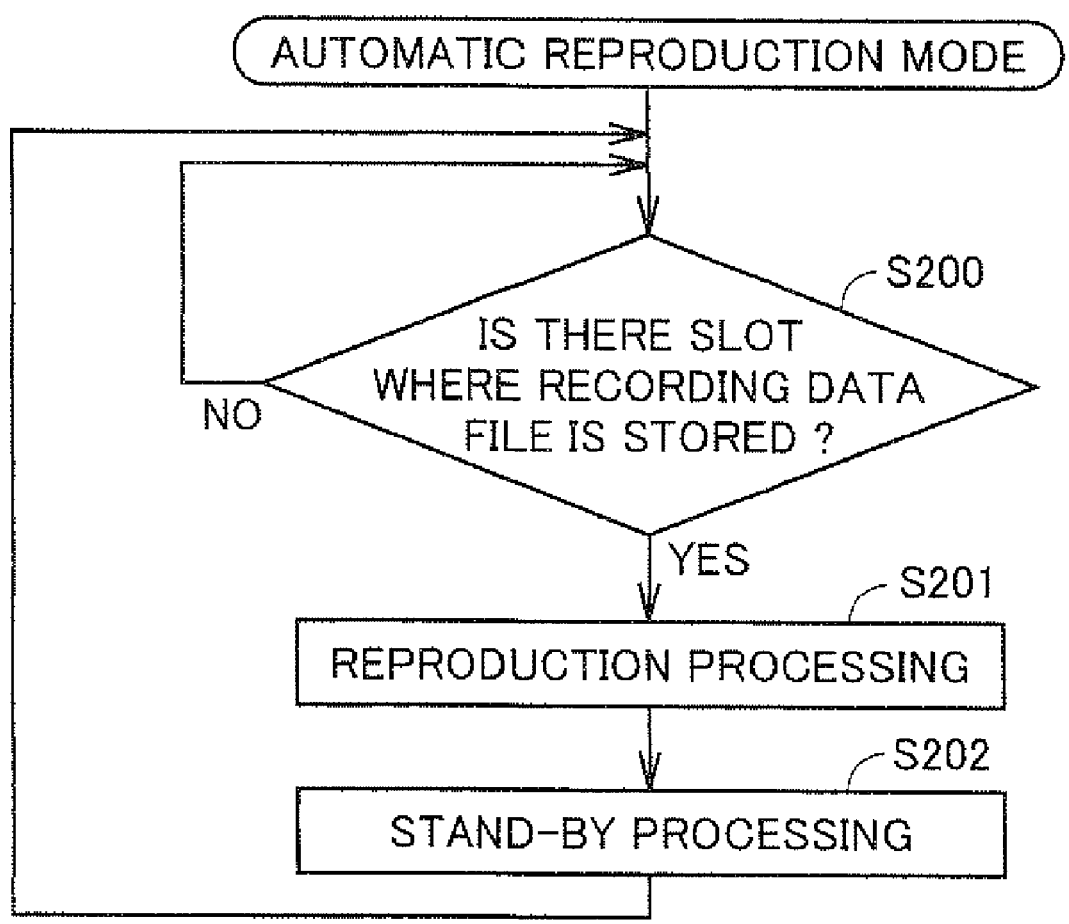
FIG. 33 is a flowchart of an automatic reproduction mode according to the embodiment.

Referring to FIG. 33, CPU 31 determines whether there is a slot in which a recording data file is stored or not (step S200). Specifically, CPU 31 determines whether or not the recording data files are present in a plurality of slots provided in advance in memory 34 for storage through memory control circuit 33.

When there is no recording data file in a slot in step S200, CPU 31 repeats the processing in step S200.

On the other hand, when CPU 31 determines in step S200 that there is a recording data file in a slot, CPU 31 performs the processing for reproducing the recording data file (step S201). Thereafter, CPU 31 performs stand-by processing (step S202). Specifically, CPU 31 is in a stand-by state for a prescribed period of time and the process again returns to step S200. The stand-by processing may be processing of being in a stand-by state for a certain prescribed period of time or for a random period of time.

Therefore, when there is a recording data file in a slot, CPU 31 repeats execution of the reproduction processing for a certain period of time or for a random period of time.

In addition, when it is determined that the recording data files are present in the plurality of slots in memory 34 for storage respectively, the processing for reproducing the recording data file stored in each slot is sequentially performed. In addition, during the reproduction processing, object 110 in a bird shape in FIG. 3 can be displayed in an animated manner. As a result of such display processing, the user can visually recognize execution of the reproduction processing based on the operation of object 110 in a bird shape.

As a result of this processing, when the user speaks loud enough for the volume of input from the microphone to exceed the threshold value while the sound selection screen in FIG. 3 is displayed, the audio signal representing the speech is stored in the slot as the recording data file based on the automatic recording mode. Based on the automatic reproduction mode, the audio signal stored in the slot as the recording data file is then automatically reproduced and the reproduction processing is repeated.

This function allows the user to create his/her own audio signal as the recording data file and to enjoy reproduction thereof.

The method of performing the recording processing or the recording and storing processing based on determination as to whether the capacity of the recording data has reached a prescribed capacity or not has been described above, however, such determination can be made, for example, based on a recording period of time without limited to the capacity, or such determination may be made based on another parameter.

With regard to sound selection screen 100 in FIG. 3, the processing in both of the automatic recording mode described in connection with FIG. 30 and the automatic reproduction mode described in connection with FIG. 33 is repeatedly performed. Thus, the content uttered by the user is automatically subjected to recording processing, and further the automatically recorded voice and sound is automatically reproduced, so that a novel interface can be provided.

(Setting Processing)

Sub routine processing of the setting processing according to certain example embodiments will be described with reference to FIG. 34.

Figure 34:
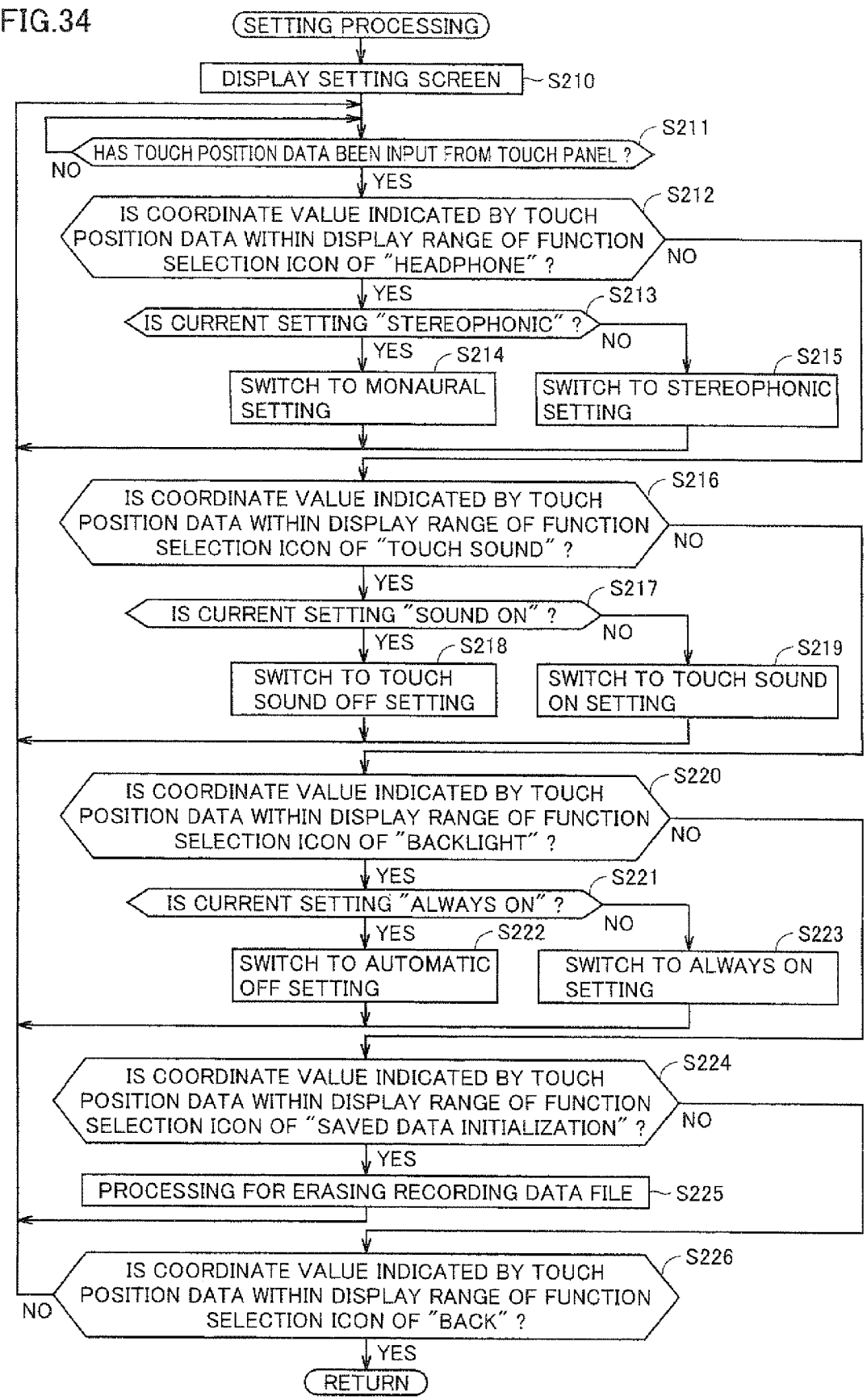
FIG. 34 is a flowchart illustrating sub routine processing of setting processing according to the embodiment.

Referring to FIG. 34, when CPU 31 determines that the coordinate value indicated by the touch position is within the display range of "setting" icon 108 in FIG. 3, CPU 31 has the setting screen displayed (step S210).

A setting screen 208 according to certain example embodiments will be described with reference to FIG. 35.

Figure 35:
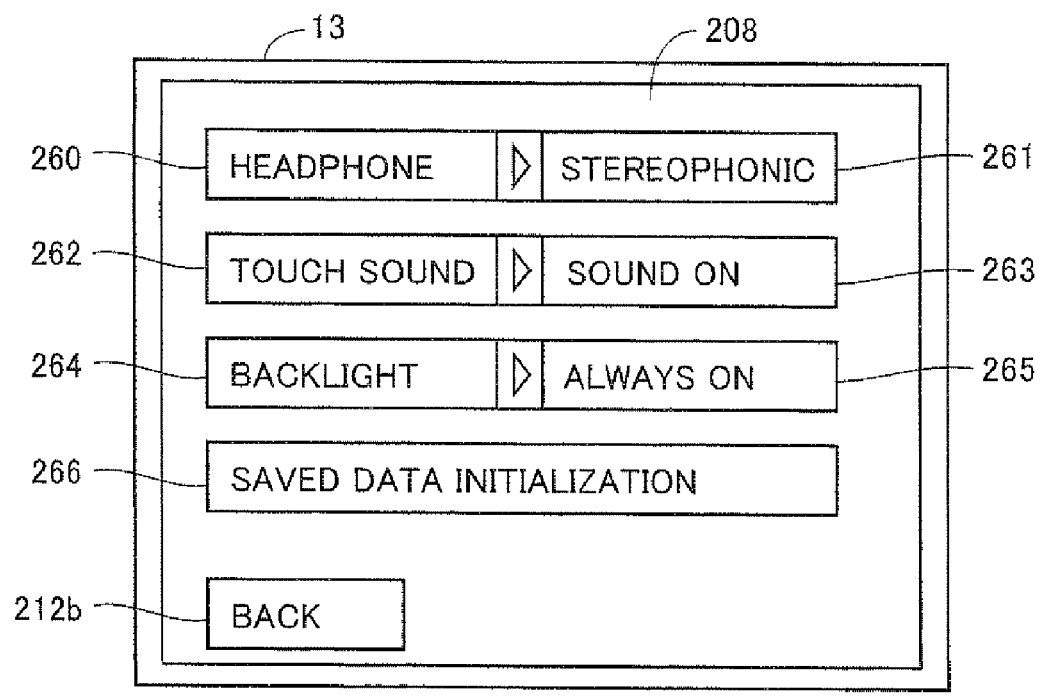
FIG. 35 is a diagram illustrating a setting screen 208 according to the embodiment.

Referring to FIG. 35, here, a "headphone" setting item 260, a "touch sound" setting item 262, and a "backlight" setting item 264 are provided. In addition, as "headphone" setting item 260, a selection function icon 261 for selecting and setting "stereophonic" or "monaural" is provided. Moreover, as "touch sound" setting item 262, a selection function icon 263 for selecting and setting "sound on" or "sound off" is provided. Further, as "backlight" setting item 264, a selection function icon 265 for selecting and setting "always on" or "automatically turned off" is provided. In addition, a "saved data initialization" icon 266 is provided, and by selecting this "saved data initialization" icon 266, the content in the recording data file in the automatic recording and reproduction processing, the recording data file created in the microphone recording and reproduction mode which will be described later, or the music file content registered in "favorite" is erased. In addition, by selecting a "back" icon 212b, the screen returns to immediately preceding sound selection screen 100.

Referring again to FIG. 34, CPU 31 determines whether the touch position data has been input from touch panel 13 or not (step S211).

When CPU 31 determines in step S211 that the touch position data has been input from touch panel 13, CPU 31 determines whether the coordinate value indicated by the touch position is within the display range of the function selection icon of "headphone" or not (step S212).

When CPU 31 determines in step S212 that the coordinate value indicated by the touch position data is within the display range of the function selection icon of "headphone", CPU 31 determines whether the current setting is "stereophonic" or not (step S213).

When the current setting is "stereophonic" in step S213, CPU 31 makes switching to monaural setting (step S214).

On the other hand, when CPU 31 determines in step S213 that the current setting is not "stereophonic", CPU 31 makes switching to stereophonic setting (step S215).

In the "stereophonic" setting, while headphone 18 is connected, stereophonic audio output is provided. Namely, output for the right and output for the left are separately provided. On the other hand, in the "monaural" setting, while headphone 18 is connected, monaural audio output is provided, but while headphone 18 is not connected, stereophonic audio output is provided, regardless of this setting.

When CPU 31 determines in step S212 that the coordinate value indicated by the touch position data is not within the display range of the function selection icon of "headphone", CPU 31 then determines whether the coordinate value indicated by the touch position data is within the display range of the function selection icon of "touch sound" or not (step S216).

When CPU 31 determines in step S216 that the coordinate value indicated by the touch position data is within the display range of the function selection icon of "touch sound", CPU 31 determines whether the current setting is "sound on" or not (step S217).

When CPU 31 determines in step S217 that the current setting is "sound on", CPU 31 makes switching to touch sound off setting (step S218).

The process again returns to step S211.

When CPU 31 determines in step S217 that the current setting is not "sound on", CPU 31 makes switching to touch sound on setting (step S219).

When CPU 31 determines in step S216 that the coordinate value indicated by the touch position data is not within the display range of the function selection icon of "touch sound", CPU 31 then determines whether the coordinate value indicated by the touch position data is within the display range of the function selection icon of the "backlight function" or not (step S220).

When CPU 31 determines in step S220 that the coordinate value indicated by the touch position data is within the display range of the function selection icon of "backlight", CPU 31 determines whether the current setting is "always on" or not (step S221).

When CPU 31 determines in step S221 that the current setting is "always on", CPU 31 makes switching to automatic off setting (step S222). As a result of switching to the automatic off setting, when it is determined that game device 1 is not operated for a certain period of time, the processing for automatically turning off the backlight is performed.

On the other hand, when CPU 31 determines in step S221 that the current setting is not "always on", CPU 31 makes switching to always on setting (step S223). Then, the process returns to step S211.

On the other hand, when CPU 31 determines in step S220 that the coordinate value indicated by the touch position data is not within the display range of the function selection icon of "backlight", CPU 31 determines whether the coordinate value indicated by the touch position data is within the display range of the function selection icon of "saved data initialization" or not (step S224).

When CPU 31 determines in step S224 that the coordinate value indicated by the touch position data is within the display range of the function selection icon of "saved data initialization", CPU 31 performs processing for erasing the recording data file and the contents registered in "favorite" (step S225). Namely, the processing or the like for erasing the recording data file stored in memory 34 for storage is performed.

When CPU 31 determines in step S224 that the coordinate value indicated by the touch position data is not within the display range of the function selection icon of "saved data initialization", CPU 31 determines whether the coordinate value indicated by the touch position data is within the display range of the function selection icon of "back" or not.

When CPU 31 determines in step S226 that the coordinate value indicated by the touch position data is within the display range of the function selection icon of "back", the screen returns to immediately preceding sound selection screen 100.

As a result of this setting processing, for example with regard to the reproduction processing when headphone 18 for one ear is attached, the stereophonic setting can be switched to the monaural setting as desired by the user. As a result of such switching setting, appropriate reproduction processing can be selected in accordance with the type of the headphone. Naturally, in the case of the headphone for both ears, switching to the monaural setting can also be made.

<Microphone Recording and Reproduction Mode>

The microphone recording and reproduction mode will now be described.

Sub routine processing in the microphone recording and reproduction mode will be described with reference to FIG. 36.

Figure 36:
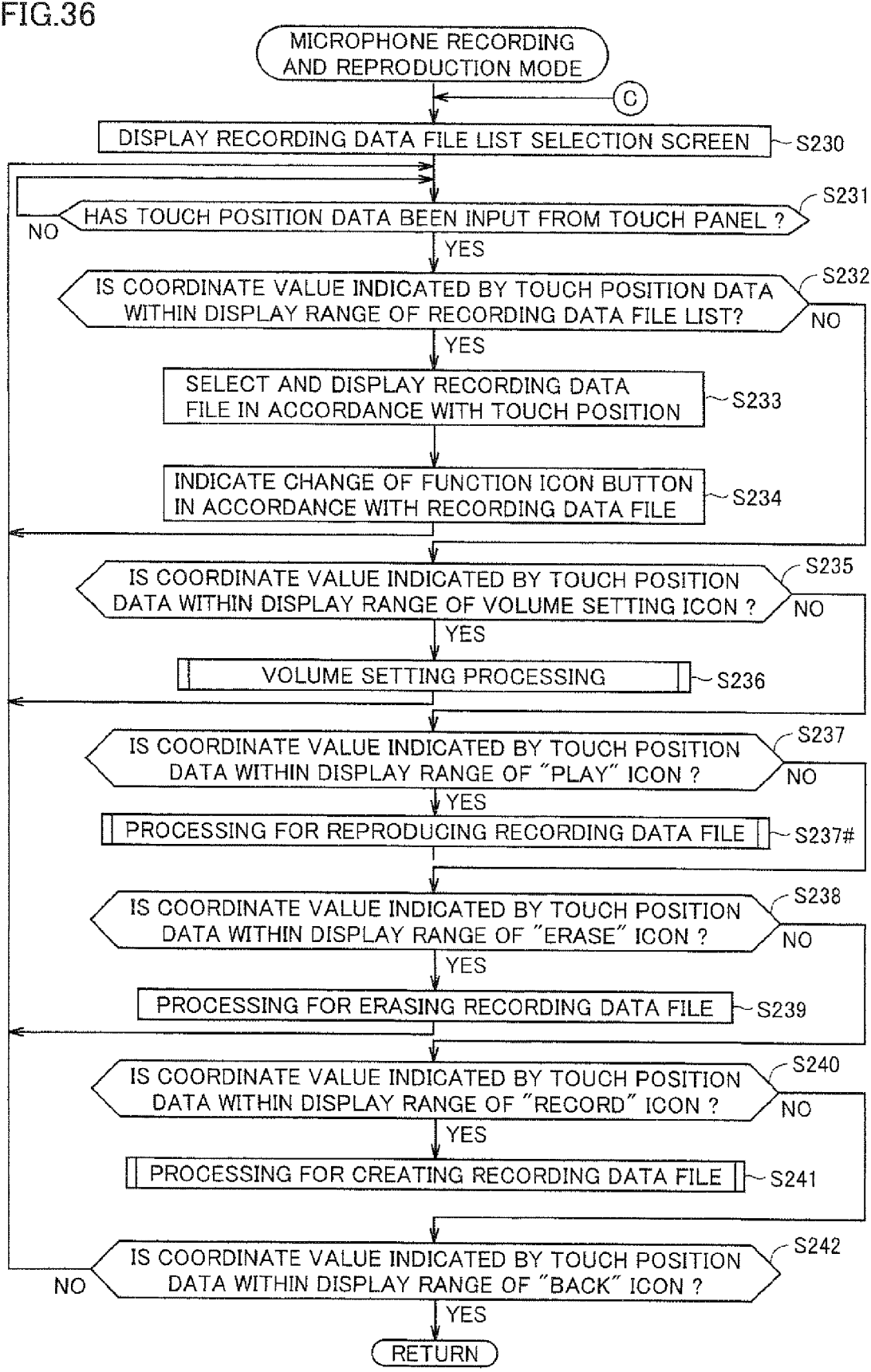
FIG. 36 is a flowchart illustrating sub routine processing in a microphone recording and reproduction mode.

Referring to FIG. 36, when transition to the microphone recording and reproduction mode is made, initially, CPU 31 has a recording data file list selection screen for play with sound recorded through the microphone displayed (step S230).

A recording data file list selection screen 300 according to certain example embodiments will be described with reference to FIG. 37.

Figure 37:
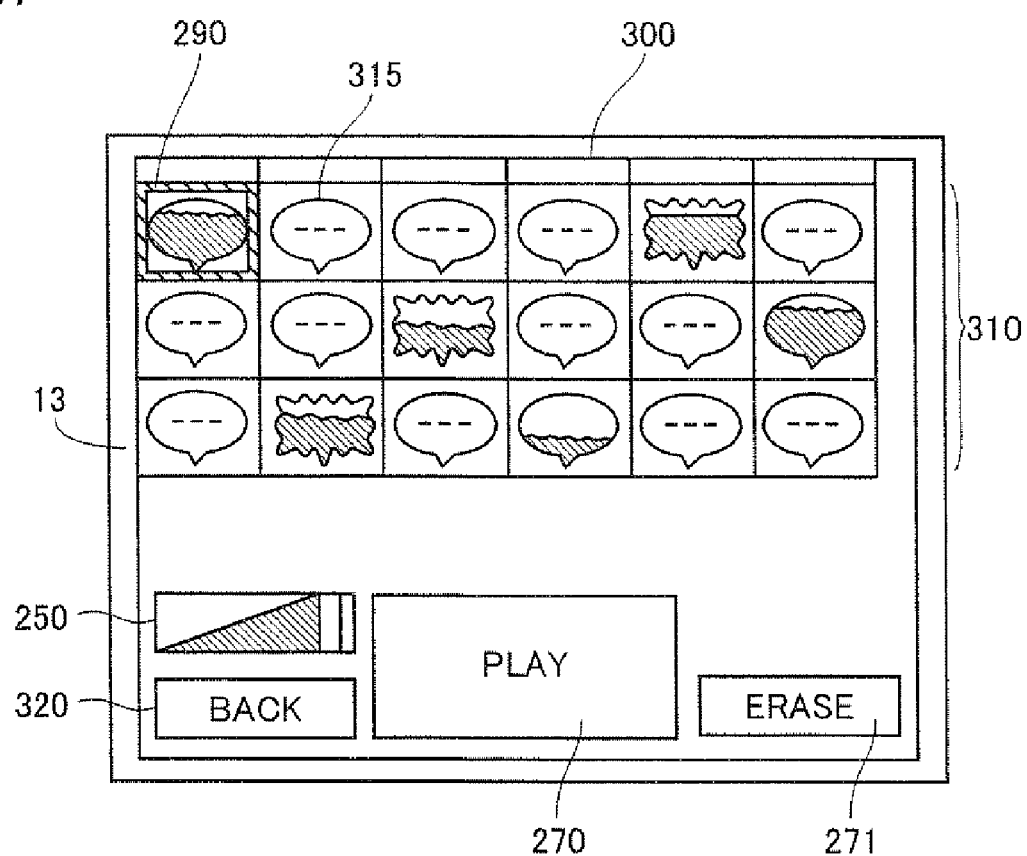
FIG. 37 is a diagram illustrating a recording data file list selection screen 300 according to the embodiment.

Referring to FIG. 37, a case where recording data file list selection screen 300 is displayed on the screen of lower LCD 12 is shown.

The user can select any recording data file from a recording data file list by touching the screen on lower LCD 12 with touch pen 27 etc. As will be described later, it is assumed that the recording data file is set to a display color selectively designated by the user. Here, each recording data file in the recording data file list corresponds to each one of the plurality of slots provided in advance in memory 34 for storage for use in the recording processing.

For example, it is assumed that a cursor 290 selects a recording data file displayed at the top left in a recording data file list 310 on recording data file list selection screen 300. For example, by touching a recording data file included in recording data file list 310 with touch pen 27 etc., cursor 290 moves to the touched recording data file and the recording data file designated with cursor 290 is in a selected state.

In addition, it is assumed that, by touching any recording data file on the screen and moving this recording data file to a position of any other recording data file while maintaining the touched state, that is, maintaining the selected state of the recording data file designated with cursor 290 (performing slide operation), positions of these recording data files are interchanged.

Here, for example, a recording data file 315 is assumed as such a file that no recording data is stored in the slot above, which is also applicable to other files. On the other hand, recording data files other than aforementioned are such files that recording data is stored in the slot above. Specifically, regarding a manner of display of the recording data file, a data amount of the recording data included in each file relative to the total capacity is displayed as a water level. Based on such a manner of display, the user can sensuously recognize the amount of data of the recording data file. In the present example, for example, it is assumed that one file can record an audio signal for 10 seconds.

In addition, the user can set the volume at which output is provided from the speaker or the like by designating volume setting icon 250 with touch pen 27 etc. Since this processing is as described above, detailed description thereof will not be repeated.

Moreover, the user can return to sound selection screen 100 which is the preceding screen, by selecting a "back" icon 320.

Further, by selecting a recording data file in recording data file list selection screen 300 and selecting a "play" icon 270, the reproduction processing is started and a recording data reproduction operation selection screen 301 is displayed.

On the other hand, it is assumed that, if a file in which no recording data is stored is selected from recording data file list selection screen 300, "play" icon 270 is changed to a "record" icon 270#. Then, by selecting this "record" icon 270#, a recording start screen 302 which will be described later is displayed.

In addition, by selecting an "erase" icon 271 with touch pen 27 etc., the currently selected recording data file can be erased and a file in which no recording data is stored can be set.

In addition, as described above, regarding a manner of display of the recording data file, a data amount of the recording data included in each file relative to the total capacity is displayed as a water level. Based on such a manner of display, the user can sensuously recognize the amount of data of the recording data file. In addition, in recording data file list 310, a recording data file different in shape is shown. For example, when a modification and edition function by using tone adjustment icon 242 or the like which will be described later is performed and "overwrite" is selected, that is, when change to different recording data is made, display processing is performed such that the shape of the recording data file is changed in accordance with modification and edition.

As a result of this manner of display, the user can intuitively recognize that a recording data file is a modified and edited file, which contributes to convenience of the user.

Recording data reproduction operation selection screen 301 according to certain example embodiments will be described with reference to FIG. 38.

Figure 38:
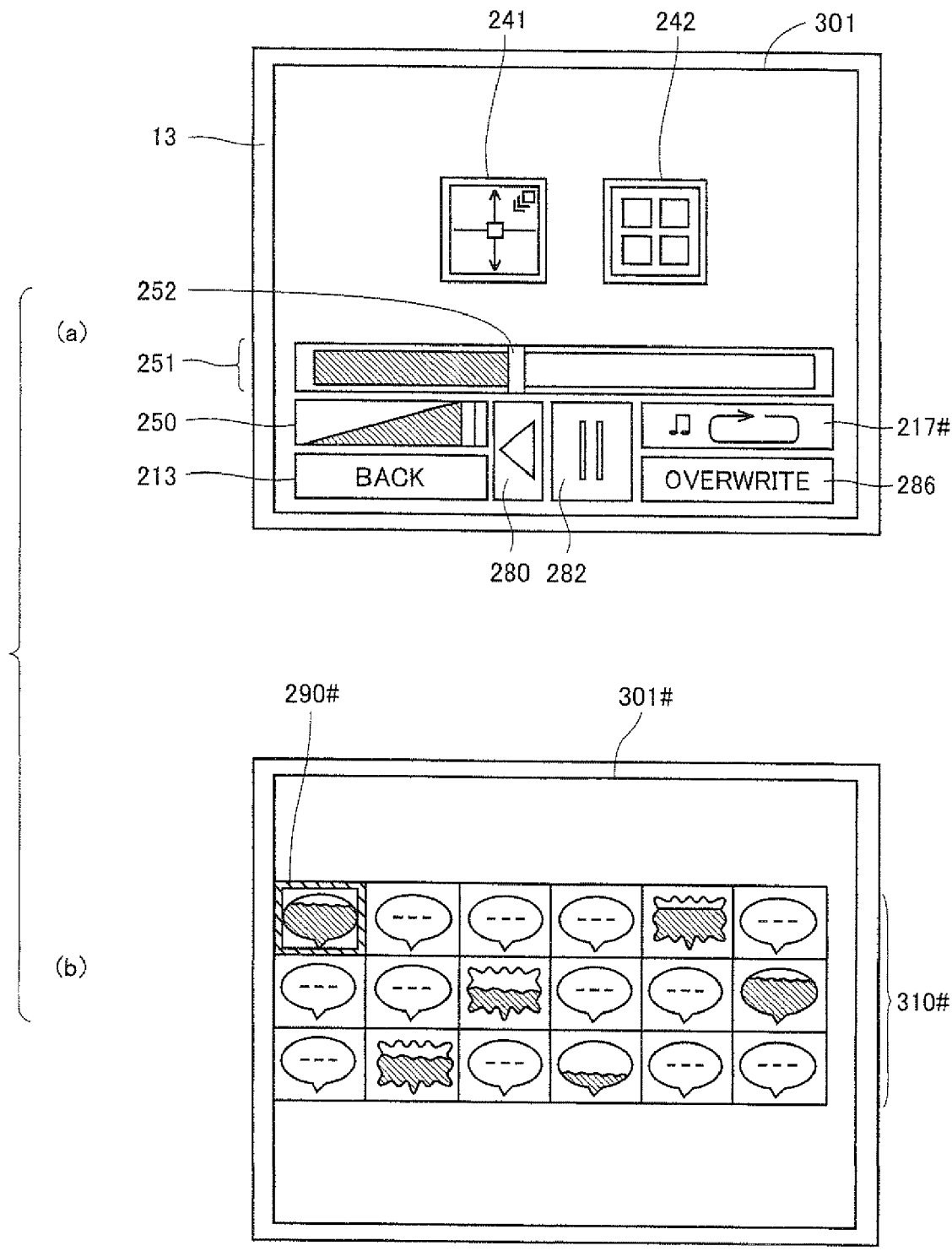
FIG. 38 is a diagram illustrating a recording data reproduction operation selection screen 301.

FIG. 38(*a*) shows a case that recording data reproduction operation selection screen 301 is displayed on lower LCD 12.

Specifically, the user can perform the function of the operation with music being modified, in the reproduction operation or the like of the recording data based on selection with the touch pen etc.

Here, a case where speed and key adjustment icon 241, tone adjustment icon 242, a reproduction mode switching icon 217#, and an "overwrite" icon 286 are provided as the selection function icon is shown.

The user can perform the function to change the reproduction speed or the key by selecting speed and key adjustment icon 241 described above.

In addition, the user can perform the function for modification and edition to another tone by modulating a frequency of the reproduction signal or by performing filtering processing or the like based on selection of tone adjustment icon 242. Specifically, the tone adjustment icon described in connection with FIG. 21 may be provided or another tone adjustment icon may be provided.

In addition, the user can cause the recording data file being reproduced to pause, by pressing a pause command icon 282 serving as the reproduction operation command icon. Here, display of pause command icon 282 is changed to display of a play command icon 282#. Moreover, a reverse play command icon 280 is also provided as the reproduction operation command icon. When reverse play command icon 280 is selected, reverse reproduction processing is performed. Here, display of reverse play command icon 280 is changed to display of a pause command icon 280#. Two icons of the play command and the reverse play command are displayed as such command icons, and the selected icon is switched to the pause command icon. Therefore, the user can switch between the reproduction operation and the reverse reproduction operation with one action by using touch pen 27 etc.

Specifically, in a reproduction interface for music data (here, music data will be described by way of example, however, a video data may be applicable), two command icon areas are provided (a first command icon area and a second command icon area), any of the reverse play command icon and the pause command icon is displayed in a switched manner in the first command icon area, and any of the play command icon and the pause command icon is displayed in a switched manner in the second command icon area.

More specifically, the manner of display is as follows.

In stop state: The reverse play command icon is displayed in the first command icon area and the play command icon is displayed in the second command icon area.

In play state: The reverse play command icon is displayed in the first command icon area and the pause command icon is displayed in the second command icon area.

In reverse play state: The pause command icon is displayed in the first command icon area and the play command icon is displayed in the second command icon area.

Play command icon: When touched, forward play of audio data is started.

Reverse play command icon: When touched, reverse play of audio data is started.

Pause command icon: When touched, reproduction of audio data is caused to pause.

Though the pause command icon indicating pause has been described in the present example, a stop command icon indicating stop instead of pause may be employed.

Thus, transition to any of play, reverse play and stop can be made by using two command icon areas in any state of stop, play and reverse play.

Speaking more generally, in an information processing device that can take three states (a first state, a second state, and a third state), two button areas are provided, and when the information processing device is currently in the first state, a button for transition to the second state and a button for transition to the third state are displayed (i). When the button for transition from the (i) state to the second state is operated to make transition to the second state, the button for transition to the second state is changed to a button for transition to the first state, and the button for transition to the first state and the button for transition to the third state are displayed (ii). In addition, when the button for transition from the (i) state to the third state is operated to make transition to the third state, the button for transition to the third state is changed to the button for transition to the first state, and the button for transition to the second state and the button for transition to the first state are displayed (iii). Moreover, when the button for transition from the (ii) state to the first state is operated to make transition to the first state, the state returns to the (i) state. Further, when the button for transition from the (iii) state to the first state is operated to make transition to the first state, the state returns to the (i) state. In addition, when the button for transition from the (ii) state to the third state is operated to make transition to the third state, the button for transition to the first state is changed to the button for transition to the second state, the button for transition to the third state is changed to the button for transition to the first state, and the button for transition to the second state and the button for transition to the first state are displayed. In addition, when the button for transition from the (iii) state to the second state is operated to make transition to the second state, the button for transition to the second state is changed to the button for transition to the first state, and the button for transition to the first state is changed to the button for transition to the third state.

Thus, two button areas can be used to efficiently make transition to any of the three states.

Further, the user can make switching among the reproduction modes in the recording data file list by pressing reproduction mode switching icon 217#. Specifically, the reproduction mode in which data being reproduced is repeatedly reproduced, the reproduction mode in which data is sequentially reproduced and reproduction is repeated from the beginning when reproduction is completed, the reproduction mode in which data is sequentially reproduced and reproduction is stopped when reproduction is completed, the reproduction mode in which random reproduction is performed, and the reproduction mode in which only a set section is repeatedly reproduced can sequentially be switched and executed.

In addition, by pressing "overwrite" icon 286, for example, the user can overwrite for storage, the recording data file with a recording data file modified and edited through filtering processing or the like based on selection of tone adjustment icon 242.

In addition, FIG. 38(b) shows a case where recording data file list 310 displayed on the screen of lower LCD 12 in FIG. 37 is now displayed on the screen of upper LCD 22 as a recording data file selection list screen 301#. The recording data file displayed on recording data file list 310# can then be selected via cursor 290# by operating direction input button 14A. Namely, after the recording data file is selected with the touch pen etc. (by pressing play) on the screen of lower LCD 12 in FIG. 37, on the screen of lower LCD 12 in FIG. 38(a), the processing for the reproduction operation of the recording data file selected with the touch pen etc. is selected on the recording data reproduction operation selection screen with the touch pen etc. and on the screen of upper LCD 22, the recording data file can be selected with direction input button 14A.

For example, by using direction input button 14A to select the recording data file and pressing any of operation buttons 14B to 14E, the recording data file being reproduced is switched to the selected recording data file and the reproduction operation thereof can be performed.

Therefore, the processing in reproduction operation selection screen 301 on lower LCD 12 and the processing in recording data file selection list screen 301# on upper LCD 22 can be performed in parallel, which contributes to convenience of the user.

Specifically, in an information processing device having two screens (or two display areas), contact detection means (in the present embodiment, a touch panel) is provided for at least one screen (in the present embodiment, lower LCD 12). Then, an icon group (a first icon group; in the embodiment, a group of icons 315 showing respective recording data files) showing a plurality of choices is displayed on one screen, and selection of any icon is permitted through the contact detection means. After any icon is selected from among the plurality of icons by using the contact detection means, display of the first icon group is moved to the other screen (in the present embodiment, upper LCD 22) and another icon group (a second icon group; in the embodiment, 241 and 242) is displayed on one screen and selection of any icon from this second icon group is permitted through the contact detection means. Even after the first icon group has moved to the other screen, one icon can be selected from the first icon group by using a key switch (which is a direction key, and in the embodiment, a cross-shaped key 14A). Thus, selection from the first icon group and selection from the second icon group can be made in parallel. For example, first selection may be made with the use of the first icon group and selection relating to the icon selected in the first selection may be made with the use of the second icon group (in the present embodiment, data to be processed is selected in the first selection and processing content for the selected data is selected in the second selection). Here, even after transition to a condition for the second selection is made after the first selection from the first icon group, selection from the first icon group can be changed by operating the key switch and hence the first selection can be redone in parallel after transition to the condition for the second selection, which contributes to improved convenience.

Referring again to FIG. 36, CPU 31 determines whether the touch position data has been input from touch panel 13 or not (step S231).

When CPU 31 determines in step S231 that the touch position data has been input from touch panel 13, CPU 31 then determines whether the coordinate value indicated by the touch position data is within the display range of recording data file list 310 or not (step S232).

When CPU 31 determines in step S232 that the coordinate value indicated by the touch position data is within the display range of recording data file list 310, the recording data file is selected and displayed in accordance with the touch position (step S233).

Then, CPU 31 changes a function icon button in accordance with the recording data file and has the resultant function icon button displayed (step S234). The process then again returns to step S231. Specifically, when the cursor selects and indicates a recording data file, "play" icon 270 is displayed. When the cursor selects and indicates a file in which nothing is recorded, "record" icon 270# is displayed.

When CPU 31 determines in step S232 that the coordinate value indicated by the touch position data is not within the display range of recording file list 310, CPU 31 then determines whether the coordinate value indicated by the touch position data is within the display range of volume setting icon 250 or not (step S235).

When CPU 31 determines in step S235 that the coordinate value indicated by the touch position data is within the display range of volume setting icon 250, CPU 31 performs the volume setting processing (step S236). As the volume setting processing has been described above, detailed description thereof will not be repeated.

On the other hand, when CPU 31 determines in step S235 that the coordinate value indicated by the touch position data is not within the display range of volume setting icon 250, CPU 31 then determines whether the coordinate value indicated by the touch position data is within the display range of "play" icon 270 or not (step S237).

When CPU 31 determines in step S237 that the coordinate value indicated by the touch position data is within the display range of "play" icon 270, CPU 31 performs the processing for reproducing a recording data file (step S237#). The processing for reproducing the recording data file will be described later.

On the other hand, when CPU 31 determines in step S237 that the coordinate value indicated by the touch position data is not within the display range of "play" icon 270, CPU 31 then determines whether the coordinate value indicated by the touch position data is within the display range of "erase" icon 271 or not (step S238).

When CPU 31 determines in step S238 that the coordinate value indicated by the touch position data is within the display range of "erase" icon 271, CPU 31 performs the processing for erasing the recording data file (step S239).

When CPU 31 determines in step S238 that the coordinate value indicated by the touch position data is not within the display range of "erase" icon 271, CPU 31 then determines whether the coordinate value indicated by the touch position data is within the display range of "record" icon 270# or not (step S240).

When CPU 31 determines in step S240 that the coordinate value indicated by the touch position data is within the display range of "record" icon 270#, CPU 31 performs processing for creating the recording data file (step S241). The processing for creating the recording data file will be described later.

When CPU 31 determines in step S240 that the coordinate value indicated by the touch position data is not within the display range of "record" icon 270#, CPU 31 then determines whether the coordinate value indicated by the touch position data is within the display range of "back" icon 320 or not (step S242).

When CPU 31 determines in step S242 that the coordinate value indicated by the touch position data is not within the display range of "back" icon 320, the process again proceeds to step S231.

On the other hand, when CPU 31 determines in step S242 that the coordinate value indicated by the touch position data is within the display range of "back" icon 320, sound selection screen 100 shown in FIG. 3 is displayed.

Sub routine processing of the processing for reproducing the recording data file will be described with reference to FIG. 39.

Figure 39:
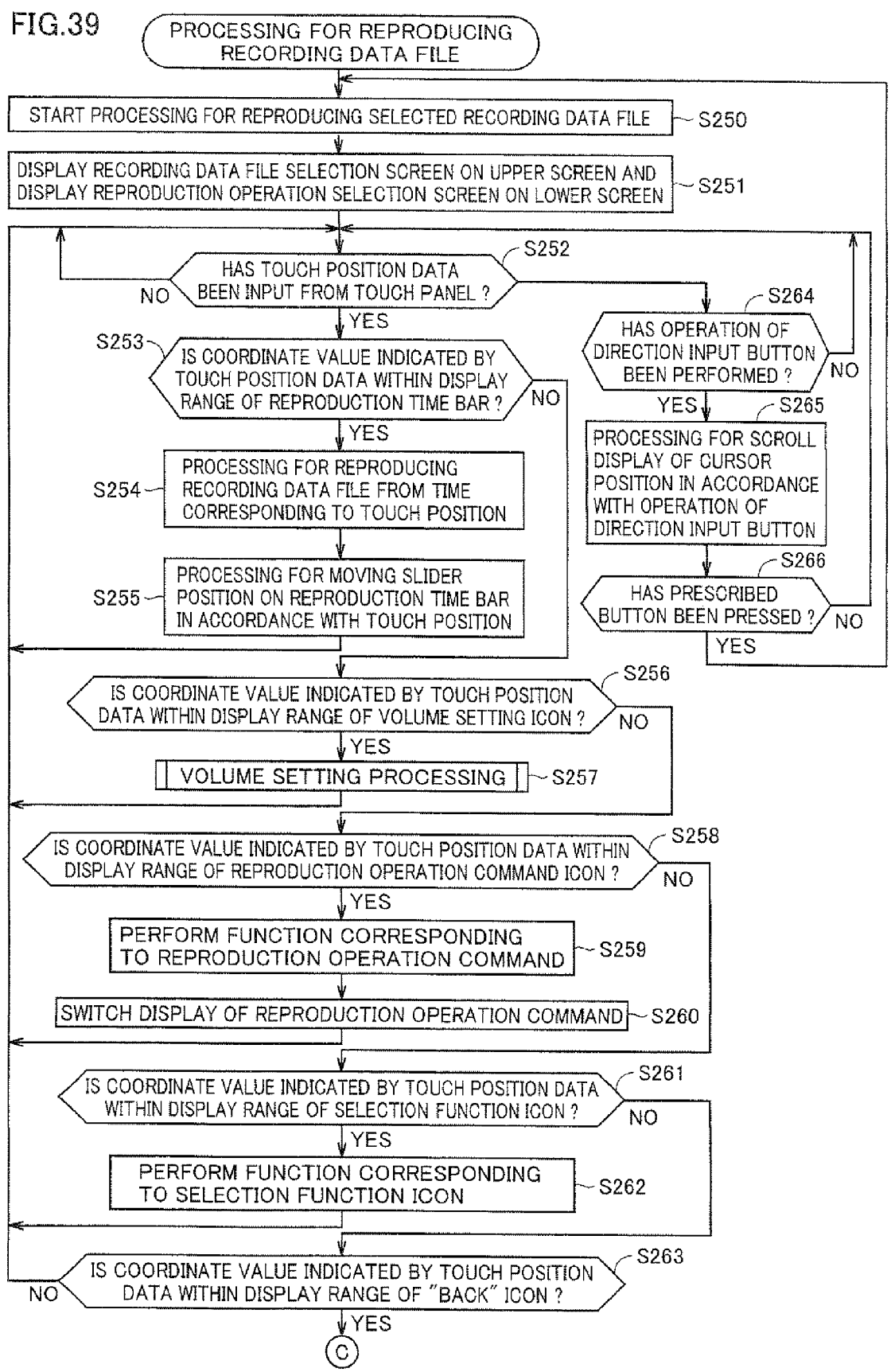
FIG. 39 is a diagram illustrating sub routine processing of processing for reproducing a recording data file.

Referring to FIG. 39, when CPU 31 determines in step S237 that the coordinate value indicated by the touch position data is within the display range of the "play" icon, CPU 31 then starts the processing for reproducing the selected recording data file (step S250).

Thereafter, CPU 31 causes upper LCD 22 to display recording data file selection list screen 301# and lower LCD 12 to display reproduction operation selection screen 301 (step S251).

Thereafter, CPU 31 determines whether the touch position data has been input from touch panel 13 or not (step S252).

When CPU 31 determines in step S252 that the touch position data has not been input from touch panel 13, CPU 31 then determines whether the operation of direction input button 14A has been performed or not (step S264).

When CPU 31 determines in step S264 that the operation of direction input button 14A has been performed, CPU 31 performs the processing for scroll display of the cursor position indicating the selected recording data file in recording data file selection list screen 301# in accordance with the operation of direction input button 14A (step S265).

On the other hand, when CPU 31 determines in step S264 that the operation of direction input button 14A has not been performed, the process again returns to step S252.

Then, CPU 31 determines whether a prescribed button has been pressed or not (step S266).

When the prescribed button has been pressed in step S266, CPU 31 starts reproduction of the recording data file selected by the cursor position (step S250).

On the other hand, when the prescribed button has not been pressed in step S266, the process again returns to step S252.

Here, it is assumed that the prescribed button is set to any of operation buttons 14B to 14E.

On the other hand, when CPU 31 determines in step S252 that the touch position data has been input from touch panel 13, CPU 31 then determines whether the coordinate value indicated by the touch position data is within the display range of a reproduction time bar 251 or not (step S253).

When CPU 31 determines in step S253 that the coordinate value indicated by the touch position data is within the display range of reproduction time bar 251, CPU 31 performs the processing for reproducing the recording data file from the time corresponding to the touch position (step S254).

In step S254, CPU 31 then performs the processing for moving the slider position on reproduction time bar 251 in accordance with the touch position (step S255).

When CPU 31 determines in step S253 that the coordinate value indicated by the touch position data is not within the display range of reproduction time bar 251, CPU 31 then determines whether the coordinate value indicated by the touch position data is within the display range of volume setting icon 250 or not (step S256).

When CPU 31 determines in step S256 that the coordinate value indicated by the touch position data is within the display range of volume setting icon 250, CPU 31 performs the volume setting processing (step S257). As the volume setting processing has been described above, detailed description thereof will not be repeated.

When CPU 31 determines in step S256 that the coordinate value indicated by the touch position data is not within the display range of volume setting icon 250, CPU 31 then determines whether the coordinate value indicated by the touch position data is within the display range of the reproduction operation command icon or not (step S258).

When CPU 31 determines in step S258 that the coordinate value indicated by the touch position data is within the display range of the reproduction operation command icon, CPU 31 performs the function corresponding to the reproduction operation command (step S259).

Thereafter, display of the reproduction operation command is switched (step S260).

Then, the process again returns to step S252.

When CPU 31 determines in step S258 that the coordinate value indicated by the touch position data is not within the display range of the reproduction operation command icon, CPU 31 then determines whether the coordinate value indicated by the touch position data is within the display range of the selection function icon or not (step S261).

When CPU 31 determines in step S261 that the coordinate value indicated by the touch position data is within the display range of the selection function icon, CPU 31 performs the function corresponding to the selection function icon (step S262).

When CPU 31 determines in step S261 that the coordinate value indicated by the touch position data is not within the display range of the selection function icon, CPU 31 determines whether the coordinate value indicated by the touch position is within the display range of "back" icon 213.

When CPU 31 determines in step S263 that the coordinate value indicated by the touch position data is within the display range of "back" icon 213, recording data file list selection screen 300 which is the preceding screen is displayed (step S230).

On the other hand, when CPU 31 determines in step S263 that the coordinate value indicated by the touch position is not within the display range of "back" icon 213, the process returns to step S252.

Sub routine processing of the processing for creating a recording data file will be described with reference to FIGS. 40 and 42.

As described above, it is assumed that a plurality of slots used for processing for recording in memory 34 for storage are provided in advance in the present example.

Figure 40:
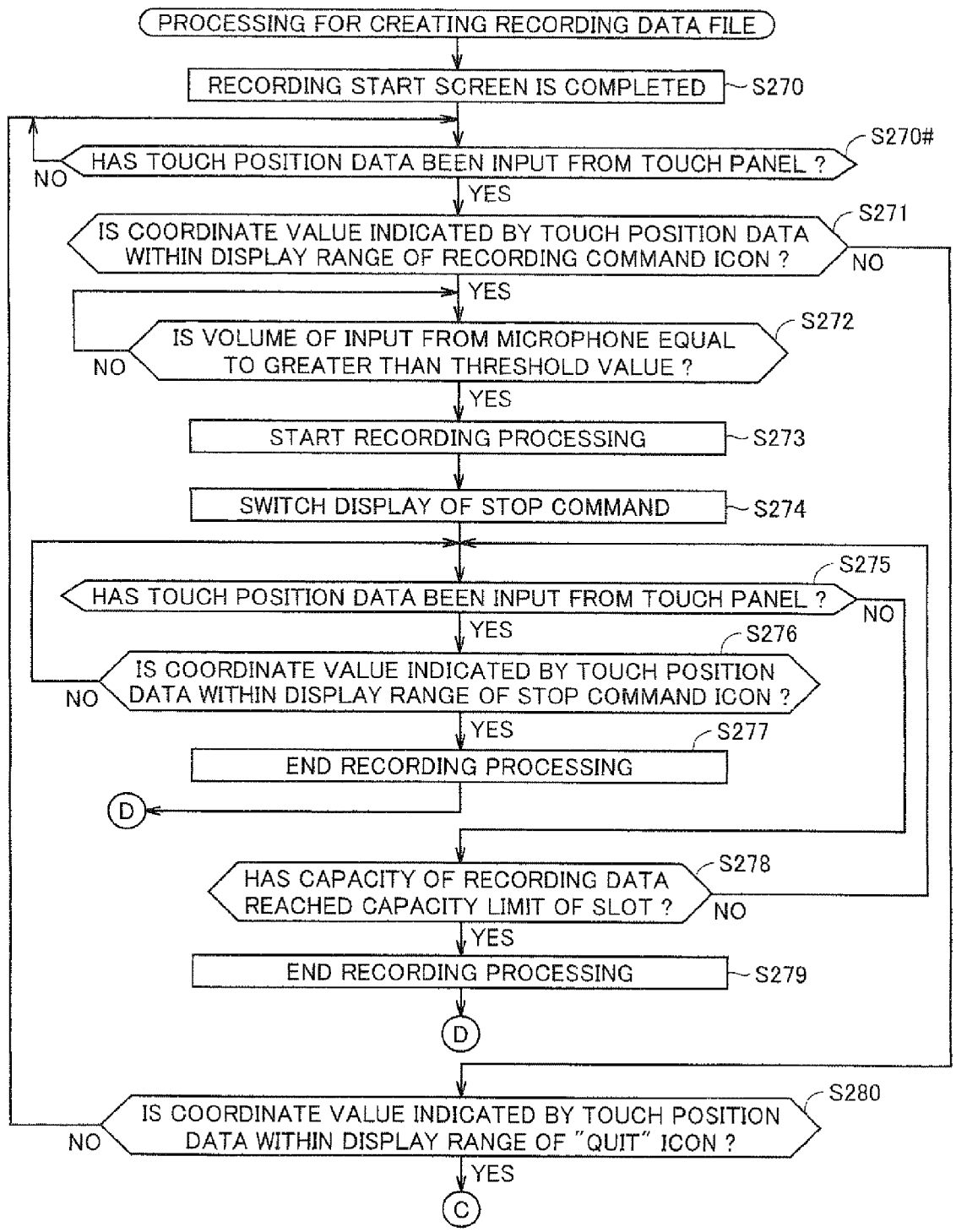
FIG. 40 is a flowchart illustrating sub routine processing (No. 1) of processing for creating a recording data file.

Referring to FIG. 40, initially, CPU 31 has recording start screen 302 displayed (step S270).

Recording start screen 302 according to certain example embodiments will be described with reference to FIG. 41.

Figure 41:
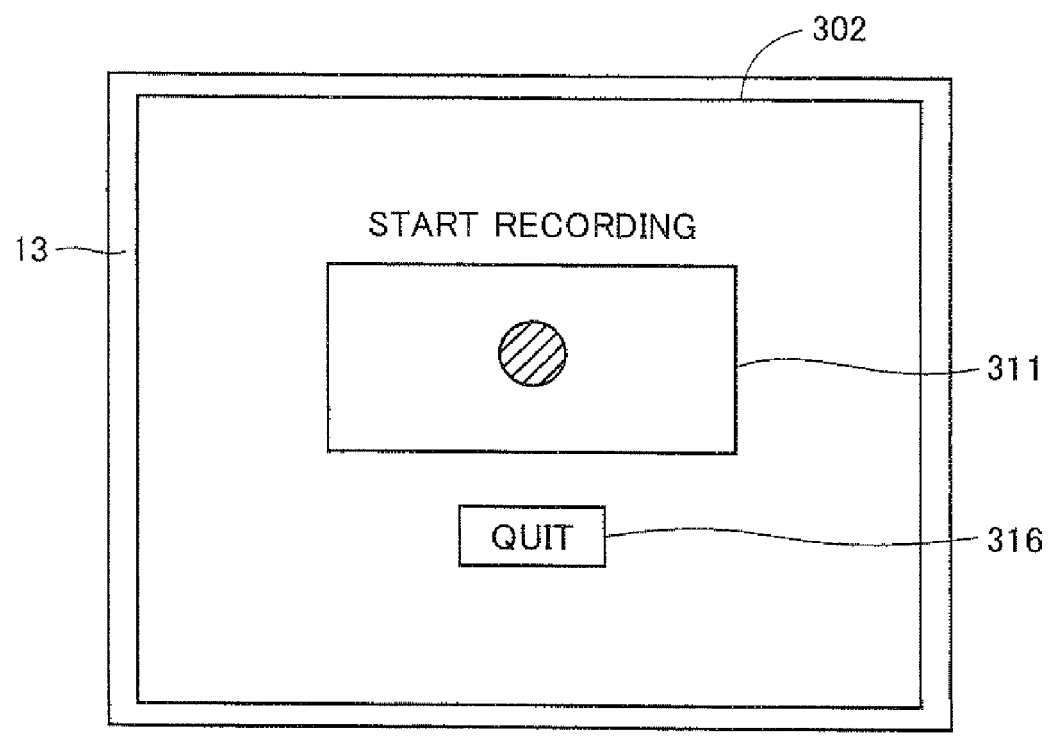
FIG. 41 is a diagram illustrating a recording start screen 302 according to the embodiment.

Referring to FIG. 41, a recording command icon 311 is provided in recording start screen 302. In addition, a "quit" icon 311 is provided. By pressing recording command icon 311, recording is started. In addition, it is assumed that, after recording is started, display of recording command icon 311 is changed to display of a stop command icon 311#. By pressing stop command icon 311#, recording is stopped. In addition, by pressing "quit" icon 316, it is assumed that the screen returns to recording data file list selection screen 300 which is the preceding screen.

Referring again to FIG. 40, CPU 31 determines whether the touch position data has been input from touch panel 13 or not (step S270#).

Thereafter, when CPU 31 determines that the touch position data has been input from touch panel 13, CPU 31 then determines whether the coordinate value indicated by the touch position data is within the display range of the recording command icon or not (step S271).

When CPU 31 determines in step S271 that the coordinate value indicated by the touch position data is within the display range of recording command icon 311, CPU 31 then determines whether the volume of input from the microphone is equal to or greater than the threshold value or not (step S272).

When it is determined that the volume of input from the microphone is equal to or greater than the threshold value, CPU 31 then starts the recording processing (step S273).

Thereafter, CPU 31 makes switching of display of the recording command (step S274). Specifically, stop command icon 311# is displayed.

Thereafter, CPU 31 determines whether the touch position data has been input from touch panel 13 or not (step S275).

When CPU 31 determines that the touch position data has been input from touch panel 13, CPU 31 determines whether the coordinate value indicated by the touch position data is within the display range of stop command icon 311# or not (step S276).

When CPU 31 determines in step S276 that the coordinate value indicated by the touch position data is within the display range of stop command icon 311#, the recording processing ends (step S277) and the process proceeds to "D".

Figure 42:
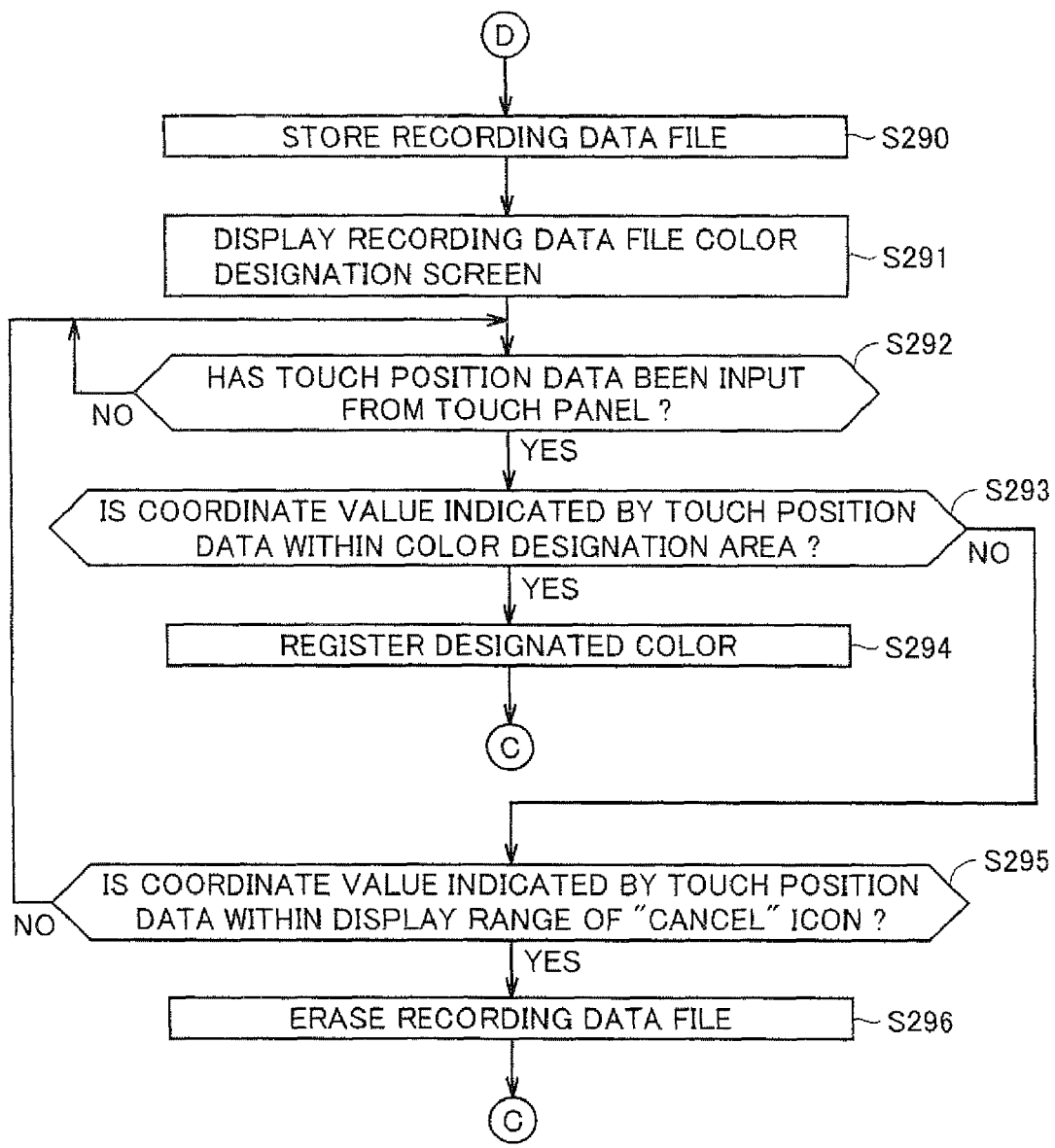
FIG. 42 is a flowchart illustrating sub routine processing (No. 2) of processing for creating a recording data file.

Referring to FIG. 42, when the recording processing ends in step S277, CPU 31 then stores the recording data file (step S290). Specifically, CPU 31 causes storage of the recording data file in the designated slot in data memory 34 for storage through memory control circuit 33.

Thereafter, CPU 31 has a recording data file color designation screen displayed (step S291).

A recording data file color designation screen 303 according to certain example embodiments will be described with reference to FIG. 43.

Figure 43:
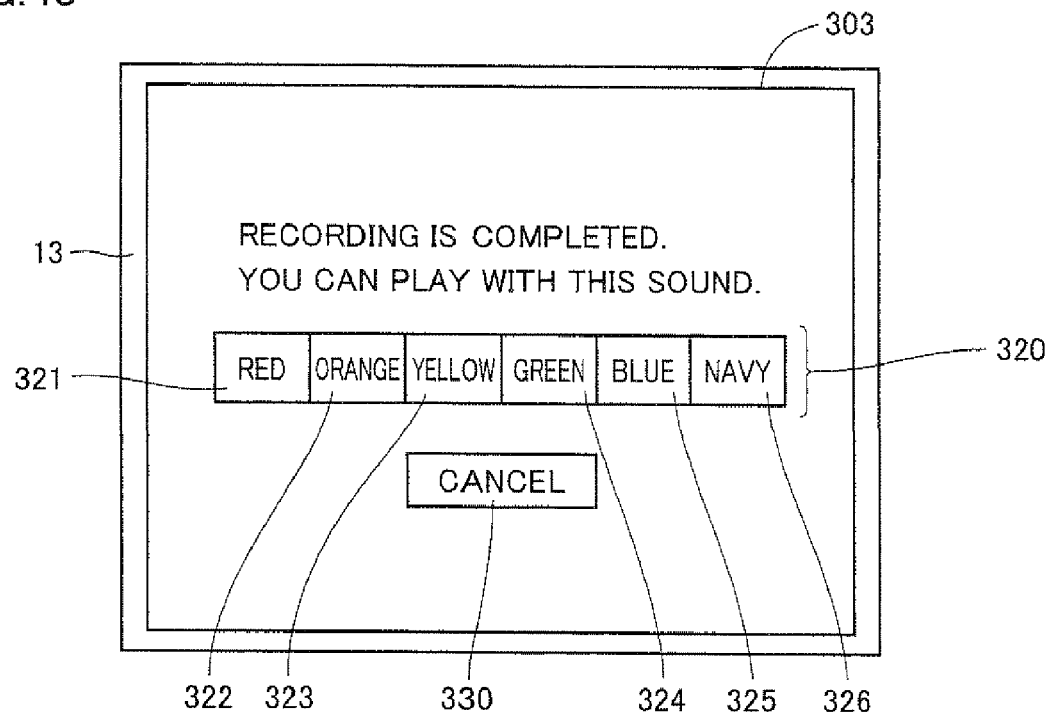
FIG. 43 is a diagram illustrating a recording data file color designation screen 303 according to the embodiment.

Referring to FIG. 43, a case where a message "Recording is completed. You can play with this sound." is displayed on recording data file color designation screen 303 according to certain example embodiments is shown. A color designation area 320 is provided and color designation selection icons 321 to 326 indicating red, orange, yellow, green, blue, and navy, respectively are provided. The user can designate any color designation icon by touching the icon with touch pen 27 etc. A display color of the recording data file corresponding to the designated slot is registered in this designated color. In addition, by pressing a "cancel" icon 330, the recording data file is erased and the screen returns to recording data file list selection screen 300.

Referring again to FIG. 42, CPU 31 determines whether the touch position data has been input from touch panel 13 or not (step S292).

When CPU 31 determines in step S292 that the touch position data has been input from touch panel 13, CPU 31 then determines whether the coordinate value indicated by the touch position data is within the color designation area or not (step S293).

When CPU 31 determines in step S293 that the coordinate value indicated by the touch position data is within the color designation area, the designated display color is registered (step S294). Then, CPU 31 has recording data file list selection screen 300 displayed. Here, the selected recording data file is displayed in the designated display color.

On the other hand, when CPU 31 determines in step S293 that the coordinate value indicated by the touch position data is not within the color designation area, CPU 31 then determines whether the coordinate value indicated by the touch position data is within the display range of "cancel" icon 330 or not (step S295).

When CPU 31 determines in step S295 that the coordinate value indicated by the touch position data is not within the display range of "cancel" icon 330, the process returns to step S292.

On the other hand, when CPU 31 determines in step S295 that the coordinate value indicated by the touch position data is within the display range of "cancel" icon 330, the recording data file corresponding to the designated slot is erased (step S296).

Then, CPU 31 has recording data file list selection screen 300 displayed. Here, the selected file is displayed as a file in which no recording data is stored.

Referring again to FIG. 40, when CPU 31 determines in step S276 that the coordinate value indicated by the touch position data is not within the display range of stop command icon 311#, the process returns to step S275.

When the touch position data has not been input from touch panel 13 in step S275, CPU 31 determines whether the capacity of the recording data has reached the capacity limit of the slot or not (step S278).

When CPU 31 determines in step S278 that the capacity of the recording data has not reached the capacity limit of the slot, the process again returns to step S275.

Then, when CPU 31 determines in step S278 that the capacity of the recording data has reached the capacity limit of the slot, the recording processing ends (step S279). Then, the process proceeds to step S290 in FIG. 42. The subsequent processing is as described above.

On the other hand, when CPU 31 determines in step S271 that the coordinate value indicated by the touch position data is not within the display range of recording command icon 311, CPU 31 then determines whether the coordinate value indicated by the touch position data is within the display range of "quit" icon 316 or not.

When CPU 31 determines in step S280 that the coordinate value indicated by the touch position data is within the display range of "quit" icon 316, CPU 31 has recording data file list selection screen 300 as described in connection with FIG. 37 displayed.

On the other hand, when CPU 31 determines in step S280 that the coordinate value indicated by the touch position data is not within the display range of "quit" icon 316, the process proceeds to step S270#.

As a result of this processing, the user can create a recording data file freely recorded by the user through the microphone in the main body and reproduce the created recording data file. In addition, the function to display the created recording data file by selecting recording data selection icon 244 described in connection with FIG. 7 and to output the recording data file recorded in a similar manner as sound effect from the speaker can also be performed.

In the present example, for example, a case where the slot storing the recording data file is provided in memory 34 for storage contained in game device 1 has been described. Storage of the recording data file, however, is not limited to storage in memory 34 for storage, and for example, the recording data file may be stored in a memory card such as a SD card in accordance with a user's operation instruction.

Certain example embodiments may include the following aspects. In the description below, for better understanding of certain example embodiments, correspondence with the embodiments described above is shown, however, reference numerals in parentheses, supplemental explanation and the like are not intended as a limitation in any manner.

According to certain example embodiments, an information processing program executed in a computer representing an information processing device (1) capable of reproducing music data in which an upper member (21) and a lower member (11) are coupled to each other to allow opening and closing is provided. The information processing program causes the computer to function as music reproduction means (S90) for reproducing music data, opening and closing detection means (S150) for detecting an opened or closed state of the upper member and the lower member, and sleep means (S153, S154) for continuing reproduction of the music data by the music reproduction means when transition from the opened state to the closed state of the upper member and the lower member is detected by the opening and closing detection means and connection with prescribed external output equipment is detected while the music data is being reproduced by the music reproduction means, and stopping reproduction of the music data by the music reproduction means when connection with prescribed external output equipment is not detected.

According to this aspect, the following problem can be solved.

Japanese Patent Laying-Open No. 2003-216289 shows a computer device implemented as a notebook PC which is a portable terminal device, in which when the notebook PC is closed (in a closed state), sleep processing is performed to set a sleep state where operation such as display is stopped. On the other hand, this document shows the feature that setting from a sleep state to an active state is made when the notebook PC is again opened (in an opened state).

In addition, this document discloses such a technique that, even in performing the sleep processing, when the notebook PC is connected to a reproduction device performing reproduction processing of music data through a USB cable, an active state is partially set in order to transmit necessary data from the notebook PC to the reproduction device through the USB cable.

Therefore, even when the sleep processing is performed, the sleep processing is not performed for a partial function relating to reproduction processing of the music data.

In an information terminal device in Japanese Patent Laying-Open No. 2003-216289, however, reproduction processing of the music data in the information processing device has not been considered and it has not been possible to perform reproduction processing convenient for a user.

According to this aspect, in order to address the problem above, an information processing program and an information processing device performing processing convenient for a user in reproduction of music data are provided.

According to certain example embodiments, when the user closes the upper member and the lower member of the information processing device coupled to allow opening and closing, transition from the opened state to the closed state of the upper member and the lower member is detected. When connection with prescribed external output equipment is detected, reproduction of the music data is continued. When connection with prescribed external output equipment is not detected, reproduction is stopped.

As shown in a typical embodiment, when the user closes the upper member and the lower member from the opened state and connection of prescribed external output equipment (typically, headphone 18) is detected, a reproduction function is continued and hence an audio signal is output from the headphone. Therefore, as the audio signal is not output from a speaker or the like of the device, the user and a person around the user do not feel uncomfortable. In addition, the reproduction function is continued while connection with headphone 18 is detected, and otherwise, i.e., when connection with headphone 18 is not detected, the sleep state where the reproduction function is stopped is set, which is convenient for the user who has been expecting transition to the sleep state where reproduction is stopped by closing the device.

According to a more preferred aspect, this information program further causes the computer to function as continuous reproduction accepting means (217, S161) for accepting a setting instruction indicating continuous reproduction of music data. When the opening and closing detection means detects transition from the opened state to the closed state of the upper member and the lower member and the setting instruction is accepted, the music reproduction means carries out continuous reproduction of the music data (S162), and when the setting instruction is not accepted, the music reproduction means stops reproduction of the music data (S163) at the timing of end of reproduction of the music data that is currently being carried out.

According to this aspect, when the user provides input of the setting instruction indicating continuous reproduction of the music data and transition from the opened state to the closed state of the upper member and the lower member is detected, reproduction of the music data is continuously carried out. When input of the setting instruction is not provided, reproduction of the music data is stopped at the timing of end of reproduction of the music data that is currently being carried out.

As shown in a typical embodiment, when the user selects "reproduction mode" switching icon 217 to select a reproduction mode of repeated reproduction, that is, the reproduction mode in which reproduction of the music data is continuously carried out, reproduction of the music data is continued. When the user selects a reproduction mode other than that, reproduction is stopped at the timing of end of reproduction of the music data that is currently being carried out. Thus, as whether to continue reproduction or not is determined based on the setting instruction indicating continuous reproduction provided by the user, reproduction as intended by the user can be carried out. In addition, as reproduction is stopped at the timing of end of reproduction of the music data that is currently being carried out, reproduction can be ended without having the user feel uncomfortable.

According to a more preferred aspect, this information processing program further causes the computer to function as reproduction setting accepting means (261, S212, S213) for accepting a setting instruction to switch between stereophonic reproduction and monaural reproduction in reproduction of music data by the music reproduction means. When the setting instruction is accepted and connection with prescribed external output equipment is detected, the music reproduction means carries out reproduction in accordance with the setting instruction, and when connection with prescribed external output equipment is not detected, the music reproduction means carries out stereophonic reproduction (S214, S215).

According to this aspect, the reproduction setting means for accepting a setting instruction to switch between stereophonic reproduction and monaural reproduction in reproduction of the music data functions, and when connection with prescribed external output equipment is detected, stereophonic reproduction or monaural reproduction is carried out in accordance with the setting instruction.

As shown in a typical embodiment, when the user selects function selection icon 261 of "headphone" in reproduction through external output equipment (typically, a headphone) and switches to the headphone, reproduction processing appropriate for a type of the headphone can be selected.

According to a more preferred aspect, this information processing program further causes the computer to function as adjustment means (S141) for adjusting a prescribed frequency band of music data to be reproduced by the music reproduction means when connection with prescribed external output equipment is detected (S140).

According to this aspect, when connection with external output equipment (typically, a headphone) is detected, the adjustment means for adjusting a prescribed frequency band of music data to be reproduced functions.

As shown in a typical embodiment, equalization processing is performed when the user attaches external output equipment (typically, a headphone), so that reproduction can be carried out without having the user feel uncomfortable by adjusting a prescribed frequency band even when acoustic characteristics are significantly changed owing to attachment of the headphone.

According to a more preferred aspect, this information processing program further causes the computer to function as adjustment means for adjusting a prescribed tone of music data to be reproduced by the music reproduction means when connection with prescribed external output equipment is detected.

According to this aspect, when connection with external output equipment (typically, a headphone) is detected, the adjustment means for adjusting a prescribed tone of music data to be reproduced functions.

As shown in a typical embodiment, when the user attaches external output equipment (typically, a headphone), reproduction can be carried out without having the user feel uncomfortable, for example, in such a manner that sound of high key that gives no uncomfortable feeling in reproduction from the speaker but sounds too high in listening through the headphone is replaced with different sound of lower key, or sound accompanying noise in listening through the headphone is replaced with different sound.

According to a more preferred aspect, this information processing program further causes the computer to function as adjustment means for adjusting a volume of music data to be reproduced by the music reproduction means when connection with prescribed external output equipment is detected.

According to this aspect, when connection with external output equipment (typically, a headphone) is detected, the adjustment means for adjusting a volume of music data to be reproduced functions.

As shown in a typical embodiment, when the user attaches external output equipment (typically, a headphone), reproduction can be carried out without having the user feel uncomfortable, for example, in such a manner that an audio signal reproduced in balance without giving uncomfortable feeling in reproduction from the speaker but reproduced in poor volume balance in listening through the headphone is adjusted by increasing or decreasing the volume thereof to attain balance.

According to a more preferred aspect, sleep means stops at least a part of a display function when the opening and closing detection means detects transition from the opened state to the closed state of the upper member and the lower member.

According to this aspect, when transition from the opened state to the closed state of the upper member and the lower member is detected, at least a part of the display function is stopped.

As shown in a typical embodiment, when the user sets the upper member and the lower member from the opened state to the closed state, a sleep state where an unnecessary function is stopped by stopping at least a part of the display function is set and hence power consumption can be lowered.

According to another aspect, an information processing program executed in a computer representing an information processing device capable of reproducing music data causes a computer to function as music reproduction means for reproducing music data and reproduction setting accepting means for accepting a setting instruction to switch between stereophonic reproduction and monaural reproduction in reproduction of music data by the music reproduction means. When the setting instruction is accepted and connection with prescribed external output equipment is detected, the music reproduction means carries out reproduction in accordance with the setting instruction, and when connection with prescribed external output equipment is not detected, the music reproduction means carries out stereophonic reproduction.

According to this aspect, reproduction setting means for accepting a setting instruction to switch between stereophonic reproduction and monaural reproduction in reproduction of the music data functions, and when connection with prescribed external output equipment is detected, stereophonic reproduction or monaural reproduction is carried out in accordance with the setting instruction.

As shown in a typical embodiment, when the user selects function selection icon 261 of "headphone" in reproduction through external output equipment (typically, a headphone) and switches to the headphone, reproduction processing appropriate for a type of the headphone can be selected.

According to yet another aspect, an information processing device (1) capable of reproducing music data in which an upper member (21) and a lower member (11) are coupled to each other to allow opening and closing includes music reproduction means (S90) for reproducing music data, opening and closing detection means (S150) for detecting an opened or closed state of the upper member and the lower member, and sleep means (S153, S154) for continuing reproduction of the music data by the music reproduction means when transition from the opened state to the closed state of the upper member and the lower member is detected by the opening and closing detection means and connection with prescribed external output equipment is detected while the music data is being reproduced by the music reproduction means, and stopping reproduction of the music data by the music reproduction means when connection with prescribed external output equipment is not detected.

According to this yet another aspect, an information processing device capable of reproducing music data includes music reproduction means for reproducing music data and reproduction setting accepting means (261, S212, S213) for accepting a setting instruction to switch between stereophonic reproduction and monaural reproduction in reproduction of music data by the music reproduction means. When the setting instruction is accepted and connection with prescribed external output equipment is detected, the music reproduction means carries out reproduction in accordance with the setting instruction, and when connection with prescribed external output equipment is not detected, the music reproduction means carries out stereophonic reproduction (S214, S215).

Although certain example embodiments have been described and illustrated in detail, it is clearly understood that the same is by way of illustration and example only and is not to be taken by way of limitation, the scope of the present invention being interpreted by the terms of the appended claims.

What is claimed is:

1. An information processing method performed in a computer for updating a current value of at least one parameter based on an input from an input device, the at least one parameter having valid values that are between a minimum value and a maximum value where the current value of the parameter is less than the maximum value, the method comprising:
   displaying a sliding indicator in a display area, the slider indicator visually representing valid values of the at least one parameter;
   receiving, via the input device, a first indicated position within the display area, the first indicated position being in accordance with the displayed slider indicator of the current value of the at least one parameter;
   accepting a continuous operation of movement in accordance with at least the received first indicated position;
   updating said at least one parameter from the current value to a new valid value of the at least one parameter in accordance with the accepted continuous operation of movement;
   receiving, via the input device, a second indicated position within the display area, the second indicated position indicating a first jump operation to the second indicated position, the second indicated position being in accordance with a first valid value of the at least one parameter that is greater than the current value of the at least one parameter;
   receiving, via the input device, a third indicated position within the display area, the third indicated position indicating a second jump operation to the third indicated position, the third indicated position being in accordance with a second valid value of the at least one parameter that is less than the current value of the at least one parameter;
   performing the second jump operation in accordance with reception of the third indicated position but not performing the first jump operation in accordance with reception of the second indicated position;
   updating the current value of the at least one parameter to the second valid value in accordance with performance of the second jump operation;
   updating the sliding indicator in accordance with the second valid value and the performed second jump operation;
   maintaining the sliding indicator in accordance with the current value when the second indicated position is received; and
   maintaining the at least one parameter at the current value in accordance with reception of the second indicated position.

2. The information processing method according to claim 1, wherein said input device is a pointing device.

3. The information processing method according to claim 1, wherein the at least one parameter is updated between the current value and the second valid value at a predetermined rate of change in accordance with performance of the second jump operation.

4. The information processing method according to claim 1, further comprising:
   setting values for a plurality of types of parameters based on the input from said input device,
   wherein said values of said plurality of types of parameters are associated with positions within said display area, respectively.

5. The information processing method according to claim 4, wherein said display area is a multi-dimensional area in accordance with the plurality of types of parameters.

6. The information processing method according to claim 1, wherein said at least one parameter corresponds to a volume level of sound output from an output device of said computer.

7. The information processing method according to claim 1, wherein said at least one parameter corresponds to duration of a file reproduced in said computer.

8. The method of claim 1, wherein the first, second, and third indicated positions are different positions within the display area.

9. The method of claim 1, wherein an area on the screen outside the display area is an invalid input area for the first, second, third indicated positions.

10. The method of claim 1, wherein:
    the at least one parameter is relatable to a plurality of different values, each one of the different values respectively associated with a plurality of different positions in the display area,
    the first, second, and third indicated positions are included in the plurality of positions, and
    the first and second valid values are included in the plurality of different values.

11. The method of claim 1, wherein the new valid value is greater than the current value and greater than or equal to the first valid value.

12. A computer implemented information processing method that is performed on a computer based on input from an input device, the method comprising:
    displaying a slider on a display screen that indicates a current value of a parameter, the slider displayed within a prescribed display area of the display screen, the parameter having valid values that are between a minimum value and a maximum value where the current value of the parameter is less than the maximum value, the valid values of the parameter being associated with valid positions within the prescribed display area;
    accepting a continuous operation of movement, via the input device, from a first position of the displayed slider that is in accordance with the current value of said parameter;

updating the parameter from the current value to a new valid value in accordance with the accepted continuous operation of movement;

accepting a first jump operation of movement, via the input device, to a second position of said slider that is in accordance with a first valid value of said parameter within said prescribed display area, the first valid value being greater than the current value of the parameter;

accepting a second jump operation of movement, via the input device, to a third position of said slider in accordance with a second valid value of said parameter within said prescribed display area, the second valid value being less than the current value of the parameter;

performing the second jump operation of movement to the third position;

updating the current value of the parameter to the second valid value of the parameter in accordance with performance of the second jump operation of movement to the third position;

updating the slider in accordance with the performed second jump operation of movement;

maintaining the display slider at the first position associated with the current value in accordance with the accepted first jump operation of movement to the second position that is associated with the first valid value; and maintaining the parameter at the current value in accordance with the first jump operation of movement.

13. The information processing method according to claim 12, wherein said input device is a pointing device.

14. The information processing method according to claim 12, further comprising:

setting values of a plurality of types of parameters based on the input from said input device, wherein said values of said plurality of types of parameters are associated with arbitrary positions within said prescribed display area, respectively.

15. The information processing method according to claim 14, wherein said prescribed display area is a multi-dimensional area in accordance with a plurality of types of parameters.

16. The information processing method according to claim 12, wherein said parameter corresponds to a volume level of sound output from an output device of said computer.

17. The information processing method according to claim 12, wherein said parameter corresponds to duration of a file reproduced in said computer.

18. The method of claim 12, wherein the first, second, and third valid positions are different positions.

19. The method of claim 12, wherein the new valid value is greater than or equal to the first valid value.

20. An information processing device configured to set a value of at least one parameter based on an input from an input device, the at least one parameter having valid values that are between a minimum value and a maximum value where a first value of the parameter is less than the maximum value, the device comprising:

a processing system that includes at least one processor, the processing system configured to:

display a moving indicator within a prescribed display area of a display device, the moving indicator set to move in accordance with the value of the at least one parameter;

accept a continuous operation of change from a first position that is in accordance the first value of the at least one parameter;

update the value of the at least one parameter from the first value to a new valid value based on the continuous operation of change;

adjust the displayed moving indicator to a new position that is associated with the new valid value in accordance with the accepted continuous operation of change;

when the value of the at least one parameter is at the first value and the moving indicator is displayed in accordance thereof, accept, via the input device, a second indicated position within the prescribed display area, the second indicated position being in accordance with a second valid value of the at least one parameter that is greater than the first value of the at least one parameter;

when the value of the at least one parameter is at the first value and the moving indicator is displayed in accordance thereof, accept, via the input device, a third indicated position within the prescribed display area, the third indicated position being in accordance with a third valid value of the at least one parameter that is less than the first value of the at least one parameter;

perform a jump operation of change in accordance with reception of the third indicated position;

maintain the value of the at least one parameter at the first value in accordance with acceptance of the second indicated position and the moving indicator is displayed in accordance thereof; and update the value of the at least one parameter from the first value to the third valid value in accordance with performance of the jump operation of change.

21. The device of claim 20, wherein the first and second positions are different positions.

22. The device of claim 20, wherein the new valid value is greater than or equal to the second valid value.

23. An information processing device for setting a value of at least one parameter based on an input from an input device, the device comprising:

a display that is configured to display a slider indicating the value of said at least one parameter within a prescribed display area on the display, the at least one parameter having valid values that are between a minimum value and a maximum value where a current value of the at least one parameter is less than the maximum value, the valid values of the parameter being associated with positions within the prescribed display area on the display;

a processing system that includes at least one processor, the processing system configured to:

accept a continuous operation of movement from a first position of the slider in accordance with the current value of said at least one parameter to a new position that is associated with a first valid value of the at least one parameter;

update said at least one parameter to the first valid value in accordance with the accepted continuous operation of movement;

accept a jump operation of movement to a second position of the slider within said prescribed display area, the second position relating to a second valid value of said at least one parameter, the second valid value being greater than the current value;

accept a jump operation of movement to a third position of the slider within said prescribed display area, the third position relating to a third valid value of said at least one parameter, the third valid value being less than the current value;

update display of the slider on the display in accordance with the accepted jump operation of movement to the third position;

update the value of the at least one parameter from the current value to the third valid value in accordance with the accepted jump operation of movement to the third position;

maintain the slider at the first position associated with the current value in accordance with acceptance the jump operation of movement to the second position that relates to the second valid value; and maintain the value of the at least one parameter at the current value in accordance with the accepted jump operation of movement to the second position.

24. The device of claim 23, wherein the first and second positions are different positions.

25. The device of claim 23, wherein the first valid value is greater than or equal to the second valid value.

26. A non-transitory computer readable storable medium storing computer readable instructions for setting a parameter that is associated with a graphical indication that is presented on at least one display screen of a computing system, the parameter having valid values that are between a minimum value and a maximum value where a first value of the parameter is less than the maximum value, the computing system further including at least one user input device, the stored instructions including instructions configured to:

display the graphical indication of the parameter on the at least one display screen at a first position that is associated with the first value, the graphical indication movable within a valid input area of the at least one display screen;

when the graphical indication is displayed at the first position, accept input from the user input device of a position on the at least one display screen and within the valid input area, the position being associated with a valid value of the parameter;

when the accepted input of the position is associated with the first position of the graphical indication, perform a continuous operation of change based on continuously accepted user input;

update the parameter from the first value to a new valid value in accordance with performance of the continuous operation of change;

when the accepted input of the position is associated with a second valid value of the parameter that is greater than the first value, maintain display of the graphical indication at the first position on the display screen associated with the first value of the parameter and maintain the at least one parameter at the first value in accordance with the accepted input;

when the accepted input of the position is associated with a third valid value of the parameter that is less than the first value, perform a jump operation of change in accordance with the position and change the display of the graphical indication to the accepted input of the position; and update the parameter from the first value to the third valid value in accordance with performance of the jump operation of change.

27. The medium of claim 26, wherein the first position of the graphical indicator is associated with multiple valid values of the parameter.

28. The medium of claim 26, wherein the parameter includes a plurality of parameters and a displayed position of the graphical indicator is associated with at least one value from each one of the plurality of parameters.

29. The medium of claim 26, wherein the jump operation of change adjusts the parameter to the third valid value at a predetermined rate.

* * * * *